(12) United States Patent
Maeda

(10) Patent No.: US 8,535,457 B2
(45) Date of Patent: Sep. 17, 2013

(54) ROLLING MEMBER, ROLLING BEARING AND PROCESS FOR MANUFACTURING ROLLING MEMBER

(75) Inventor: Kikuo Maeda, Kuwana (JP)

(73) Assignee: NTN Corporation, Osaka (JP)

( * ) Notice: Subject to any disclaimer, the term of this patent is extended or adjusted under 35 U.S.C. 154(b) by 451 days.

(21) Appl. No.: 12/600,617

(22) PCT Filed: May 9, 2008

(86) PCT No.: PCT/JP2008/058634
§ 371 (c)(1),
(2), (4) Date: Nov. 17, 2009

(87) PCT Pub. No.: WO2008/143031
PCT Pub. Date: Nov. 27, 2008

(65) Prior Publication Data
US 2010/0150489 A1 Jun. 17, 2010

(30) Foreign Application Priority Data

| May 17, 2007 | (JP) | 2007-131960 |
| Jun. 8, 2007 | (JP) | 2007-153136 |
| Jun. 8, 2007 | (JP) | 2007-153137 |
| Jun. 13, 2007 | (JP) | 2007-156703 |
| Jun. 20, 2007 | (JP) | 2007-162877 |

(51) Int. Cl.
*F16C 33/34* (2006.01)
*C23C 8/32* (2006.01)
*C23C 8/22* (2006.01)
*C22C 38/44* (2006.01)
*C22C 38/46* (2006.01)

(52) U.S. Cl.
USPC ............ 148/319; 148/233; 148/218; 384/565

(58) Field of Classification Search
USPC .......................... 148/319, 233, 218; 384/566
See application file for complete search history.

(56) References Cited

U.S. PATENT DOCUMENTS 4,050,324 A * 9/1977 Teyssandier ................. 74/397
6,273,230 B1 * 8/2001 Nakano et al. ........... 192/84.961

(Continued)

FOREIGN PATENT DOCUMENTS

JP 5-179404 7/1993
JP 7-019252 1/1995

(Continued)

OTHER PUBLICATIONS

English Abstract and English Machine Translation of Fujita (JP 2005-314794) (2005).*

(Continued)

*Primary Examiner* — Jessee Roe
(74) *Attorney, Agent, or Firm* — McDermott Will & Emery LLP

(57) ABSTRACT

The invention provides a deep groove ball bearing which exhibits a long life even in a high-temperature environment or an environment involving the penetration of water in spite of its low alloying element content. The outer race, inner race and ball constituting the bearing are made of a steel which contains 0.3 to 0.4% of carbon, 0.3 to 0.7% of silicon, 0.3 to 0.8% of manganese, 0.5 to 1.2% of nickel, 1.6 to 2.5% of chromium, 0.1 to 0.7% of molybdenum and 0.2 to 0.4 of vanadium with the balance consisting of iron and impurities and in a total content of silicon and manganese of 1.0% or below, a total content of nickel and chromium of 2.3% or above and a total content of chromium, molybdenum and vanadium of 3.0% or below. Surface hardened layers are formed in the outer race, inner race and ball respectively and the surface hardened layers exhibit hardness of 725 to 800 HV, while the maximum particle size of carbides dispersed in the surface hardened layers is 10 μm or below and the area ratio thereof is 7 to 25%. Further, the inner parts exhibit hardness of 450 to 650 HV.

10 Claims, 23 Drawing Sheets

(56) References Cited

U.S. PATENT DOCUMENTS

| | | | |
|---|---|---|---|
| 6,729,985 B2 * | 5/2004 | Crewe et al. ............... 474/29 |
| 7,114,854 B2 * | 10/2006 | Hayashi et al. ............ 384/623 |
| 2003/0075244 A1 | 4/2003 | Kurebayashi et al. |
| 2007/0151634 A1 | 7/2007 | Fujita |
| 2010/0150489 A1 | 6/2010 | Maeda |

FOREIGN PATENT DOCUMENTS

| | | |
|---|---|---|
| JP | 8-135666 | 5/1996 |
| JP | 11-101246 | 4/1999 |
| JP | 11-241727 | 9/1999 |
| JP | 2000-061705 | 2/2000 |
| JP | 2000-144331 | 5/2000 |
| JP | 2000-212721 | 8/2000 |
| JP | 2001-323939 | 11/2001 |
| JP | 2002-060847 | 2/2002 |
| JP | 2002-180202 | 6/2002 |
| JP | 2002-339054 | 11/2002 |
| JP | 2002-348636 | 12/2002 |
| JP | 2002-364648 | 12/2002 |
| JP | 2003-176826 | 6/2003 |
| JP | 2003-183771 | 7/2003 |
| JP | 2003-301849 | 10/2003 |
| JP | 2003-336642 | 11/2003 |
| JP | 2004-027305 | 1/2004 |
| JP | 2004-044719 | 2/2004 |
| JP | 2004-092745 | 3/2004 |
| JP | 2004-092892 | 3/2004 |
| JP | 2004-099847 | 4/2004 |
| JP | 2004-124050 | 4/2004 |
| JP | 2004-125138 | 4/2004 |
| JP | 2004-132507 | 4/2004 |
| JP | 2005-008737 A | 1/2005 |
| JP | 2005-069321 | 3/2005 |
| JP | 2005-226683 | 8/2005 |
| JP | 2005-291342 | 10/2005 |
| JP | 2005-314794 * | 11/2005 |
| JP | 2005-344783 | 12/2005 |
| JP | 2006-009887 | 1/2006 |
| JP | 2006-046454 | 2/2006 |
| JP | 2006-089533 | 4/2006 |
| JP | 2006-317273 A | 11/2006 |
| JP | 2007-040383 A | 2/2007 |
| JP | 2008-285725 A | 11/2008 |
| WO | WO 01/96756 A1 | 12/2001 |

OTHER PUBLICATIONS

Office Action issued in Japanese Application No. 2007-153136 dated Jan. 8, 2013.

Office Action issued in Japanese Application No. 2007-156703 dated Jan. 8, 2013.

Decision to Grant Patent issued in Japanese Patent Application No. 2007-153136 dated Apr. 2, 2013.

Decision to Grant Patent issued in Japanese Patent Application No. 2007-156703 dated Apr. 2, 2013.

* cited by examiner

ROLLING MEMBER, ROLLING BEARING AND PROCESS FOR MANUFACTURING ROLLING MEMBER

RELATED APPLICATIONS

This application is the U.S. National Phase under 35 U.S.C. §371 of International Application No. PCT/JP2008/058634, filed on May 9, 2008, which in turn claims the benefit of Japanese Application Nos. 2007-131960, filed on May 17, 2007; 2007-153136, filed on Jun. 8, 2007; 2007-153137, filed on Jun. 8, 2007; 2007-156703, filed on Jun. 13, 2007 and 2007-162877, filed on Jun. 20, 2007, the disclosures of which Applications are incorporated by reference herein.

TECHNICAL FIELD

The present invention relates to a rolling member, a rolling bearing and a process for manufacturing the rolling member, and more specifically, it relates to a rolling member and a rolling bearing usable also in a severe environment such as a high-temperature environment or an environment infiltrated with water, and a process for manufacturing the rolling member.

BACKGROUND ART

In recent years, a rolling member such as a bearing component constituting a rolling bearing has increasingly been used in a severe environment. For example, a calendar roll support bearing of a papermaking machine or a roll support bearing of iron and steel rolling equipment is used in a high-temperature environment which is a temperature environment higher than ordinary temperature (room temperature), and hence lubricating oil for the bearing may be deteriorated or the viscosity of the lubricating oil may be reduced, to result in insufficient lubrication. Further, abrasion or a rust pit may be caused on a rolling surface which is a surface coming into contact with another rolling member on the surface of the rolling member due to water vapor in the atmosphere or cooling water, and the rolling member may be flaked in an early stage with the abrasion or the rust pit serving as a starting point. In other words, an oil film is broken due to insufficient lubrication and the rolling members come into metallic contact with each other on the rolling surfaces to cause surface damage (peeling or abrasion, for example), or the rolling surface is rusted due to water derived from the water vapor or the cooling water to cause surface damage from the rust serving as a starting point, to cause flaking in the rolling member in an early stage. Further, such a phenomenon (flaking resulting from hydrogen embrittlement) that hydrogen generated by decomposition of water infiltrating the bearing or hydrogen generated by decomposition of the lubricating oil with catalysts of nascent surfaces of metal appearing due to metallic contact between the rolling elements infiltrates the rolling members to cause flaking on the rolling surfaces in a short period is also problematic. When the rolling bearing is used in a high-temperature environment, there is also a problem of cracking resulting from use of the rolling bearing with remarkable fitting for avoiding dimensional change (secular dimensional change) in use and creep resulting from the dimensional change.

In relation to bearings used in a high-temperature environment, a large number of examinations for attaining long lives etc. have been made, and various countermeasures have been proposed (refer to Japanese Patent Laying-Open No. 7-19252 (Patent Document 1), Japanese Patent Laying-Open No. 2000-144331 (Patent Document 2), Japanese Patent Laying-Open No. 2003-183771 (Patent Document 3), Japanese Patent Laying-Open No. 2005-291342 (Patent Document 4), Japanese Patent Laying-Open No. 2005-344783 (Patent Document 5), Japanese Patent Laying-Open No. 5-179404 (Patent Document 6), Japanese Patent Laying-Open No. 2000-212721 (Patent Document 7), Japanese Patent Laying-Open No. 2001-323939 (Patent Document 8) and Japanese Patent Laying-Open No. 2002-60847 (Patent Document 9)).

Patent Document 1: Japanese Patent Laying-Open No. 7-19252
Patent Document 2: Japanese Patent Laying-Open No. 2000-144331
Patent Document 3: Japanese Patent Laying-Open No. 2003-183771
Patent Document 4: Japanese Patent Laying-Open No. 2005-291342
Patent Document 5: Japanese Patent Laying-Open No. 2005-344783
Patent Document 6: Japanese Patent Laying-Open No. 5-179404
Patent Document 7: Japanese Patent Laying-Open No. 2000-212721
Patent Document 8: Japanese Patent Laying-Open No. 2001-323939
Patent Document 9: Japanese Patent Laying-Open No. 2002-60847

DISCLOSURE OF THE INVENTION

Problems to be Solved by the Invention

In the prior art including the techniques disclosed in the aforementioned Patent Documents 1 to 9, however, there have been such problems in a rolling member assumed to be used in a high-temperature environment that the same is hard to work due to large quantities of alloying elements added to steel constituting the rolling member, the manufacturing cost is high, coarsening or segregation of a carbide is easily caused when carburization or carbonitriding is performed, cracking resistance is inferior, and the like. In such an environment that water infiltrates the bearing, further, there has also been such a problem that the life is remarkably reduced.

Accordingly, an object of the present invention is to provide a rolling member and a rolling bearing having a long life also in a high-temperature environment or an environment infiltrated with water while suppressing the contents of alloying elements causing reduction of the workability or increase of the manufacturing cost in the steel constituting the rolling member, and a process for manufacturing the rolling member.

Means for Solving the Problems

The rolling member according to the present invention is constituted of steel containing at least 0.3 mass % and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium with the rest consisting of iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass %. A hardened layer having a larger carbon content than an inner portion is formed on a region including the surface. The hardness of a surface layer portion of the hardened layer is at least 725 HV and not more than 800 HV, the maximum grain size of a carbide distributed in the surface layer portion is not more than 10 μm, and the area ratio of the carbide on the surface layer portion is at least 7% and not more than 25%. The hardness of the aforementioned inner portion is at least 450 HV and not more than 650 HV.

The hardened layer is a carburized layer or a carbonitrided layer formed by carburization or carbonitriding, for example. The surface layer portion of the hardened layer is a region at a distance of within 0.1 mm from the surface of the hardened layer.

In the rolling member according to the present invention, the content of silicon having a possibility of promoting flaking resulting from hydrogen embrittlement is reduced while the contents of alloying elements such as chromium, vanadium and molybdenum are suppressed while the balance between the contents is properly adjusted in the steel constituting the rolling member. In the rolling member according to the present invention, further, the size and the area ratio of the carbide on the surface layer portion of the hardened layer and hardness distribution in the rolling member are adjusted to proper ranges. Consequently, a rolling member having a long life also in a high-temperature environment or an environment infiltrated with water can be provided according to the inventive rolling member, while suppressing the contents of alloying elements causing reduction of the workability, increase of the manufacturing cost etc. in the steel constituting the rolling member.

The reasons why the ranges of the components of the steel constituting the rolling member according to the present invention have been limited in the aforementioned ranges are now described.

Carbon: at least 0.3 mass % and not more than 0.4 mass %

Crack resistance can be ensured and compressive stress can be supplied to the surface layer portion by performing carburization or carbonitriding on the rolling member. If low-carbon steel such as conventional carburized steel (case-hardened steel), such as steel having a carbon content of less than 0.3 mass %, for example, is employed as the material for the rolling member, however, internal hardness is so low that sufficient strength cannot be obtained when a large load or impact acts thereon. Therefore, the carbon content has been set to at least 0.3 mass % for ensuring sufficient internal hardness. If the carbon content in the material exceeds 0.4 mass %, on the other hand, workability is reduced, and compressive stress caused on the surface layer portion of the rolling member is reduced when carburization or carbonitriding is performed, while toughness of the rolling member is also reduced. Therefore, the carbon content has been set to not more than 0.4 mass %.

Silicon: at least 0.3 mass % and not more than 0.7 mass %

In general, silicon has been positively utilized since the same is an element supplying heat resistance at a low cost. In the rolling member used in a high-temperature environment or an environment infiltrated with water, however, it is apprehended that a high silicon content promotes flaking resulting from hydrogen embrittlement. Further, heat resistance can be complemented by other alloying elements. In consideration of these and in consideration of reduction of the workability and turnability/grindability resulting from addition of other alloying elements, the content of silicon has been set to not more than 0.7 mass %. On the other hand, silicon has a function of reinforcing the matrix of the steel and improving the strength and the rolling contact fatigue life of the rolling member. If the content of silicon is less than 0.3 mass %, this function is not sufficiently attained. Therefore, the silicon content has been set to at least 0.3 mass %.

Manganese: at least 0.3 mass % and not more than 0.8 mass %

Manganese is an alloying element essential for improving hardenability of the rolling member and improving the rolling contact fatigue life, while the same inhibits workability similarly to silicon. Therefore, the content of manganese has been set to not more than 0.8 mass % in consideration of the balance with respect to improvement of the hardenability and improvement of the rolling contact fatigue life caused by increasing the contents of other alloying elements. On the other hand, the lower limit of the content of manganese has been set to 0.3 mass % which is a level contained in ordinary high-alloy steel, in consideration of that manganese is an element essential for deoxidation in a steelmaking process.

Nickel: at least 0.5 mass % and not more than 1.2 mass %

Nickel is essential for ensuring the rolling contact fatigue life of the rolling member at a high temperature, and improves corrosion resistance and oxidation resistance at a high temperature. In order to ensure these effects, the content of nickel has been set to at least 0.5 mass %. If the content of nickel is large, on the other hand, the quantity of retained austenite in the rolling member is increased, and it is difficult to ensure hardness necessary for the rolling member. Further, nickel is a relatively high-priced alloying element, and a steel stock cost is increased if the content thereof is increased. Therefore, the content of nickel has been set to not more than 1.2 mass %.

Chromium: at least 1.6 mass % and not more than 2.5 mass %

Chromium is an element essential for ensuring the rolling contact fatigue life of the rolling member and the hardness at a high temperature. Further, chromium improves the oxidation resistance and the corrosion resistance similarly to nickel, by dissolving into the matrix of the steel constituting the rolling member. Ordinary bearing steel (JIS) also contains about 1.5 mass % of chromium, and a larger content is necessary in order to ensure sufficient characteristics in a high-temperature environment. Therefore, the content of chromium has been set to at least 1.6 mass %. On the other hand, chromium forms a carbide in the steel. The content of chromium has been set to not more than 2.5 mass % in consideration of that it is apprehended that the rolling contact fatigue life is reduced if the content of chromium is increased and a large-sized carbide is formed and in consideration of the balance between the content of chromium and the contents of other alloying elements such as molybdenum and vanadium forming carbides.

Molybdenum: at least 0.1 mass % and not more than 0.7 mass %

Molybdenum is essential for ensuring the rolling contact fatigue life of the rolling member in a high-temperature environment since the same improves the hardenability of the steel and improves temper softening resistance by forming a carbide. It is also conceivable that a carbide or a carbonitride of molybdenum traps hydrogen, and molybdenum is effective also for suppressing flaking resulting from hydrogen embrittlement. In order to ensure such effects, the content of molybdenum must be set to at least 0.1 mass %. On the other hand, molybdenum is a high-priced element and the content must be suppressed to the minimum in consideration of the cost, and hence the content of molybdenum has been set to not more than 0.7 mass % in consideration of the relation between the same and the contents of chromium and vanadium.

Vanadium: at least 0.2 mass % and not more than 0.4 mass %

Vanadium forms a fine carbide, deposits in a grain boundary (austenite grain boundary), refines crystal grains and improves the strength and the toughness of the rolling member. Further, a carbide of vanadium has an effect of functioning as a trap site of hydrogen and suppressing flaking resulting from hydrogen embrittlement. This effect is remarkable particularly when the rolling member is carburized or carbonitrided at a high temperature and subjected to high-temperature tempering. In order to ensure such an effect, vanadium must be added by at least 0.2 mass %. On the other hand, vanadium is a high-priced element and addition thereof must be suppressed to the minimum in consideration of the cost, and hence the content of vanadium has been set to not more than 0.4 mass % in consideration of the relation between the same and the contents of chromium and molybdenum.

The contents of impurity elements such as phosphorus, sulfur, aluminum and titanium are generally suppressed to low levels in bearing steel. Also in the steel constituting the rolling member according to the present invention, the contents of the impurity elements are preferably similarly suppressed to low levels. More specifically, the contents of the impurity elements are preferably suppressed in the following ranges:

Phosphorus: not more than 0.03 mass %

The content of phosphorus is preferably set to not more than 0.03 mass %, in order to suppress reduction of the toughness and reduction of the rolling contact fatigue life resulting from segregation.

Sulfur: not more than 0.03 mass %

Sulfur is bonded to manganese to reduce the aforementioned effects of manganese and forms a nonmetallic inclusion having a possibility of reducing the rolling contact fatigue life, and hence the content of sulfur is preferably set to not more than 0.03 mass %.

Aluminum: not more than 0.05 mass %

Aluminum easily causes formation of a nonmetallic inclusion although the same has an effect of improving the heat resistance, and hence the content of aluminum is preferably set to not more than 0.05 mass %.

Titanium: not more than 0.003 mass %

Titanium forms TiN (titanium nitride) which is a nonmetallic inclusion to cause reduction of the rolling contact fatigue life of the rolling member while it is apprehended that the same forms a starting point of flaking resulting from hydrogen embrittlement, and hence the content of titanium is preferably set to not more than 0.003 mass %.

The inventor has detailedly examined the balance between the contents of the alloying elements in the steel constituting the rolling member. Consequently, the inventor has found that a rolling member having a long life also in a high-temperature environment or an environment infiltrated with water can be provided while attaining improvement of the temper softening resistance and suppression of flaking resulting from hydrogen embrittlement in addition to improvement of the hardness and abrasion resistance of the rolling member at a high temperature and suppressing the contents of alloying elements, by satisfying the following relations:

Both of silicon and manganese reduce the workability of the rolling member. If the sum of the content of silicon and the content of manganese exceeds 1.0 mass %, it is apprehended that the workability is reduced and the manufacturing cost for the rolling member is increased. Therefore, the sum of the content of silicon and the content of manganese must be set to not more than 1.0 mass %.

Further, both of nickel and chromium improve the corrosion resistance and the oxidation resistance of the rolling member, as hereinabove described. In the rolling member used in a high-temperature environment, the sum of the content of nickel and the content of chromium must be at least 2.3 mass %.

All of chromium, molybdenum and vanadium tend to form carbides in the steel. If the sum of the content of chromium, the content of molybdenum and the content of vanadium exceeds 3.0 mass %, it is apprehended that large-sized carbides are formed in the steel and the rolling contact fatigue life and the crack resistance of the rolling member are reduced. Therefore, the sum of the content of chromium, the content of molybdenum and the content of vanadium must be set to not more than 3.0 mass %.

Further, the reason why the hardness of the rolling member according to the present invention and the structure related to the carbide contained in the rolling member have been limited in the aforementioned ranges are as follows:

The surface layer portion of the hardened layer formed on the rolling member, particularly the surface layer portion under a rolling surface of the rolling member receives rolling contact fatigue. If the hardness of the surface layer portion is less than 725 HV (61 HRC), it is apprehended that the rolling contact fatigue life of the rolling member is insufficient. Therefore, the hardness of the surface layer portion of the hardened layer must be set to at least 725 HV. In order to set the hardness of the surface layer portion of the hardened layer in the range exceeding 800 HV, on the other hand, a carbide of chromium or the like must be formed on the surface layer portion by at least a prescribed quantity. In this case, it is apprehended that the rolling contact fatigue life and the workability of the rolling member are reduced, as described later. Therefore, the hardness of the surface layer portion of the hardened layer must be set to not more than 800 HV.

A large-sized carbide present in the surface layer portion of the hardened layer formed on the rolling member, particularly the surface layer portion under the rolling surface of the rolling member forms a stress concentration source and can be a rupture starting point when receiving rolling contact fatigue. If a carbide exceeding 10 μm is present in the surface layer portion, it is apprehended that the rolling contact fatigue life of the rolling member is reduced. Therefore, the maximum grain size of the carbide distributed in the surface layer portion must be set to not more than 10 μm. When the rolling member is used in a severe environment, there is a possibility that a smaller carbide reduces the rolling contact fatigue life. Therefore, the maximum grain size of the aforementioned carbide is preferably not more than 5 μm.

If the quantity of the carbide in the surface layer portion of the hardened layer formed on the rolling member is increased, the workability of the surface layer portion, particularly the workability in a case of performing grinding is reduced. If the area ratio of the carbide on the surface layer portion exceeds 25%, it is apprehended that the workability of the surface layer portion is reduced to cause problems such as increase of the working cost and reduction of the working accuracy. Therefore, the area ratio of the carbide on the surface layer portion of the hardened layer must be set to not more than 25%. If the area ratio of the carbide is less than 7%, on the other hand, there is a possibility that the abrasion resistance of the rolling member is insufficient and the rolling contact fatigue life is reduced. Therefore, the area ratio of the carbide on the surface layer portion of the hardened layer must be set to at least 7%. In order to further improve the workability, the area ratio of the carbide is preferably not more than 20%.

The carbide is $Fe_3C$ (cementite) or a carbide (shown as M3C) in which Fe is substituted by an alloying element such as chromium or molybdenum, or M23C6 or M7C3.

If the hardness of the inner portion of the rolling member which is a region inside the hardened layer, more specifically the inner portion which is a region of at least 1.0 mm in depth from the surface of the rolling member is less than 450 HV, there is a possibility that cracking is caused when a relatively large load acts on the rolling member (internal cracking). Therefore, the hardness of the inner portion must be set to at least 450 HV. If the hardness of the internal portion exceeds 650 HV, on the other hand, it is apprehended that the toughness is reduced and the rolling member is easily broken when impactive force acts on the rolling member. Therefore, the hardness of the inner portion must be set to not more than 650 HV.

The maximum grain size and the area ratio of the carbide on the surface layer portion of the hardened layer can be surveyed as follows, for example: The rolling member is cut, and the cut surface is polished and thereafter etched with picral (picric alcohol solution). Then, 20 fields of a region corresponding to the surface layer portion are observed at random (400 magnifications, field area: 0.6 $mm^2$), and the maximum grain size and the area ratio of the carbide are surveyed with an image processing apparatus or the like. The hardness of the surface layer portion of the aforementioned hardened layer and the hardness of the inner portion can be surveyed by cutting the rolling member and measuring the hardness of the surface layer portion of the hardened layer and that of the inner portion with a Vickers hardness tester, for example.

Preferably in the aforementioned rolling member, the sum of the content of molybdenum and the content of vanadium is at least 0.6 mass % in the steel constituting the rolling member.

Both of molybdenum and vanadium form fine carbides or carbonitrides. The carbides or the carbonitrides function as trap sites of hydrogen, to suppress flaking resulting from hydrogen embrittlement. This effect is sufficiently attained by setting the sum of the content of molybdenum and the content of vanadium to at least 0.6 mass %.

Preferably in the aforementioned rolling member, the sum of the content of molybdenum and the content of vanadium is not more than half the content of chromium in the steel constituting the rolling member.

Molybdenum and vanadium are relatively high-priced alloying elements, as hereinabove described. The manufacturing cost can be suppressed by setting the sum of the content of molybdenum and the content of vanadium to not more than half the content of chromium.

Preferably in the aforementioned rolling member, the content of silicon is not more than the sum of the content of molybdenum and the content of vanadium in the steel constituting the rolling member.

As hereinabove described, it is apprehended that silicon promotes flaking resulting from hydrogen embrittlement, while molybdenum and vanadium have functions of suppressing flaking resulting from hydrogen embrittlement. Flaking resulting from hydrogen embrittlement can be sufficiently suppressed in the rolling member by setting the content of silicon to not more than the sum of the content of molybdenum and the content of vanadium.

Preferably in the aforementioned rolling member, the hardness of the surface layer portion of the hardened layer is at least 550 HV in a case where a treatment of holding the same at a temperature of 500° C. for 60 minutes is performed.

When the rolling member is used in a high-temperature environment, it is apprehended that the hardness of the rolling member is reduced and the rolling contact fatigue life is reduced. By setting the hardness of the surface layer portion of the hardened layer, particularly the surface layer portion under the rolling surface to at least 550 HV when the treatment of holding the same at a temperature of 500° C. for 60 minutes is performed, the rolling contact fatigue life in the high-temperature environment is sufficiently ensued.

The aforementioned rolling member can be used in a machine tool working a workpiece by rotation of a main spindle as a machine tool rolling member constituting a machine tool rolling bearing supporting the rotationally driven main spindle to be rotatable with respect to a member arranged adjacently to the main spindle.

The aforementioned rolling member having a long life also in a high-temperature environment or an environment infiltrated with water while suppressing the contents of alloying elements causing reduction of the workability and increase of the manufacturing cost in the steel constituting the rolling member is suitable as the machine tool rolling member.

The aforementioned rolling member can be used as an automobile electrical equipment/auxiliary device rolling member constituting an automobile electrical equipment/auxiliary device rolling bearing supporting a rotationally driven rotating member to be rotatable with respect to a member arranged adjacently to the rotating member in an automobile electrical equipment/auxiliary device.

The aforementioned rolling member having a long life also in a high-temperature environment while suppressing the contents of alloying elements causing reduction of the workability and increase of the manufacturing cost in the steel constituting the rolling member is suitable as the automobile electrical equipment/auxiliary device rolling member.

The aforementioned rolling member can be used as a transmission rolling member constituting a transmission rolling bearing supporting a rotor to be rotatable with respect to a member around the rotor in a transmission including a gear mechanism consisting of a plurality of gears and changing a transmission gear ratio stepwise by meshing the gears.

The aforementioned rolling member can be used as a transmission rolling member constituting a transmission rolling bearing employed in a continuously variable transmission in which rotation of an input shaft is transmitted to an output shaft while changing in a non-stage manner, for rotatably supporting either one of the input shaft and the output shaft.

The aforementioned rolling member having a long life also in a high-temperature environment while suppressing the contents of alloying elements causing reduction of the workability and increase of the manufacturing cost in the steel constituting the rolling member is suitable as the transmission rolling member.

The aforementioned rolling member can be used as a needle roller bearing rolling member constituting a needle roller bearing including a needle roller in which the diameter of the roller as a rolling element is not more than 5 mm and the length of the roller is at least three times and not more than 10 times the diameter of the roller.

The aforementioned rolling member having a long life also in a high-temperature environment while suppressing the contents of alloying elements causing reduction of the workability and increase of the manufacturing cost in the steel constituting the rolling member is suitable as the needle roller bearing rolling member.

The rolling bearing according to the present invention includes a raceway member and a plurality of rolling elements arranged on an annular raceway in contact with the raceway member. At least either one of the raceway member and the rolling elements is the aforementioned rolling member according to the present invention.

According to the inventive rolling bearing, a rolling bearing having a long life also in a high-temperature environment or an environment infiltrated with water can be provided while suppressing the contents of alloying elements in steel constituting the rolling member, due to the provision of the aforementioned rolling member according to the present invention.

The process for manufacturing a rolling member according to the present invention includes the steps of preparing a steel member, quench-hardening the steel member and tempering the steel member. In the step of preparing the steel member, a steel member consisting of steel containing at least 0.3 mass % and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium with the rest consisting of iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass % and formed into a rough shape of a rolling member is prepared.

In the step of quench-hardening the steel member, the steel member is quench-hardened by performing carburization or carbonitriding on the prepared steel member and thereafter cooling the steel member from a temperature of at least a point $A_1$ to a temperature of not more than a point $M_S$. In the step of tempering the steel member, the steel member is heated to a temperature range of at least 150° C. and not more than 300° C. to be tempered.

In the process for manufacturing a rolling member according to the present invention, the steel member consisting of the steel having the aforementioned component composition suppressing the contents of alloying elements causing reduction of the workability and increase of the manufacturing cost and capable of improving hardness and abrasion resistance at a high temperature, improving temper softening resistance and suppressing flaking resulting from hydrogen embrittlement is prepared in the step of preparing the steel member. After a hardened layer is formed in the step of quench-hardening the steel member, the steel member is heated to the proper temperature range to be tempered in the step of tempering the steel member. Consequently, a rolling member having a long life also in a high-temperature environment or an environment infiltrated with water can be manufactured according to the inventive process for manufacturing a rolling member, while suppressing the contents of alloying elements causing reduction of the workability or increase of the manufacturing cost in steel constituting the rolling member.

In order to suppress dimensional change and improve durability in a case where the rolling member is used in a high-temperature environment, the steel member is preferably heated to a temperature range of at least 200° C. to be tempered, more preferably heated to a temperature range of at least 240° C. to be tempered in the step of tempering the steel member.

Effects of the Invention

As obvious from the above description, a rolling member and a rolling bearing having a long life also in a high-temperature environment or an environment infiltrated with water, and a process for manufacturing the rolling member can be provided according to the inventive rolling member, the inventive rolling bearing and the inventive process for manufacturing the rolling member, while suppressing the contents of alloying elements causing reduction of the workability or increase of the manufacturing cost in steel constituting the rolling member.

Figure 1:
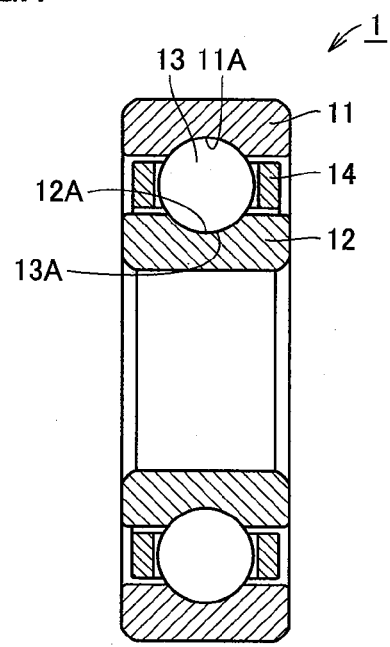
FIG. 1 is a schematic sectional view showing the structure of a deep-groove ball bearing including a rolling member according to a first embodiment.

DESCRIPTION OF THE REFERENCE SIGNS 1 deep-groove ball bearing, 2 self-aligning ball bearing, 3 quadruple conical roller bearing, 11, 21, 31 outer race, 11A, 21A, 31A outer race rolling surface, 11B, 12B, 13B hardened layer, 11C, 12C, 13C inner portion, 12, 22, 32 inner race, 12A, 22A, 32A inner race rolling surface, 13 ball, 23, 33 roller, 14, 24, 34 cage, 40 Savant abrasion tester, 41 abrasion test piece, 42 weight, 43 load cell, 44 air slider, 45 counter material, 46 lubricating oil, 50 ultrasonic fatigue tester, 51 ultrasonic fatigue test piece, 52 horn portion, 53 vibrator, 54 amplifier, 55 control unit, 56 clearance gauge, 57 oscilloscope, 60 two-cylinder rolling tester, 61 first test piece (counter test piece), 62 second test piece (test piece), 63 first shaft, 64 second shaft, 65 tachometer, 66 slip ring, 61 crush test piece, 72 load direction, 80 ring rotation cracking fatigue tester, 81 ring rotation cracking fatigue test piece, 82 driving roller, 83 load roller, 84 guide roller, 85 pad, 86 oil feeding nozzle, 90 φ12 point contact tester, 91 rolling contact fatigue life test piece, 92 driving roller, 93 guide roller, 94 steel ball, 100 manual transmission, 111 input shaft, 112 output shaft, 113 counter shaft, 114a to 114k gear, 115 housing, 120A, 120B rolling bearing, 200 torque converter, 201 impeller, 201a impeller blade, 201b impeller hub, 202 stator, 203 turbine, 203a turbine blade, 203b turbine hub, 204 one-way clutch, 205a, 205b, 206a, 206b washer, 210 thrust needle roller bearing, 300 gear mechanism portion, 301, 311 shaft, 302 case, 304 synchro hub, 305, 307 idle gear, 305a clutch gear, 306 radial ball bearing, 308, 313 radial roller bearing, 309 large-diametral shaft portion, 309a, 309b section, 315, 317 gear, 318 scissors gear, 400 continuously variable transmission, 401 primary shaft, 401a shaft, 401b sun gear, 402 primary pulley, 402a fixed pulley, 402b movable pulley, 403 secondary shaft, 404 secondary pulley, 404a fixed pulley, 404b movable pulley, 405 belt, 406 housing, 407 radial ball bearing, 410 forward/backward movement switching mechanism, 412 support member, 412 planetary pinion, 413 support member, 413a ring gear, 415, 416 multiple disc clutch, 501 angular ball bearing, 502 cylindrical roller bearing, 511, 521 outer race, 511A, 521A outer race rolling surface, 511B, 512B, 513B hardened layer, 511C, 512C, 513C inner portion, 512, 522 inner race, 512A, 522A inner race rolling surface, 513 ball, 513A ball rolling surface, 514, 524 cage, 523A roller rolling surface, 590 machine tool, 591 main spindle, 591A outer peripheral surface, 591B forward end, 592 housing, 592A inner wall, 593 motor, 593A motor stator, 593B motor rotor, 601 grease-sealed deep-groove ball bearing, 611 outer race, 611A outer race rolling surface, 611B, 612B, 613B hardened layer, 611C, 612C, 613C inner portion, 612 inner race, 612A inner race rolling surface, 613 ball, 613A ball rolling surface, 614 cage, 615 sealing member, 616 grease composition, 690 alternator, 691 rotor, 691A rotor coil, 692 rotor shaft, 692A outer peripheral surface, 693 stator, 693A stator coil, 694 housing, 699 alternator pulley, 699A groove portion, 710 pulley, 711 pulley body, 711A outer peripheral surface, 711B inner peripheral surface, 711C inner peripheral cylindrical portion, 711D flange portion, 711E outer peripheral cylindrical portion, 711F collar portion, 719 shaft, 720 fan coupling, 721 case, 721A through-hole, 722 oil chamber, 723 stirring chamber, 724 partition plate, 725 port, 726 spring, 727 bimetal, 728 piston, 729 drive disc, 729A fin, 730 circulation hole, 731 rotor, 732 fan, 801 deep-groove ball bearing, 802, 803 thrust needle roller bearing, 811 outer race, 811A outer race rolling surface, 811B, 812B, 813B hardened layer, 811C, 812C, 813C inner portion, 812 inner race, 812A inner race rolling surface, 813 ball, 813A ball rolling surface, 814, 824, 824a, 824b cage, 821 bearing washer, 821A bearing washer rolling surface, 823 needle roller, 823A roller rolling surface, 901 thrust needle roller bearing, 902 radial needle roller bearing, 911 bearing washer, 911A bearing washer rolling surface, 911B, 913B hardened layer, 911C, 913C inner portion, 913, 923 needle roller, 913A roller rolling surface, 914, 924 cage, 921 outer race, 921A outer race rolling surface, 922 inner race, 922A inner race rolling surface.

BEST MODES FOR CARRYING OUT THE INVENTION

Embodiments of the present invention are now described with reference to the drawings. In the following drawings, identical or corresponding portions are denoted by the same reference signs, and description thereof is not repeated.

First Embodiment

First, the structures of a deep-groove ball bearing as a rolling bearing and bearing races and balls as rolling members according to a first embodiment of the present invention are described with reference to FIGS. 1 and 2.

Figure 2:
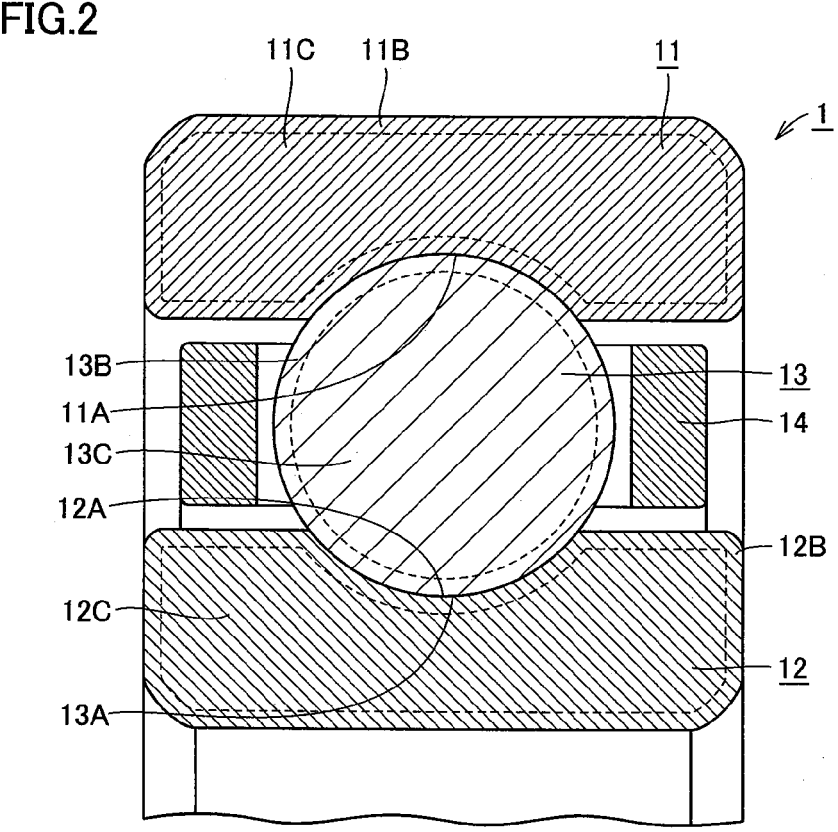
FIG. 2 is a schematic partial sectional view showing a principal part of FIG. 1 in an enlarged manner.

Referring to FIG. 1, a deep-groove ball bearing 1 according to the first embodiment includes an annular outer race 11, an annular inner race 12 arranged inside outer race 11 and a plurality of balls 13 as rolling elements arranged between outer race 11 and inner race 12 and held in an annular cage 14. An outer race rolling surface 11A is formed on the inner peripheral surface of outer race 11, while an inner race rolling surface 12A is formed on the outer peripheral surface of inner race 12. Outer race 11 and inner race 12 are so arranged that inner race rolling surface 12A and outer race rolling surface 11A are opposed to each other. Plurality of balls 13 are in contact with inner race rolling surface 12A and outer race rolling surface 11A and arranged by cage 14 at a prescribed pitch in the peripheral direction, to be held on an annular raceway in a rollable manner. In balls 13, the overall surfaces thereof are rolling surfaces. According to the aforementioned structure, outer race 11 and inner race 12 of deep-groove ball bearing 1 are relatively rotatable with respect to each other.

Outer race 11, inner race 12 and balls 13 as rolling members constituting deep-groove ball bearing 1 which is a rolling bearing are described. Referring to FIGS. 1 and 2, outer race 11, inner race 12 and balls 13 are constituted of steel containing at least 0.3 mass % and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium with the rest consisting of iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass %.

Further, hardened layers 11B, 12B and 13B having larger carbon contents than respective inner portions 11C, 12C and 13C are formed on regions including the surfaces of outer race 11, inner race 12 and balls 13. The hardness of surface layer portions of hardened layers 11B, 12B and 13B is at least 725 HV and not more than 800 HV. Further, the maximum grain sizes of carbides distributed in the surface layer portions of hardened layers 11B, 12B and 13B are not more than 10 µm, and the area ratios of the carbides on the surface layer portions are at least 7% and not more than 25%. In addition, the hardness of inner portions 11C, 12C, 13C of the respective ones of outer race 11, inner race 12 and balls 13 is at least 450 HV and not more than 650 HV.

In outer race 11, inner race 12 and balls 13 as the rolling members according to the first embodiment, the content of silicon having a possibility of promoting flaking resulting from hydrogen embrittlement is reduced and the contents of alloying elements such as chromium, vanadium and molybdenum are suppressed while the balance between the contents is properly adjusted in the steel constituting outer race 11, inner race 12 and balls 13. In outer race 11, inner race 12 and balls 13 according to the first embodiment, further, the sizes and the area ratios of the carbides on the surface layer portions of hardened layers 11B, 12B and 13B and hardness distributions in outer race 11, inner race 12 and balls 13 are adjusted to proper ranges. Consequently, outer race 11, inner race 12 and balls 13 according to the first embodiment form rolling members having long lives also in a high-temperature environment or an environment infiltrated with water while the contents of alloying elements causing reduction of the workability and increase of the manufacturing cost are suppressed in the steel constituting outer race 11, inner race 12 and balls 13. Further, deep-groove ball bearing 1 as the rolling bearing according to the first embodiment forms a rolling bearing having a long life also in a high-temperature environment or an environment infiltrated with water while the contents of alloying elements are suppressed in the steel constituting the rolling members.

In outer race 11, inner race 12 and balls 13 according to the first embodiment, the sum of the content of molybdenum and the content of vanadium is preferably at least 0.6 mass % in the steel constituting these. Thus, fine carbides or carbonitrides of molybdenum and vanadium functioning as trap sites of hydrogen are formed, and occurrence of flaking resulting from hydrogen embrittlement is suppressed.

In outer race 11, inner race 12 and balls 13 according to the first embodiment, the sum of the content of molybdenum and the content of vanadium is preferably not more than half the content of chromium in the steel constituting these. Thus, the manufacturing cost for these can be suppressed.

In outer race 11, inner race 12 and balls 13 according to the first embodiment, the content of silicon is preferably not more than the sum of the content of molybdenum and the content of vanadium in the steel constituting these. Thus, flaking resulting from hydrogen embrittlement can be further suppressed by molybdenum and vanadium while suppressing promotion of flaking resulting from hydrogen embrittlement by silicon.

In outer race 11, inner race 12 and balls 13 according to the first embodiment, the hardness of the surface layer portions of hardened layers 11B, 12B and 13B is preferably at least 550 HV in a case where a treatment of holding the same at a temperature of 500° C. for 60 minutes is performed. Thus, a rolling contact fatigue life in a high-temperature environment is sufficiently ensured.

A process for manufacturing the rolling members and the rolling bearing according to the first embodiment is now described.

Figure 3:
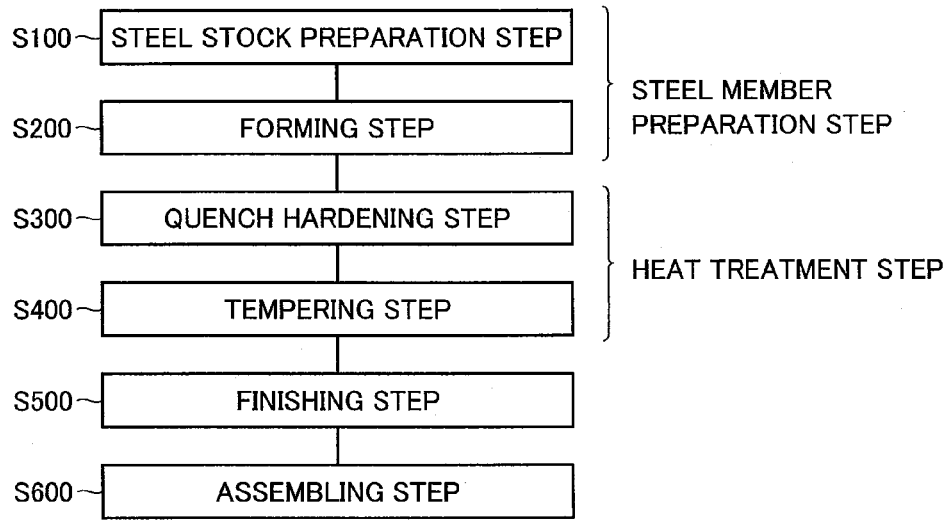
FIG. 3 is a flow chart showing the outline of a process for manufacturing a rolling member and a rolling bearing according to the first embodiment.

Referring to FIG. 3, a steel stock preparation step of preparing a steel stock constituted of steel containing at least 0.3 mass % and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium with the rest consisting of iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass % is carried out at a step (S100). More specifically, steel bars or steel wires having the aforementioned components are prepared, for example.

Then, a forming step of preparing steel members formed into rough shapes of the rolling members is carried out by forming the aforementioned steel members in a step (S200). More specifically, steel members formed into rough shapes of outer race 11, inner race 12 and balls 13 shown in FIGS. 1 and 2 are prepared by performing working such as forging and turning on the aforementioned steel bars or steel wires. The aforementioned steps (S100) and (S200) constitute a steel member preparation step in which the steel members formed into rough shapes of the rolling members are prepared.

Then, a quench hardening step of performing carburization or nitriding on the steel members and thereafter quench-hardening the steel members by cooling the same from a temperature of at least a point $A_1$ to a temperature of not more than a point $M_S$ is carried out in a step (S300). Thereafter a tempering step of tempering the quench-hardened steel members by heating the same to a temperature range of at least 150° C. and not more than 300° C. is carried out in a step (S400). The aforementioned steps (S300) and (S400) constitute a heat treatment step of heat-treating the steel members. The details of this heat treatment step are described later.

Then, a finishing step is carried out in a step (S500). More specifically, finishing such as grinding is performed on the steel members subjected to the heat treatment step, whereby outer race 11, inner race 12 and balls 13 are finished. Thus, the process of manufacturing the rolling members in the first embodiment is completed, and outer race 11, inner race 12 and balls 13 as the rolling members are completed.

Further, an assembling step is carried out in a step (S600). More specifically, outer race 11, inner race 12 and balls 13 prepared in the steps (S100) to (S500) and separately prepared cage 14 etc. are combined and assembled into deep-groove ball bearing 1 as the rolling bearing according to the first embodiment. Thus, the process for manufacturing a rolling bearing according to the first embodiment is completed, and deep-groove ball bearing 1 as the rolling bearing is completed.

Figure 4:
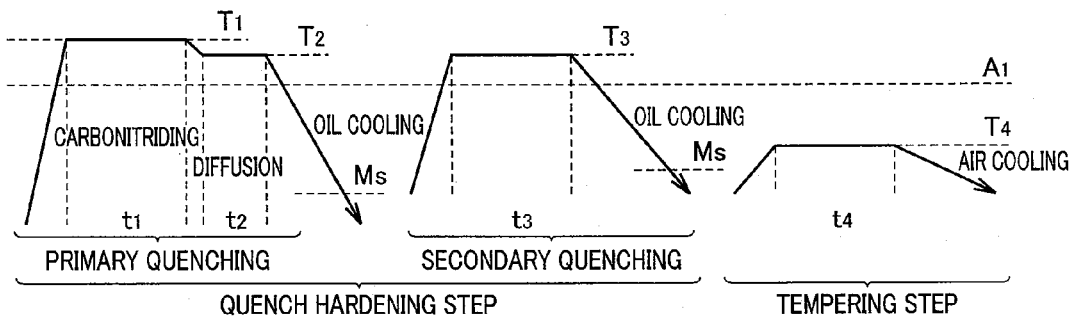
FIG. 4 is a diagram for illustrating a heat treatment step included in the process for manufacturing a rolling member according to the first embodiment.

The details of the heat treatment step are now described. Referring to FIG. 4, the transverse direction shows the time, and indicates that the time elapses rightward. Referring to FIG. 4, further, the vertical direction shows the temperature, and indicates that the temperature is increased upward.

Referring to FIG. 4, the steel members prepared in the step (S200) are first heated to a temperature $T_1$ which is the temperature of at least the point $A_1$, and held by a time $t_1$. At this time, the steel members are heated in an atmosphere containing RX gas and ammonia gas, for example. Thus, carbon concentrations and nitrogen concentrations around the surfaces of the steel members are adjusted to desired concentrations. Carbonitriding is completed through the aforementioned procedure. Then, diffusion treatment of cooling the steel members to a temperature $T_2$ which is a temperature of at least the point $A_1$ and not more than $T_1$ and holding the same at the temperature $T_2$ by a time $t_2$ is performed. Thus, carbon and nitrogen infiltrating the steel members are diffused, and the quantities of carbides remaining after the heat treatment and the quantity of retained austenite can be controlled. Thereafter the steel members are dipped into oil (oil cooling), for example, to be cooled from the temperature of at least the point $A_1$ to the temperature of not more than the point $M_S$. Thus, primary quenching is completed. Further, the steel members are reheated to a temperature $T_3$ which is a temperature of at least the point $A_1$ and not more than $T_1$, held by a time $t_3$, and thereafter dipped into oil (oil cooling), for example, to be cooled from the temperature of at least the point $A_1$ to the temperature of not more than the point $M_S$. Thus, secondary quenching is completed. The quench hardening step is completed through the aforementioned steps.

Then, the tempering step is carried out by heating the quench-hardened steel members to a temperature $T_4$ which is a temperature of not more than the point $A_1$, holding the same by a time $t_4$ and thereafter air-cooling (standing to cool) the same to room temperature, for example. The heat treatment step according to this embodiment is completed through the aforementioned steps.

The temperature $T_1$ is a temperature of at least 900° C. and not more than 980° C., for example, and preferably a temperature of at least 930° C. and not more than 960° C. in particular, in consideration of the component composition of the steel constituting the steel members in this embodiment. The temperature $T_2$ is a temperature of at least 850° C. and not more than 960° C., for example, and preferably a temperature of at least 900° C. and not more than 960° C. in particular, in consideration of the component composition of the steel constituting the steel members in this embodiment. On the other hand, the time $t_1$ is at least 360 minutes and not more than 720 minutes, for example, and the time $t_2$ is at least 90 minutes and not more than 300 minutes, for example. Further, the temperature $T_3$ is a temperature of at least 800° C. and not more than 900° C., for example, and preferably a temperature of at least 840° C. and not more than 880° C. in particular, in consideration of the component composition of the steel constituting the steel members in this embodiment. On the other hand, the time $t_3$ is at least 20 minutes and not more than 60 minutes, for example.

A carbon potential ($C_P$) value at the time when carbonitriding is performed is at least 0.9 and not more than 1.4, for example, and preferably at least 1.1 and not more than 1.3 in particular, in consideration of the component composition of the steel constituting the steel members in this embodiment. On the other hand, the $C_P$ values at the time when diffusion treatment is performed and the time when secondary quenching is performed can be set to at least 0.6 and not more than 1.2 and to at least 0.6 and not more than 1.0 respectively, for example. Further, the ammonia concentration in the atmosphere at the time when carbonitriding is performed is at least 5 volume % and not more than 20 volume %, for example, and preferably at least 8 volume % and not more than 15 volume % in particular, in consideration of the component composition of the steel constituting the steel members in this embodiment.

The temperature $T_4$ is a temperature of at least 150° C. and not more than 300° C., for example, and preferably a temperature of at least 200° C. and not more than 260° C. in particular, in consideration of the component composition of the steel constituting the steel members in this embodiment. On the other hand, the time $t_4$ is at least 60 minutes and not more than 180 minutes, for example.

The point $A_1$ denotes a point corresponding to a temperature at which the structure of the steel starts transforming from ferrite to austenite. The point $M_S$ denotes a point corresponding to a temperature at which the structure of the steel starts martensiting when austenited steel is cooled. The carbon potential is a value indicating the concentration of carbon contained in a surface layer portion of the steel when carburization/decarburization reaction reaches equilibrium and the concentration of carbon contained in the steel reaches a constant value and indicating carburizability in the atmosphere for heating the steel. In other words, the carburizability is increased as the carbon potential is increased. The carbon potential of atmosphere gas can be calculated by measuring the temperature of the atmosphere gas and the composition of the atmosphere gas, i.e., the concentrations of carbon monoxide and oxygen or the concentrations of carbon monoxide and carbon dioxide, for example.

Figure 5:
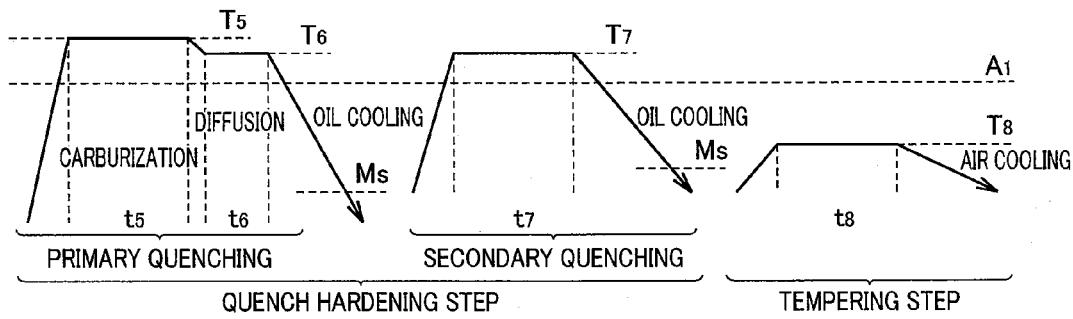
FIG. 5 is a diagram for illustrating a modification of the heat treatment step included in the process for manufacturing a rolling member according to the first embodiment.

The details of a modification of the heat treatment step in this embodiment are now described with reference to FIG. 5. Referring to FIG. 5, the transverse direction shows the time, and indicates that the time elapses rightward. Referring to FIG. 5, further, the vertical direction shows the temperature, and indicates that the temperature is increased upward.

Referring to FIG. 5, the heat treatment step in the modification of this embodiment is carried out basically similarly to the heat treatment step in the aforementioned embodiment. In place of the carbonitriding in the heat treatment step in the aforementioned embodiment, however, carburization is performed in the modification. In other words, the steel members prepared in the step (S200) are first heated to a temperature $T_5$ which is a temperature of at least the point $A_1$, and held by a time $t_5$. At this time, the steel members are heated in an atmosphere containing RX gas, for example. Thus, carbon concentrations around the surfaces of the steel members are adjusted to desired concentrations. Carburization is completed through the aforementioned procedure. Thereafter diffusion treatment is performed by cooling the steel members to a temperature $T_6$ which is a temperature of at least the point $A_1$ and not more than $T_5$ and holding the same at the temperature $T_6$ by a time $t_6$. Thus, carbon infiltrating the steel members is diffused, and the quantities of carbides remaining after the heat treatment and the quantity of retained austenite can be controlled. Thereafter the steel members are dipped into oil (oil cooling), for example, to be cooled from the temperature of at least the point $A_1$ to the temperature of not more than the point $M_S$. Thus, primary quenching is completed. Further, the steel members are reheated to a temperature $T_7$ which is a temperature of at least the point $A_1$ and not more than $T_5$, held by a time $t_7$, and thereafter dipped into oil (oil cooling), for example, to be cooled from the temperature of at least the point $A_1$ to the temperature of not more than the point $M_S$. Thus, secondary quenching is completed. The quench hardening step is completed through the aforementioned steps.

Further, the tempering step is carried out by heating the quench-hardened steel members to a temperature $T_8$ which is a temperature of not more than the point $A_1$, holding the same by a time $t_8$ and thereafter air-cooling (standing to cool) the same to room temperature, for example. The heat treatment step according to the modification of this embodiment is completed through the aforementioned steps.

The temperature $T_5$ is a temperature of at least 900° C. and not more than 980° C., for example, and preferably a temperature of at least 930° C. and not more than 960° C. in particular, in consideration of the component composition of the steel constituting the steel members in this embodiment. The temperature $T_6$ is a temperature of at least 850° C. and not more than 960° C., for example, and preferably a temperature of at least 900° C. and not more than 960° C. in particular, in consideration of the component composition of the steel constituting the steel members in this embodiment. On the other hand, the time $t_5$ is at least 360 minutes and not more than 720 minutes, for example, and the time $t_6$ is at least 90 minutes and not more than 300 minutes, for example. Further, the temperature $T_7$ is a temperature of at least 800° C. and not more than 900° C., for example, and preferably a temperature of at least 850 C and not more than 880° C. in particular, in consideration of the component composition of the steel constituting the steel members in this embodiment. On the other hand, the time $t_7$ is at least 20 minutes and not more than 60 minutes, for example.

A carbon potential ($C_P$) value at the time when carburization is performed is at least 0.9 and not more than 1.4, for example, and preferably at least 1.1 and not more than 1.3 in particular, in consideration of the component composition of the steel constituting the steel members in this embodiment. On the other hand, the $C_P$ values at the time when diffusion treatment is performed and the time when secondary quenching is performed can be set to at least 0.6 and not more than 1.2 and to at least 0.6 and not more than 1.0 respectively, for example.

The temperature $T_8$ is a temperature of at least 150° C. and not more than 300° C., for example, and preferably a temperature of at least 180° C. and not more than 240° C. in particular, in consideration of the component composition of the steel constituting the steel members in this embodiment. On the other hand, the time $t_o$ is at least 60 minutes and not more than 180 minutes, for example.

In each of the heat treatment steps in the aforementioned embodiment and the modification thereof, the secondary quenching is performed after the carburization or the carbonitriding. Thus, the grain size number of austenite crystal grains (prior austenite crystal grains) in the steel constituting the rolling members can be increased (the crystal grain sizes can be reduced), and the structure of the steel can be refined. Consequently, the rolling contact fatigue lives, toughness etc. of the rolling members can be improved. In each of the heat treatment steps in the aforementioned embodiment and the modification thereof, on the other hand, the aforementioned secondary quenching can also be omitted in consideration of the service condition of the rolling members. Thus, the manufacturing cost for the rolling members can be reduced.

Hardened layers 11B, 12B and 13B which are carburized layers or carbonitrided layers are formed on the surfaces of outer race 11, inner race 12 and balls 13 as the rolling members, more specifically the regions including the rolling surfaces, through the aforementioned heat treatment step. The hardness of the surface layer portions of hardened layers 11B, 12B and 13B, the maximum grain sizes of the carbides distributed in the surface layer portions of hardened layers 11B, 12B and 13B and the area ratios of the carbides on the surface layer portions of hardened layers 11B, 12B and 13B can be set to at least 725 HV and not more than 800 HV, to not more than 10 μm and to at least 7% and not more than 25% respectively, while the hardness of inner portions 11C, 12C and 13C which are the regions inside the surface layer portions of hardened layers 11B, 12B and 13B can be set to at least 450 and not more than 650 HV.

In the process for manufacturing a rolling member according to each of the aforementioned embodiment and the modification thereof, the steel members consisting of the steel having the aforementioned component composition suppressing the contents of alloying elements causing reduction of the workability and increase of the manufacturing cost and capable of improving hardness and abrasion resistance at a high temperature, improving temper softening resistance and suppressing flaking resulting from hydrogen embrittlement are prepared in the steel member preparation step. After hardened layers 11B, 12B and 13B are formed on the steel members in the quench hardening step, the steel members are heated to the proper temperature range and subjected to tempering in the tempering step. Consequently, rolling members having long lives also in a high-temperature environment or an environment infiltrated with water can be manufactured according to the process for manufacturing a rolling member in each of the aforementioned embodiment and the modification thereof, while suppressing the contents of alloying elements causing reduction of the workability and increase of the manufacturing cost in the steel constituting the rolling members.

Second Embodiment

Rolling members and a rolling bearing according to a second embodiment are now described.

Figure 6:
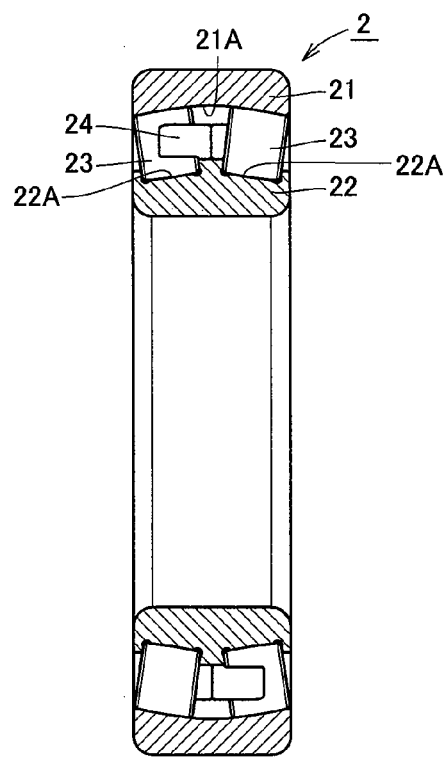
FIG. 6 is a schematic sectional view showing the structure of a self-aligning roller bearing including a rolling member according to a second embodiment.

Referring to FIG. 6, a self-aligning roller bearing 2 basically has a structure similar to that of deep-groove ball bearing 1 described with reference to FIGS. 1 and 2. In shapes of bearing races and rolling elements, however, self-aligning roller bearing 2 according to the second embodiment is different from deep-groove ball bearing 1 according to the first embodiment.

In self-aligning roller bearing 2, the inner peripheral surface of an outer race 21 is in the form of a spherical surface whose center aligns with the bearing center, two rows of raceway grooves are formed on the outer peripheral surface of an inner race 22, and two rows of barrel-shaped rollers 23 held by a cage 24 are provided between outer race 21 and inner race 22. Alignability against inclination of a shaft or the like is obtained due to the two rows of barrel-shaped rollers 23. In rollers 23, the overall outer peripheral surfaces thereof are rolling surfaces.

The bearing races (outer race 21 and inner race 22) and rollers 23 of self-aligning roller bearing 2 as rolling members correspond to the bearing races (outer race 11 and inner race 12) and balls 13 of deep-groove ball bearing 1 shown in FIG. 1, and have similar structures. In other words, hardened layers similar to those of outer race 11, inner race 12 and balls 13 described with reference to FIG. 2 are formed on regions including the surfaces of outer race 21, inner race 22 and rollers 23, while the hardness of inner portions is also at least 450 HV and not more than 650 HV.

Consequently, outer race 21, inner race 22 and rollers 23 according to the second embodiment are rolling members having long lives also in a high-temperature environment or an environment infiltrated with water, while the contents of alloying elements causing reduction of the workability and increase of the manufacturing cost are suppressed in the steel constituting outer race 21, inner race 22 and rollers 23. Further, self-aligning roller bearing 2 as the rolling bearing according to the second embodiment is a rolling bearing having a long life also in a high-temperature environment or an environment infiltrated with water, while the contents of alloying elements are suppressed in the steel constituting the rolling members. Therefore, self-aligning roller bearing 2 is suitable for a calendar roll support bearing of a papermaking machine, for example.

Self-aligning roller bearing 2 according to this embodiment can be manufactured by a manufacturing process similar to that for deep-groove ball bearing 1 described in the first embodiment.

Third Embodiment

Rolling members and a rolling bearing according to a third embodiment are now described.

Figure 7:
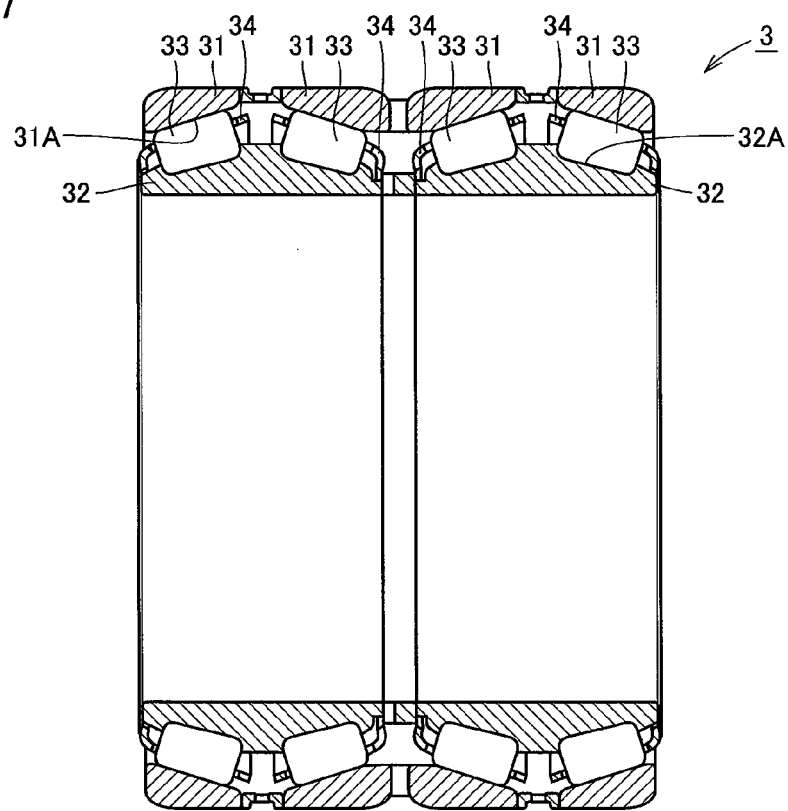
FIG. 7 is a schematic sectional view showing the structure of a quadruple conical roller bearing including a rolling member according to a third embodiment.

Referring to FIG. 7, a quadruple conical roller bearing 3 basically has a structure similar to that of deep-groove ball bearing 1 described with reference to FIGS. 1 and 2. In shapes of bearing races and rolling elements, however, quadruple conical roller bearing 3 according to the third embodiment is different from deep-groove ball bearing 1 according to the first embodiment.

In other words, quadruple conical roller bearing 3 includes four annular outer races 31, two annular inner races 32 arranged inside outer races 31, and a plurality of conical rollers 33 arranged between outer races 31 and inner races 32. Four outer races 31 and two inner races 32 are so arranged that the outer peripheral surfaces of inner races 32 are opposed to the inner peripheral surfaces of two outer races 31 respectively. Further, plurality of rollers 33 are in contact with outer race rolling surfaces 31A formed on the inner peripheral surfaces of outer races 31 and inner race rolling surfaces 32A formed on the outer peripheral surfaces of inner races 32 along the respective ones of the inner peripheral surfaces of outer races 31 and held by a cage 34 to be arranged at a prescribed pitch in the peripheral direction, and held on four rows of annular raceways in a rollable manner. According to the aforementioned structure, outer races 31 and inner races 32 of quadruple conical roller bearing 3 are relatively rotatable with respect to each other. In rollers 33, the overall outer peripheral surfaces thereof are rolling surfaces.

The bearing races (outer races 31 and inner races 32) and rollers 33 of quadruple conical roller bearing 3 as the rolling members correspond to the bearing races (outer race 11 and inner race 12) and balls 13 of deep-groove ball bearing 1 shown in FIG. 1, and have similar structures. In other words, hardened layers similar to those of outer race 11, inner race 12 and balls 13 described with reference to FIG. 2 are formed on regions including the surfaces of outer races 31, inner races 32 and rollers 33, while the hardness of inner portions is also at least 450 HV and not more than 650 HV.

Consequently, outer races 31, inner races 32 and rollers 33 according to the third embodiment are rolling members having long lives also in a high-temperature environment or an environment infiltrated with water, while the contents of alloying elements causing reduction of the workability and increase of the manufacturing cost are suppressed in the steel constituting outer races 31, inner races 32 and rollers 33. Further, quadruple conical roller bearing 3 as the rolling bearing according to the third embodiment is a rolling bearing having a long life also in a high-temperature environment or an environment infiltrated with water, while the contents of alloying elements are suppressed in the steel constituting the rolling members. Therefore, quadruple conical roller bearing 3 is suitable for a roll support bearing of iron and steel rolling equipment, for example.

Quadruple conical roller bearing 3 according to this embodiment can be manufactured by a manufacturing process similar to that for deep-groove ball bearing 1 described in the first embodiment.

Fourth Embodiment

The structure of a machine tool including angular ball bearings and a cylindrical roller bearing according to a fourth embodiment of the present invention is now described with reference to FIG. 8.

Figure 8:
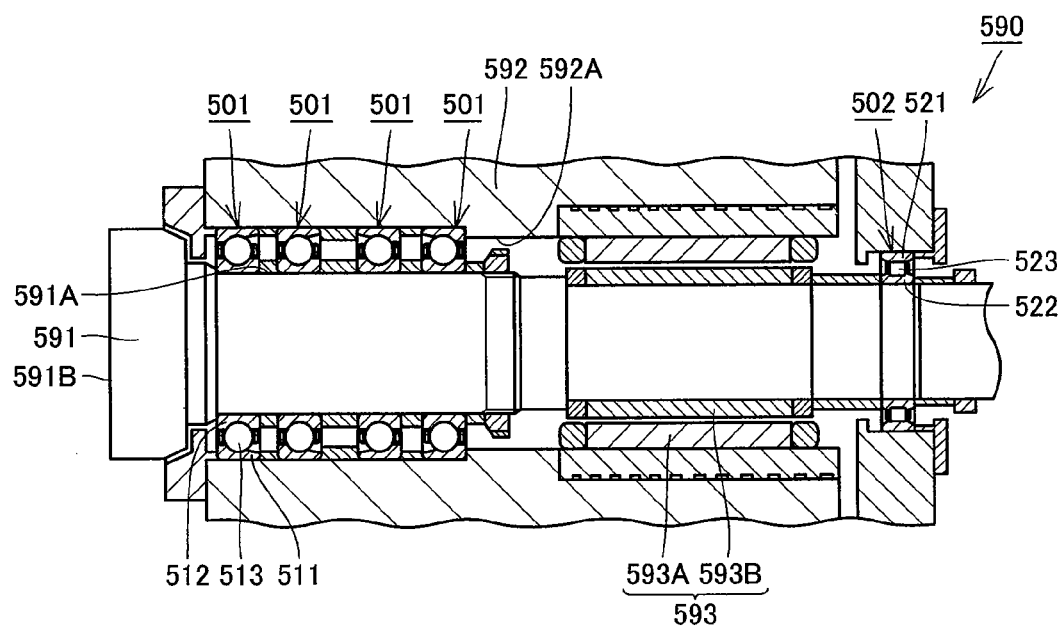
FIG. 8 is a schematic sectional view showing a structure around a main spindle of a machine tool including an angular ball bearing (front bearing) and a cylindrical ball bearing (rear bearing) according to a fourth embodiment.

Referring to FIG. 8, a machine tool 590 according to this embodiment includes a main spindle 591 having a cylindrical shape, a housing 592 enclosing the outer peripheral surface of main spindle 591, and angular ball bearings 501 (front bearings) and a cylindrical roller bearing 502 (rear bearing) as machine tool rolling bearings fitted and arranged between main spindle 591 and housing 592 so that the outer peripheral surfaces of outer races are in contact with an inner wall 592A of the housing and inner peripheral surfaces of inner races are in contact with an outer peripheral surface 591A of main spindle 591. Thus, main spindle 591 is supported to be axially rotatable with respect to housing 592.

A motor rotor 593B is set on main spindle 591 to enclose part of outer peripheral surface 591A, while a motor stator 593A is set on inner wall 592A of housing 592 on a position opposed to motor rotor 593B. Motor stator 593A and motor rotor 593B constitute a motor 593 (built-in motor). Thus, main spindle 591 is relatively rotatable with respect to housing 592 due to the power of motor 593.

In other words, angular ball bearings 501 and cylindrical roller bearing 502 are machine tool rolling bearings supporting rotationally driven main spindle 591 to be rotatable with respect to housing 592 which is a member arranged adjacently to main spindle 591 in machine tool 590 working a workpiece by rotation of main spindle 591.

An operation of machine tool 590 is now described. Referring to FIG. 8, power is supplied to motor stator 593A of motor 593 from an unshown power source, thereby generating driving force axially rotating motor rotor 593B. Thus, main spindle 591 rotatably supported by angular ball bearings 501 and cylindrical roller bearing 502 with respect to housing 592 relatively rotates with respect to housing 592 along with motor rotor 593B. Thus, main spindle 591 so rotates that an unshown tool mounted on a forward end 591B of main spindle 591 can work the workpiece by cutting and grinding the workpiece.

Figure 9:
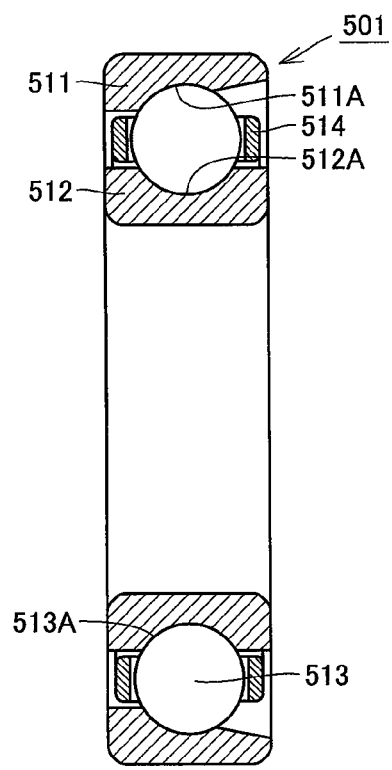
FIG. 9 is a schematic sectional view showing the structure of the angular ball bearing.
Figure 10:
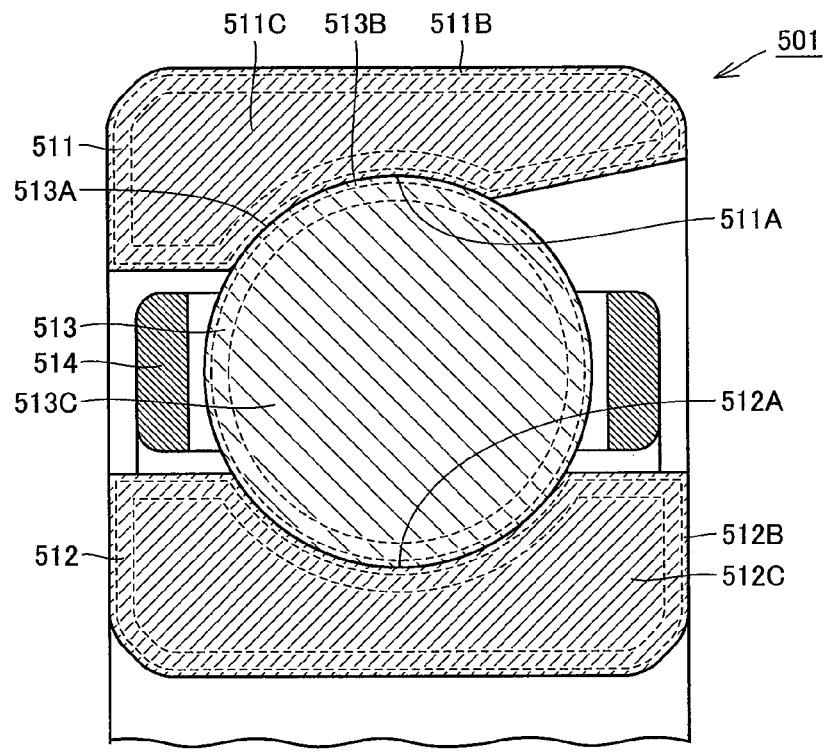
FIG. 10 is a schematic sectional view showing a principal part of FIG. 9 in an enlarged manner.

Angular ball bearings 501 are now described. Referring to FIGS. 9 and 10, each angular bearing 501 includes an outer race 511 as a first raceway member which is a machine tool rolling member, an inner race 512 as a second raceway member which is a machine tool rolling member, balls 513 as a plurality of rolling elements which are machine tool rolling members, and a cage 514.

An outer race rolling surface 511A as an annular first rolling surface is formed on outer race 511. An inner race rolling surface 512A as an annular second rolling surface opposed to outer race rolling surface 511A is formed on inner race 512. Ball rolling surfaces 513A (surfaces of balls 513) as rolling element rolling surfaces are formed on plurality of balls 513. Balls 513 are in contact with the respective ones of outer race rolling surface 511A and inner race rolling surface 512A on ball rolling surfaces 513A and arranged by annular cage 514 at a prescribed pitch in the peripheral direction, to be held on an annular raceway in a rollable manner. Thus, outer race 511 and inner race 512 are relatively rotatable with respect to each other.

In annular ball bearing 501, straight lines connecting contact points between balls 513 and outer race 511 and contact points between balls 513 and inner race 512 form angles with respect to the radial direction (direction perpendicular to a rotation axis of angular ball bearing 501). When a load in the radial direction is applied, therefore, a component of force in an axial direction (direction of the rotation axis of angular ball bearing 501) is formed. Referring to FIG. 8, two angular ball bearings 501 of the same direction are arranged on a front side (side of forward end 591B of main spindle 591) while two angular ball bearings 501 of a direction opposite to the front side are arranged on a rear side (side of motor rotor 593B) in machine tool 590 according to this embodiment, thereby canceling the component of force.

Referring to FIGS. 9 and 10, further, outer race 511, inner race 512 and balls 513 as the machine tool rolling members are constituted of steel containing at least 0.3 mass % and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium with the rest consisting of iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass %.

Further, hardened layers 511B, 512B and 513B having large carbon contents than respective inner portions 511C, 512C and 513 are formed on regions including the surfaces of outer race 511, inner race 512 and balls 513. The hardness of surface layer portions of hardened layers 511B, 512B and 513B is at least 725 HV and not more than 800 HV. The maximum grain sizes of carbides distributed in the surface layer portions of hardened layers 511B, 512B and 513B are not more than 10 μm, and the area ratios of the carbides on the surface layer portions are at least 7% and not more than 25%. Further, the hardness of inner portions 511C, 512C and 513C of the respective ones of outer race 511, inner race 512 and balls 513 is at least 450 HV and not more than 650 HV.

In outer race 511, inner race 512 and balls 513 as the machine tool rolling members according to this embodiment, the content of silicon having a possibility of promoting flaking resulting from hydrogen embrittlement is reduced and the contents of alloying elements such as chromium, vanadium and molybdenum are suppressed while the balance between the contents is properly adjusted in steel constituting outer race 511, inner race 512 and balls 513. In outer race 511, inner race 512 and balls 513 according to this embodiment, the sizes and the area ratios of the carbides on the surface layer portions of hardened layers 511B, 512B and 513B and hardness distributions in outer race 511, inner race 512 and balls 513 are adjusted to proper ranges. Consequently, outer race 511, inner race 512 and balls 513 according to this embodiment are machine tool rolling members having long lives also in a high-temperature environment or an environment infiltrated with water, while the contents of alloying elements causing reduction of the workability and increase of the manufacturing cost are suppressed in the steel constituting outer race 511, inner race 512 and balls 513. Further, each angular ball bearing 501 as the machine tool rolling bearing according to this embodiment is a machine tool ball bearing having a long life also in a high-temperature environment or an environment infiltrated with water, while the contents of alloying elements are suppressed in the steel constituting the rolling member.

In outer race 511, inner race 512 and balls 513 according to this embodiment, the sum of the content of molybdenum and the content of vanadium is preferably at least 0.6 mass % in the steel constituting these. Thus, fine carbides or carbonitrides of molybdenum and vanadium functioning as trap sites of hydrogen are formed, and occurrence of flaking resulting from hydrogen embrittlement is suppressed.

In outer race 511, inner race 512 and balls 513 according to this embodiment, the sum of the content of molybdenum and the content of vanadium is preferably not more than half the content of chromium in the steel constituting these. Thus, the manufacturing cost for these can be suppressed.

In outer race 511, inner race 512 and balls 513 according to this embodiment, the content of silicon is preferably not more than the sum of the content of molybdenum and the content of vanadium in the steel constituting these. Thus, flaking resulting from hydrogen embrittlement can be further suppressed by molybdenum and vanadium while suppressing promotion of flaking resulting from hydrogen embrittlement by silicon.

In outer race 511, inner race 512 and balls 513 according to this embodiment, the hardness of the surface layer portions of hardened layers 511B, 512B and 513B is preferably at least 550 HV in a case where a treatment of holding the same at a temperature of 500° C. for 60 minutes is performed. Thus, rolling contact fatigue lives in a high-temperature environment are sufficiently ensured.

Figure 11:
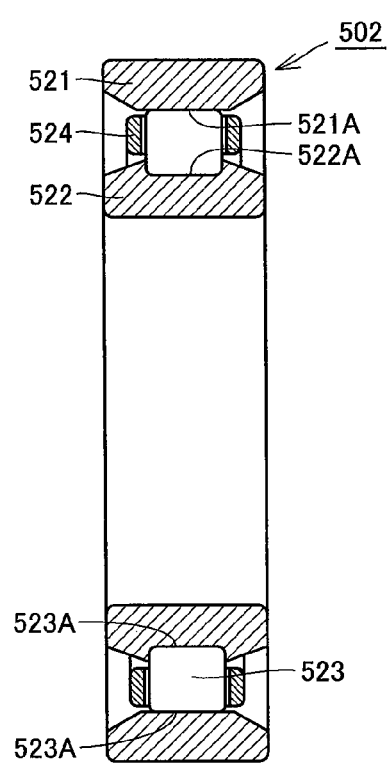
FIG. 11 is a schematic sectional view showing the structure of the cylindrical ball bearing.

Aforementioned cylindrical roller bearing 502 is now described. Referring to FIG. 11, cylindrical roller bearing 502 basically has a structure similar to that of aforementioned angular ball bearing 501, and has a similar effect. In the structures of bearing races and rolling elements, however, cylindrical roller bearing 502 is different from angular ball bearing 501.

In other words, cylindrical roller bearing 502 includes an outer race 521 as a first raceway member which is a machine tool rolling member, an inner race 522 as a second raceway member which is a machine tool rolling member, cylindrical rollers 523 as a plurality of rolling elements which are machine tool rolling members and a cage 524. An outer race rolling surface 521A as an annular first rolling surface is formed on outer race 521. An inner race rolling surface 522A as an annular second rolling surface opposed to outer race rolling surface 521A is formed on inner race 522. Roller rolling surfaces 523A (outer peripheral surfaces of cylindrical rollers 523) as rolling element rolling surfaces are formed on plurality of cylindrical rollers 523. Cylindrical rollers 523 come into contact with the respective ones of outer race rolling surface 521A and inner race rolling surface 522A on roller rolling surfaces 523A, and arranged in the peripheral direction at a prescribed pitch by annular cage 524 to be held on an annular raceway in a rollable manner. Thus, outer race 521 and inner race 522 are relatively rotatable with respect to each other.

Referring to FIGS. 9 to 11, outer race 521, inner race 522 and cylindrical rollers 523 as the machine tool rolling members according to this embodiment correspond to aforementioned outer race 511, inner race 512 and balls 513 respectively, are made of similar steel, and have hardened layers and inner portions similar in structure to hardened layers 511B, 512B and 513B and inner portions 511C, 512C and 513C. Consequently, outer race 521, inner race 522 and cylindrical rollers 523 according to this embodiment are machine tool rolling members having long lives also in a severe environment such as a high-temperature environment or an environment infiltrated with water, while the contents of alloying elements causing reduction of the workability and increase of the manufacturing cost are suppressed in the steel constituting outer race 521, inner race 522 and cylindrical rollers 523. Further, cylindrical roller bearing 502 as the machine tool rolling bearing according to this embodiment is a machine tool rolling bearing having a long life also in a severe environment such as a high-temperature environment or an environment infiltrated with water, while the contents of alloying elements are suppressed in the steel constituting the rolling members.

Angular ball bearing 501 and cylindrical roller bearing 502 according to this embodiment can be manufactured by a manufacturing process similar to that for deep-groove ball bearing 1 described in the first embodiment.

Fifth Embodiment

The structure of an alternator including grease-sealed deep-groove ball bearings according to a fifth embodiment is now described with reference to FIG. 12.

Figure 12:
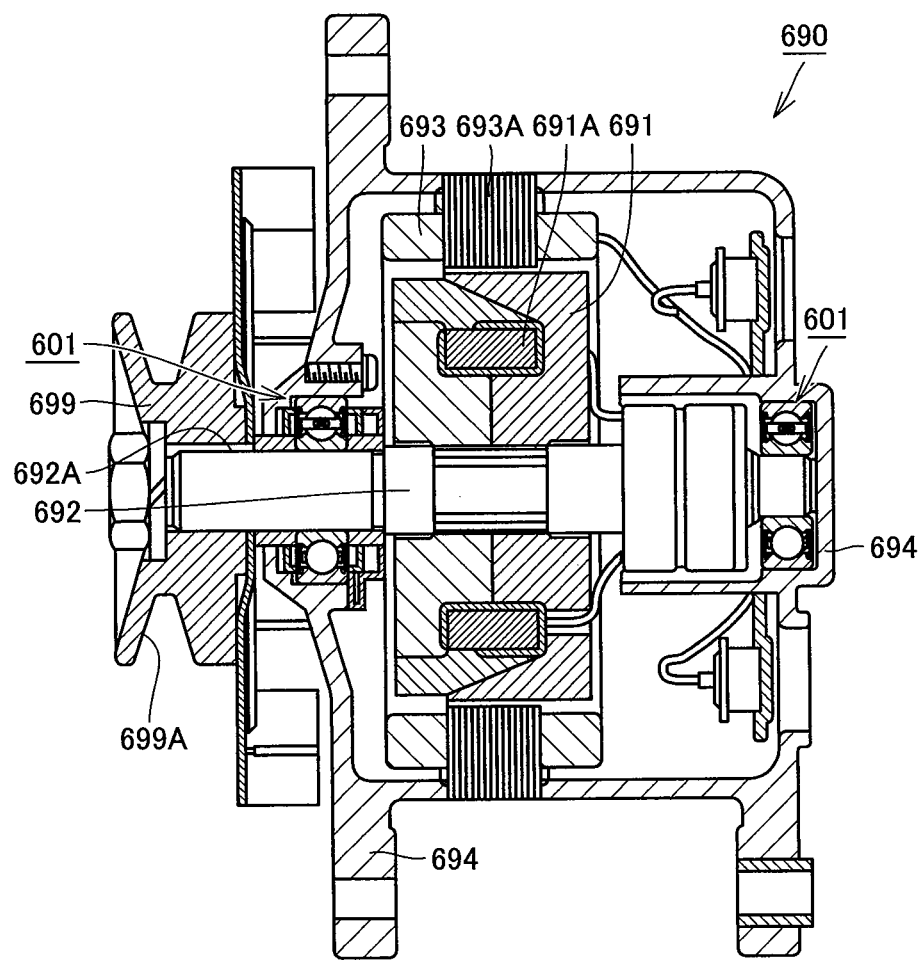
FIG. 12 is a schematic diagram showing the structure of an alternator including a grease-sealed deep-groove ball bearing (alternator rolling bearing) according to a fifth embodiment.

Referring to FIG. 12, an alternator 690 includes a rotor 691 having a discoidal shape and on which a rotor coil 691A is wound, a housing 694 arranged to enclose rotor 691, a rotor shaft 692 passing through a central portion of rotor 691 and passing through a wall surface of housing 694 and a stator 693 arranged to be fixed to housing 694 to be opposed to the outer peripheral surface of rotor 691 in housing 694. Stator coils 693A are wound on stator 693 on three portions separating from each other by 120° respectively on a peripheral surface along the outer peripheral surface of rotor 691, for example. A pair of grease-sealed deep-groove ball bearings 601 as automobile electrical equipment/auxiliary device rolling bearings according to the present invention are arranged between an outer peripheral surface 692A of rotor shaft 692 and housing 694 which is a member arranged to be opposed to part of outer peripheral surface 692A. In other words, grease-sealed deep-groove ball bearings 601 are automobile electrical equipment/auxiliary device rolling bearings supporting rotor shaft 692 as a rotationally driven rotating member to be rotatable with respect to housing 694 which is a member arranged adjacently to the outer peripheral surface of rotor shaft 692 in alternator 690 which is an automobile electrical equipment/auxiliary device machine.

Thus, rotor shaft 692 is held to be axially rotatable with respect to housing 694, and rotor 691 is constituted to be rotatable integrally with rotor shaft 692. Further, alternator 690 includes an alternator pulley 699 having an annular shape connected to rotor shaft 692 and constituted to be rotatable integrally with rotor shaft 692 on an outer portion of housing 694. A groove portion 699A for receiving an unshown belt for power transmission is formed on the outer peripheral surface of alternator pulley 699.

An operation of alternator 690 is now described. The belt (not shown) rotating by power from a power source such as an engine is extended on the outer peripheral surface of alternator pulley 699 provided with groove portion 699A. This belt so rotates that alternator pulley 699 rotates around the axis of rotor shaft 692 integrally with rotor shaft 692 pivotally supported by grease-sealed deep-groove ball bearings 601 with respect to housing 694. Rotor 691 rotates integrally with rotor shaft 692, around the axis of rotor shaft 692. At this time, rotor 691 relatively rotates with respect to stator 693 opposed to the outer peripheral surface of rotor 691 and arranged to be fixed to housing 694. Consequently, electromotive force is generated in stator coils 693A due to electromagnetic induction between rotor coil 691A and stator coils 693A.

In other words, grease-sealed deep-groove ball bearings 601 as the automobile electrical equipment/auxiliary device rolling bearings according to the fifth embodiment are alternator rolling bearings pivotally supporting rotor shaft 692 passing through rotor 691 and rotating integrally with rotor 691 to be rotatable with respect to housing 694 which is a member arranged to be opposed to the outer peripheral surface of rotor shaft 692 in the alternator generating the electromotive force in stator coils 693A of stator 693 arranged to be opposed to the outer peripheral side of rotor 691 by rotating rotor 691.

Namely, grease-sealed deep-groove ball bearings 601 are automobile electrical equipment/auxiliary device rolling bearings supporting, in alternator 690 operating while utilizing power generated in the engine of an automobile, rotor shaft 692 rotationally driven by this power to be rotatable with respect to housing 694 arranged adjacently to rotor shaft 692.

Figure 13:
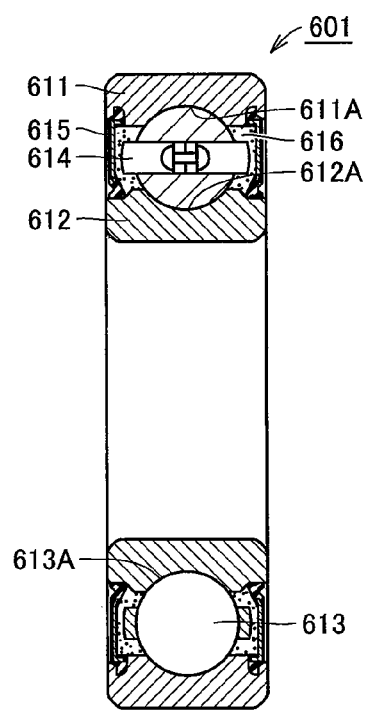
FIG. 13 is a schematic sectional view showing the structure of the grease-sealed deep-groove ball bearing according to the fifth embodiment.
Figure 14:
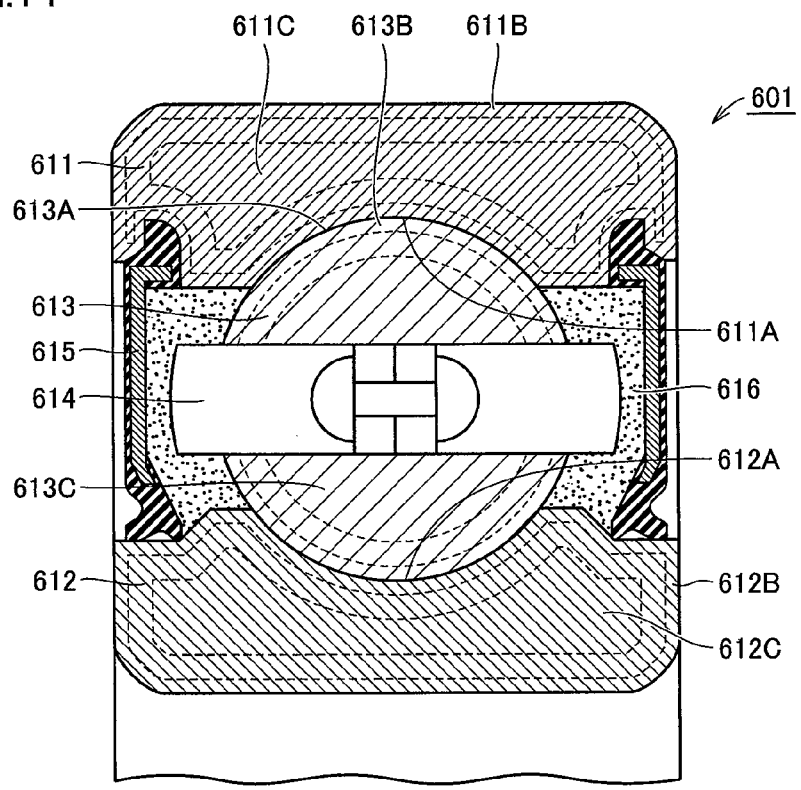
FIG. 14 is a schematic partial sectional view showing a principal part of FIG. 13 in an enlarged manner.

Aforementioned grease-sealed deep-groove ball bearings 601 are now described. Referring to FIGS. 13 and 14, each grease-sealed deep-groove ball bearing 601 includes an outer race 611 as a first raceway member which is an automobile electrical equipment/auxiliary device rolling member, an inner race 612 as a second raceway member which is an automobile electrical equipment/auxiliary device rolling member, balls 613 as a plurality of rolling elements which are automobile electrical equipment/auxiliary device rolling members, a cage 614 and sealing members 615. An outer race rolling surface 611A as an annular first rolling surface is formed on outer race 611. An inner race rolling surface 612A as an annular second rolling surface opposed to outer race rolling surface 611A is formed on inner race 612. Ball rolling surfaces 613A (surfaces of balls 613) as rolling member rolling surfaces are formed on plurality of balls 613. Balls 613 come into contact with the respective ones of outer race rolling surface 611A and inner race rolling surface 612A on ball rolling surfaces 613A and are arranged at a prescribed pitch in the peripheral direction by annular cage 614 to be held on an annular raceway in a rollable manner.

Pair of sealing members 615 are arranged on the respective ones of both end portions in the width direction of outer race 611 and inner race 612 between outer race 611 and inner race 612, to close a space held between outer race 611 and inner race 612, more specifically a raceway space which is a space held between outer race rolling surface 611A and inner race rolling surface 612A. According to the aforementioned structure, outer race 611 and inner race 612 of grease-sealed deep-groove ball bearing 601 are relatively rotatable with respect to each other. A grease composition 616 is sealed in the aforementioned raceway space.

Referring to FIGS. 13 and 14, further, outer race 611, inner race 612 and balls 613 as the automobile electrical equipment/auxiliary device rolling members are constituted of steel containing at least 0.3 mass % and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium with the rest consisting of iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass %.

Further, hardened layers 611B, 612B and 613B having larger carbon contents than respective inner portions 611C, 612C and 613C are formed on regions including the surfaces of outer race 611, inner race 612 and balls 613. The hardness of surface layer portions of hardened layers 611B, 612B and 613B is at least 725 HV and not more than 800 HV. The maximum grain sizes of carbides distributed in the surface layer portions of hardened layers 611B, 612B and 613B are not more than 10 μm, and the area ratios of the carbides on the surface layer portions are at least 7% and not more than 25%. Further, the hardness of inner portions 611C, 612C and 613C of the respective ones of outer race 611, inner race 612 and balls 613 is at least 450 HV and not more than 650 HV.

In outer race 611, inner race 612 and balls 613 as the automobile electrical equipment/auxiliary device rolling members according to this embodiment, the content of silicon having a possibility of promoting flaking resulting from hydrogen embrittlement is reduced and the contents of alloying elements such as chromium, vanadium and molybdenum are suppressed while the balance between the contents is properly adjusted in the steel constituting outer race 611, inner race 612 and balls 613. In outer race 611, inner race 612 and balls 613 according to this embodiment, further, the sizes and the area ratios of the carbides on the surface layer portions of hardened layers 611B, 612B and 613B and hardness distributions in outer race 611, inner race 612 and balls 613 are adjusted to proper ranges. Consequently, outer race 611, inner race 612 and balls 613 according to this embodiment are automobile electrical equipment/auxiliary device rolling members having long lives also in a severe environment such as a high-temperature environment or an environment on which vibration acts, while the contents of alloying elements causing reduction of the workability and increase of the manufacturing cost are suppressed in the steel constituting outer race 611, inner race 612 and balls 613. Further, grease-sealed deep-groove ball bearing 601 as the automobile electrical equipment/auxiliary device rolling bearing according to this embodiment is an automobile electrical equipment/auxiliary device rolling bearing having a long life also in a severe environment such as a high-temperature environment or an environment on which vibration acts, while the contents of alloying elements are suppressed in the steel constituting the rolling members.

In outer race 611, inner race 612 and balls 613 according to this embodiment, the sum of the content of molybdenum and the content of vanadium is preferably at least 0.6 mass % in the steel constituting these. Thus, fine carbides or carbonitrides of molybdenum and vanadium functioning as trap sites of hydrogen are formed, and occurrence of flaking resulting from hydrogen embrittlement is suppressed.

In outer race 611, inner race 612 and balls 613 according to this embodiment, the sum of the content of molybdenum and the content of vanadium is preferably not more than half the content of chromium in the steel constituting these. Thus, the manufacturing cost for these can be suppressed.

In outer race 611, inner race 612 and balls 613 according to this embodiment, the content of silicon is preferably not more than the sum of the content of molybdenum and the content of vanadium in the steel constituting these. Thus, flaking resulting from hydrogen embrittlement can be further suppressed by molybdenum and vanadium while suppressing promotion of flaking resulting from hydrogen embrittlement by silicon.

In outer race 611, inner race 612 and balls 613 according to this embodiment, the hardness of the surface layer portions of hardened layers 611B, 612B and 613B is preferably at least 550 HV in a case where a treatment of holding the same at a temperature of 500° for 60 minutes is performed. Thus, rolling contact fatigue lives in a high-temperature environment are sufficiently ensured.

Grease-sealed deep-groove ball bearing 601 according to this embodiment can be manufactured by a processing method similar to that for deep-groove ball bearing 1 described in the first embodiment.

Sixth Embodiment

The structure of a pulley including a grease-sealed deep-groove ball bearing according to a sixth embodiment is now described with reference to FIG. 15.

Figure 15:
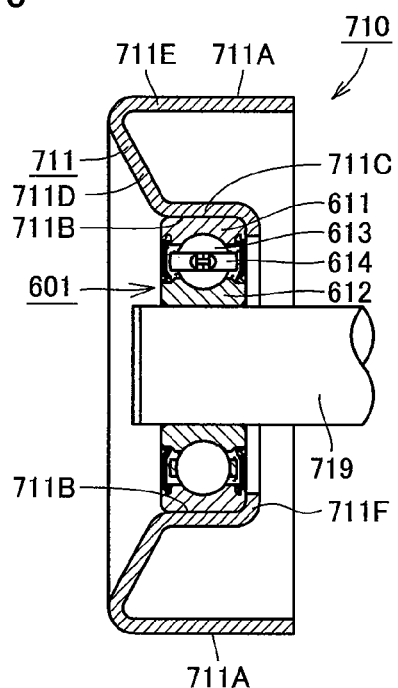
FIG. 15 is a schematic diagram showing a pulley including a grease-sealed deep-groove ball bearing (pulley rolling bearing) according to a sixth embodiment.

Referring to FIG. 15, a pulley 710 used as a tension pulley and/or an idler pulley of an auxiliary driving belt of an automobile includes a pulley body 711 having an outer peripheral surface 711A for coming into contact with the auxiliary driving belt (not shown) which is a belt for power transmission and having an annular shape provided with a through-hole for receiving a shaft 719 on a central portion and a grease-sealed deep-groove ball bearing 601 (single-row deep-groove ball bearing as a pulley rolling bearing) as an automobile electrical equipment/auxiliary device rolling bearing fitted in contact with an inner peripheral surface 711B of the through-hole.

More specifically, pulley body 711 includes a cylindrical inner peripheral cylindrical portion 711C having a through-hole in the inner peripheral surface, a flange portion 711D extending from one end portion of inner peripheral cylindrical portion 711C in the width direction (axial direction) outward in the radial direction, an outer peripheral cylindrical portion 711E extending from flange portion 711D in the width direction (axial direction) and a collar portion 711F extending from the other end portion of inner peripheral cylindrical portion 711C in the width direction (axial direction) inward in the radial direction. Grease-sealed deep-groove ball bearing 601 has a structure similar to that of grease-sealed deep-groove ball bearing 601 which is an alternator rolling bearing described with reference to FIGS. 13 and 14. An outer race 611 is fitted to be in contact with inner peripheral cylindrical portion 711C and collar portion 711F of pulley body 711.

Shaft 719 is fitted to be in contact with the inner peripheral surface of an inner race 612 of grease-sealed deep-groove ball bearing 601, whereby shaft 719 and pulley body 711 are axially relatively rotatable, and the unshown auxiliary driving belt in contact with outer peripheral surface 711A of pulley body 711 is rotatable. Thus, pulley 710 can achieve one or both of a function as a tensioner coming into contact with the auxiliary driving belt on outer peripheral surface 711A and supplying tension to the auxiliary driving belt when the distance between shafts on which the auxiliary driving belt is extended is fixed and a function as an idler for changing the traveling direction of the auxiliary driving belt for the purpose of avoiding contact with various devices in an engine room serving as obstacles.

In other words, grease-sealed deep-groove ball bearing 601 according to the sixth embodiment is, referring to FIG. 15, a pulley rolling bearing arranged between shaft 719 as a pulley shaft passing through the inner portion of pulley body 711 receiving the unshown belt for transmitting power and rotating and pulley body 711, for pivotally supporting pulley body 711 to be rotatable with respect to shaft 719.

Namely, grease-sealed deep-groove ball bearing 601 is an automobile electrical equipment/auxiliary device rolling bearing supporting, in pulley 710 operating through power generated in the engine of the automobile, pulley body 711 rotationally driven by this power to be rotatable with respect to shaft 719 arranged adjacently to pulley body 711 (to pass through pulley body 711).

Outer race 611, inner race 612 and balls 613 according to this embodiment have structures similar to those of outer race 611, inner race 612 and balls 613 of grease-sealed deep-groove ball bearing 601 which is the alternator rolling bearing described with reference to FIGS. 13 and 14, and hence the same are automobile electrical equipment/auxiliary device rolling members having long lives also in a severe environment such as a high-temperature environment or an environment on which vibration acts, while the contents of alloying elements causing reduction of the workability and increase of the manufacturing cost are suppressed in the steel constituting these. Further, grease-sealed deep-groove ball bearing 601 as the automobile electrical equipment/auxiliary device rolling bearing according to this embodiment is an automobile electrical equipment/auxiliary device rolling bearing having a long life also in a severe environment such as a high-temperature environment or an environment on which vibration acts, while the contents of alloying elements are suppressed in the steel constituting the rolling members. Grease-sealed deep-groove ball bearing 601 according to this embodiment can be manufactured by a manufacturing process similar to that for deep-groove ball bearing 1 described in the first embodiment.

Seventh Embodiment

A fan coupling including a grease-sealed deep-groove ball bearing according to a seventh embodiment is now described with reference to FIGS. 16 and 17.

Figure 16:
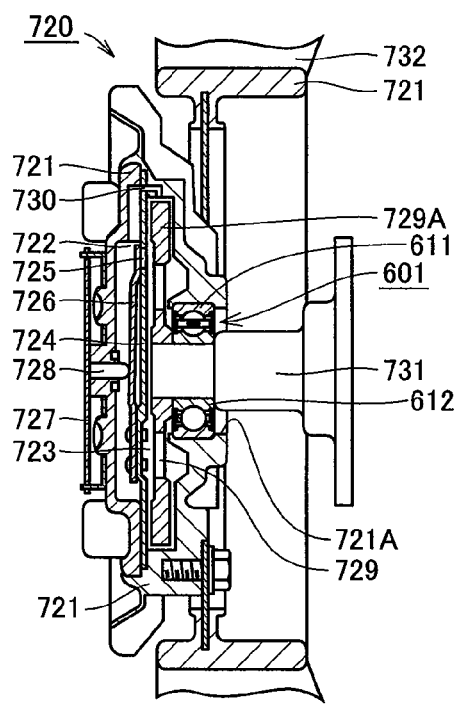
FIG. 16 is a schematic diagram showing a fan coupling including a grease-sealed deep-groove ball bearing (fan coupling rolling bearing) according to a seventh embodiment.

Referring to FIG. 16, a fan coupling 720 is a coupling (joint) interposed between a fan 732 for reducing the temperature of cooling water in a radiator by feeding a wind to the radiator of an automobile and a rotor 731, which is a member for driving fan 732, rotating by power of an engine, for controlling the rotational frequency of the fan.

Fan coupling 720 includes a discoidal case 721 fitted in annular fan 732 provided with a vane on the outer peripheral surface to come into contact with the inner peripheral surface of a through-hole formed in a portion of fan 732 including a rotation axis thereof on the outer peripheral surface and a grease-sealed deep-groove ball bearing 601 (fan coupling rolling bearing) having an inner race 612 fitted into the outer peripheral surface of a rotor 731 rotationally driven by the power of the unshown engine around an axis common to the rotation axis of fan 732 while passing through a through-hole 721A formed in a sidewall of case 721 and an outer race 611 fitted into the inner peripheral surface of through-hole 721A of case 721. Thus, the outer race and the inner race of grease-sealed deep-groove ball bearing 601 are formed to be integrally rotatable with case 721 and rotor 731 respectively. Grease-sealed deep-groove ball bearing 601 has a structure similar to that of grease-sealed deep-groove ball bearing 601 which is the alternator rolling bearing described with reference to FIGS. 13 and 14.

An oil chamber 722 charged with viscous fluid such as silicone oil and a stirring chamber 723 adjacent to oil chamber 722 are formed in case 721. A discoidal drive disc 729 provided with a fin 729A on the outer peripheral surface is arranged in stirring chamber 723. Drive disc 729 is provided with a through-hole in a portion including the center, and fitted into rotor 731 to come into contact with the outer peripheral surface of rotor 731 on the inner peripheral surface of this through-hole. Thus, drive disc 729 is formed to be axially rotatable integrally with rotor 731 on a rotation axis common to fan 732 and rotor 731.

A partition plate 724 is arranged between oil chamber 722 and stirring chamber 723, and a port 725 which is a through-hole connecting oil chamber 722 and stirring chamber 723 with each other is formed in partition plate 724. Further, a platelike spring 726 mounted on partition plate 724 on one end and formed to overlap with port 725 on another end is arranged in oil chamber 722. In addition, a platelike bimetal 727 is mounted on the front side of case 721 (outer side of an outer wall closer to oil chamber 722 as viewed from partition plate 724). Further, a bar-shaped piston 728 has one end coupled to a central portion of bimetal 727 and another end passing through the outer wall of case 721, and is arranged to come into contact with spring 726 in oil chamber 722. A circulation hole 730 connecting a region of stirring chamber 723 opposed to the outer peripheral surface of drive disc 729 and oil chamber 722 with each other is formed in case 721 and partition plate 724.

An operation of fan coupling 720 is now described with reference to FIGS. 16 and 17. When the unshown engine starts, rotor 731 axially rotates due to the power of the engine. At this time, inner race 612 of grease-sealed deep-groove ball bearing 601 fitted into rotor 731 and drive disc 729 rotate integrally with rotor 731.

When the temperature of air passing through the unshown radiator is not more than a set temperature of 60° C., for example, in a case where the elapsed time from the starting of the engine is short, bimetal 727 exposed to the air passing through the radiator maintains a planar shape as shown in FIG. 16. Therefore, spring 726 is pressed by piston 728 toward partition plate 724, and port 725 is closed by spring 726. Therefore, the viscous fluid such as silicone oil charged into oil chamber 722 cannot flow into stirring chamber 723 through port 725. If the viscous fluid is present in stirring chamber 723, this viscous fluid flows into oil chamber 722 through circulation hole 30 due to centrifugal force resulting from rotation of drive disc 729.

Consequently, drive disc 729 is pivotally supported by grease-sealed deep-groove ball bearing 601 to be rotatable with respect to case 721, and idles with respect to case 721 except that the same exerts slight shearing stress on case 721 when drive disc 729 introduces the viscous fluid into oil chamber 722 through circulation hole 730. Therefore, the rotation of rotor 731 is only slightly transmitted to case 721, and fan 732 rotates at a low rotational speed.

Figure 17:
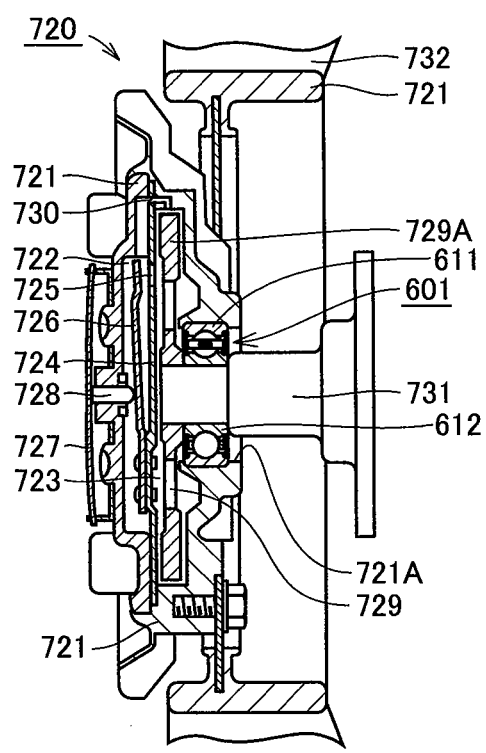
FIG. 17 is a schematic diagram for illustrating an operation of the fan coupling including the grease-sealed deep-groove ball bearing according to the seventh embodiment.

On the other hand, when the temperature of the engine increases and the temperature of the air passing through the unshown radiator exceeds the set temperature of 60° C., for example, bimetal 727 exposed to the air passing through the radiator deforms to be convexed toward the direction of oil chamber 722 as viewed from partition plate 724, as shown in FIG. 17. Therefore, pressing force for spring 726 by piston 728 is reduced, and port 725 is opened. The viscous fluid such as silicone oil charged into oil chamber 722 flows into stirring chamber 723 through port 725. Consequently, the rotation of drive disc 729 is efficiently transmitted to case 721 through the viscous fluid, and fan 732 rotates at a high rotational speed.

Thus, fan coupling 720 achieves a function of increasing the temperature of the engine to a proper level by lowly controlling the rotational speed of fan 732 when the temperature of the engine is low. When the temperature of the engine is high, on the other hand, fan coupling 720 achieves a function of avoiding increase of the temperature of the engine beyond a proper range by cooling the radiator by controlling the rotation of the fan so that the rotational speed of fan 732 is increased.

Grease-sealed deep-groove ball bearing 601 according to this embodiment and outer race 611, inner race 612 and balls 613 constituting the same have structures similar to those of outer race 611, inner race 612 and balls 613 of grease-sealed deep-groove ball bearing 601 which is the alternator rolling bearing described with reference to FIGS. 13 and 14, and hence the same are automobile electrical equipment/auxiliary device rolling members having long lives also in a severe environment such as a high-temperature environment or an environment on which vibration acts, while the contents of alloying elements causing reduction of the workability and increase of the manufacturing cost are suppressed in the steel constituting these. Further, grease-sealed deep-groove ball bearing 601 as the automobile electrical equipment/auxiliary device rolling bearing according to this embodiment is an automobile electrical equipment/auxiliary device rolling bearing having a long life also in a severe environment such as a high-temperature environment or an environment on which vibration acts, while the contents of alloying elements are suppressed in the steel constituting the rolling elements. Grease-sealed deep-groove ball bearing 601 according to this embodiment can be manufactured by a manufacturing process similar to that for deep-groove ball bearing 1 described in the first embodiment.

Eighth Embodiment

A transmission including a transmission rolling bearing according to an eighth embodiment which is one embodiment of the present invention is now described.

Figure 18:
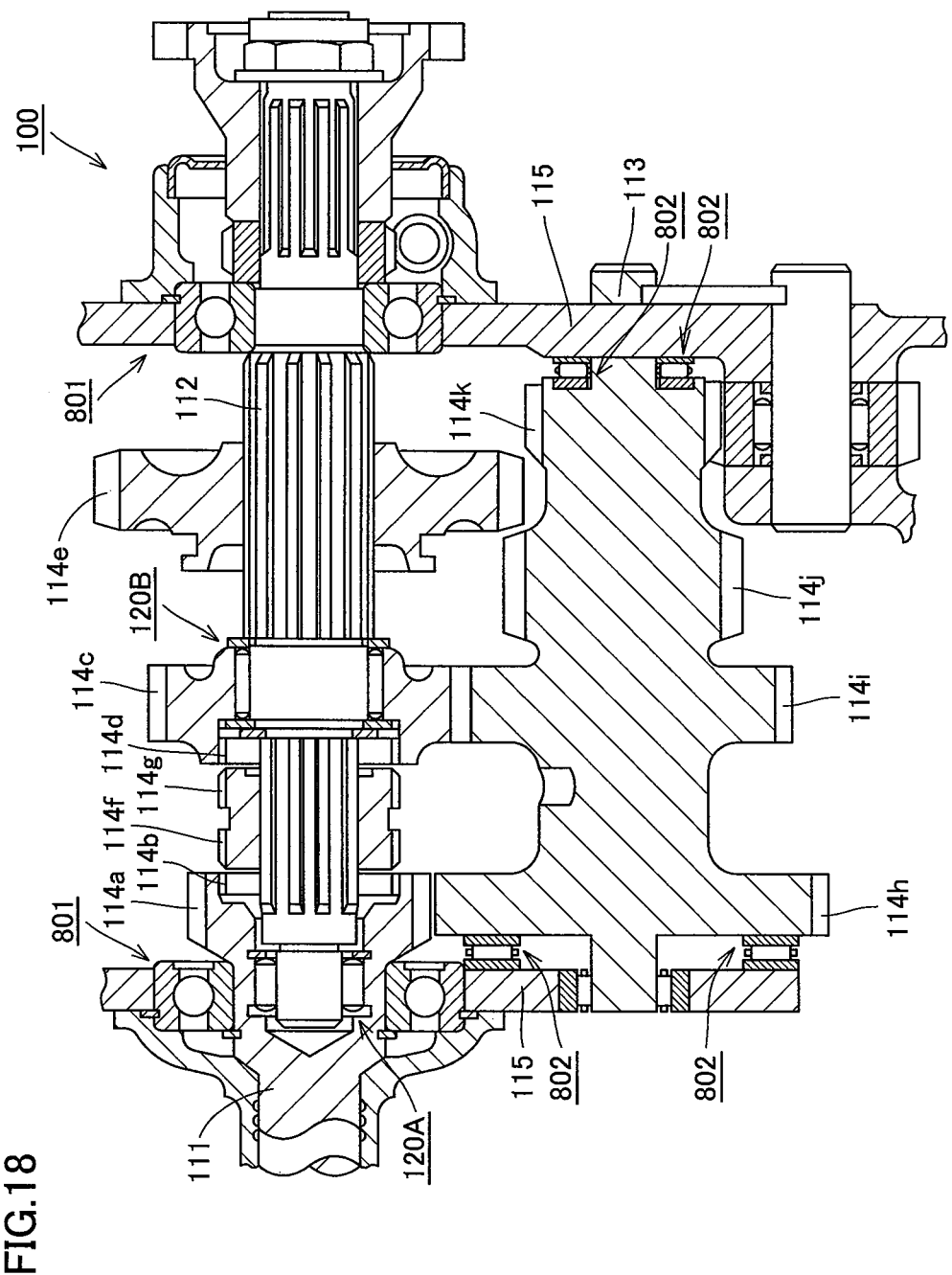
FIG. 18 is a schematic sectional view showing the structure of a manual transmission according to an eighth embodiment.

Referring to FIG. 18, a manual transmission 100 is a constant-mesh manual transmission, and includes an input shaft 111, an output shaft 112, a counter shaft 113, gears (toothed wheels) 114a to 114k and a housing 115.

Input shaft 111 is supported by a deep-groove ball bearing 801 which is a transmission rolling bearing to be rotatable with respect to housing 115. Gear 114a is formed on the outer periphery of input shaft 111, while gear 114b is formed on the inner periphery.

On the other hand, output shaft 112 is supported by deep-groove ball bearing 801 to be rotatable with respect to housing 115 on one side (right side in the figure), and supported by a rolling bearing 120A to be rotatable with respect to input shaft 111 on another side (left side in the figure). Gears 114c to 114g are mounted on output shaft 112.

Gears 114c and 114d are formed on the outer periphery and the inner periphery of the same member respectively. The member provided with gears 114c and 114d is supported by a rolling bearing 120B to be rotatable with respect to output shaft 112. Gear 114e is mounted on output shaft 112 to rotate integrally with output shaft 112 and to be slidable in the axial direction of output shaft 112.

The respective ones of gears 114f and 114g are formed on the outer periphery of the same member. The member provided with gears 114f and 114g is mounted on output shaft 112 to rotate integrally with output shaft 112 and to be slidable in the axial direction of output shaft 112. Gear 114f is meshable with gear 114b when the member provided with gears 114f and 114g slides leftward in the figure, while gears 114g and 114d are meshable with each other when the member slides rightward in the figure.

Gears 114h to 114k are formed on counter shaft 113. Two thrust needle roller bearings 802 are arranged between counter shaft 113 and housing 115, whereby the axial load (thrust load) of counter shaft 113 is supported. Gear 114h regularly meshes with gear 114a, while gear 114i regularly meshes with gear 114c. Gear 114j is meshable with gear 114e when gear 114e slides leftward in the figure. Further, gear 114k is meshable with gear 114e when gear 114e slides rightward in the figure.

A gear-change operation of manual transmission 100 is now described. In manual transmission 100, rotation of input shaft 111 is transmitted to counter shaft 113 due to the mesh between gear 114a formed on input shaft 111 and gear 114h formed on counter shaft 113. Further, rotation of counter shaft 113 is transmitted to output shaft 112 due to mesh etc. between gears 114i to 114k formed on counter shaft 113 and gears 114c and 114e mounted on output shaft 112. Thus, the rotation of input shaft 111 is transmitted to output shaft 112.

When the rotation of input shaft 111 is transmitted to output shaft 112, the rotational speed of output shaft 112 can be changed stepwise with respect to the rotational speed of input shaft 111 by varying the gears meshing with each other between input shaft 111 and counter shaft 113 and the gears meshing with each other between counter shaft 113 and output shaft 112. The rotation of input shaft 111 can also be directly transmitted to output shaft 112 by directly meshing gear 114b of input shaft 111 and gear 114f of output shaft 112 with each other without through counter shaft 113.

The gear-change operation of manual transmission 100 is now more specifically described. When gear 114f does not mesh with gear 114b, gear 114g does not mesh with gear 114d and gear 114e meshes with gear 114j, driving force of input shaft 111 is transmitted to output shaft 112 through gears 114a, 114h, 114j and 114e. This is regarded as a first speed, for example.

When gear 114g meshes with gear 114d and gear 114e does not mesh with gear 114j, the driving force of input shaft 111 is transmitted to output shaft 112 through gears 114a, 114h, 114i, 114c, 114d and 114g. This is regarded as a second speed, for example.

When gear 114f meshes with gear 114b and gear 114e does not mesh with gear 114j, input shaft 111 is directly coupled to output shaft 112 due to the mesh between gears 114*b* and 114*f*, and the driving force of input shaft 111 is directly transmitted to output shaft 112. This is regarded as a third speed (top), for example.

As hereinabove described, manual transmission 100 according to the eighth embodiment includes deep-groove ball bearing 801, in order to support input shaft 111 and output shaft 112 to be rotatable with respect to housing 115. Further, manual transmission 100 includes thrust needle roller bearings 802, in order to support counter shaft 113 to be rotatable with respect to housing 115. In addition, manual transmission 100 includes rolling bearing 120A (radial roller bearing) in order to support output shaft 112 to be rotatable with respect to input shaft 111, and includes rolling bearing 120B (radial roller bearing) in order to support the member provided with gears 114*c* and 114*d* to be rotatable with respect to output shaft 112. Aforementioned deep-groove ball bearing 801, thrust needle roller bearings 802 and rolling bearings 120A and 120B are transmission rolling bearings supporting rotors to be rotatable with respect to members around the rotors in manual transmission 100 including a gear mechanism consisting of a plurality of gears and varying a transmission gear ratio stepwise by the mesh of the gears.

Figure 19:
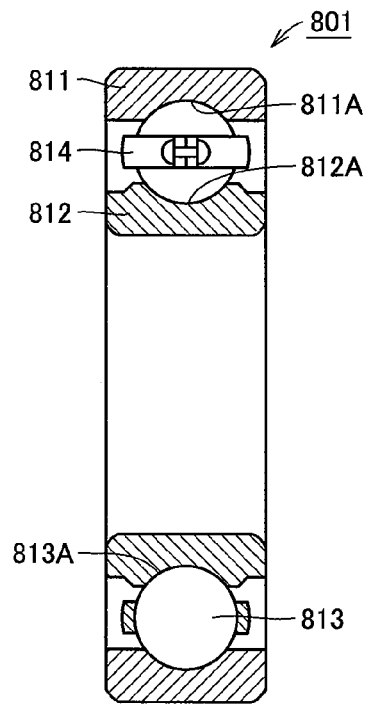
FIG. 19 is a schematic sectional view showing the structure of a deep-groove ball bearing according to the eighth embodiment.
Figure 20:
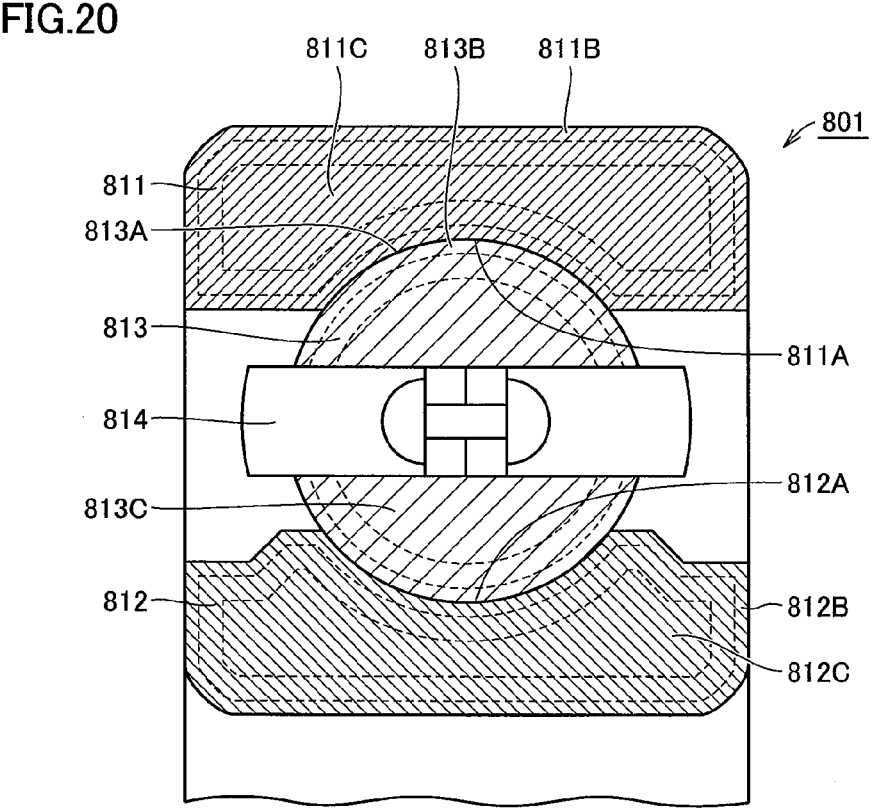
FIG. 20 is a schematic partial sectional view showing a principal part of FIG. 19 in an enlarged manner.

The transmission rolling bearings according to the eighth embodiment are now described. Referring to FIGS. 19 and 20, deep-groove ball bearing 801 as the transmission rolling bearing according to the eighth embodiment includes an outer race 811 as a first raceway member which is a transmission rolling member, an inner race 812 as a second raceway member which is a transmission rolling member, balls 813 as a plurality of rolling elements which are transmission rolling members, and a cage 814. An outer race rolling surface 811A as an annular first rolling surface is formed on outer race 811. An inner race rolling surface 812A as an annular second rolling surface opposed to outer race rolling surface 811A is formed on inner race 812. Ball rolling surfaces 813A (surfaces of balls 813) as rolling member rolling surfaces are formed on plurality of balls 813. Balls 813 come into contact with the respective ones of outer race rolling surface 811A and inner race rolling surface 812A on ball rolling surfaces 813A and are arranged at a prescribed pitch in the peripheral direction by annular cage 814, to be held on an annular raceway in a rollable manner. According to the aforementioned structure, outer race 811 and inner race 812 of deep-groove ball bearing 801 are relatively rotatable with respect to each other.

Referring to FIGS. 19 and 20, further, outer race 811, inner race 812 and balls 813 as the transmission rolling members are constituted of steel containing at least 0.3 mass % and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium with the rest consisting of iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass %.

Further, hardened layers 811B, 812B and 813B having larger carbon contents than respective inner portions 811C, 812C and 813C are formed on regions including the surfaces of outer race 811, inner race 812 and balls 813. The hardness of surface layer portions of hardened layers 811B, 812B and 813B is at least 725 HV and not more than 800 HV. The maximum grain sizes of carbides distributed in the surface layer portions of hardened layers 811B, 812B and 813B are not more than 10 µm, and the area ratios of the carbides on the surface layer portions are at least 7% and not more than 25%. Further, the hardness of respective inner portions 811C, 812C and 813C of outer race 811, inner race 812 and balls 813 is at least 450 HV and not more than 650 HV.

In outer race 811, inner race 812 and balls 813 as the transmission rolling members according to this embodiment, the content of silicon having a possibility of promoting flaking resulting from hydrogen embrittlement is reduced and the contents of alloying elements such as chromium, vanadium and molybdenum are suppressed while the balance between the contents is properly adjusted in the steel constituting outer race 811, inner race 812 and balls 813. In outer race 811, inner race 812 and balls 813 according to this embodiment, further, the sizes and the area ratios of the carbides on the surface layer portions of hardened layers 811B, 812B and 813B and hardness distributions in outer race 811, inner race 812 and balls 813 are adjusted to proper ranges. Consequently, outer race 811, inner race 812 and balls 813 according to this embodiment are transmission rolling members having long lives also in such a severe environment that foreign matter is mixed into the bearing and the bearing is exposed to a high temperature, while the contents of alloying elements causing reduction of the workability and increase of the manufacturing cost are suppressed in the steel constituting outer race 811, inner race 812 and balls 813. Further, deep-groove ball bearing 801 as the transmission rolling bearing according to this embodiment is a transmission rolling element having a long life also in a such a severe environment that foreign matter is mixed into the bearing and the bearing is exposed to a high temperature, while the contents of alloying elements are suppressed in the steel constituting the rolling members.

In outer race 811, inner race 812 and balls 813 according to this embodiment, the sum of the content of molybdenum and the content of vanadium is preferably at least 0.6 mass % in the steel constituting these. Thus, fine carbides or carbonitrides of molybdenum and vanadium functioning as trap sites of hydrogen are formed, and occurrence of flaking resulting from hydrogen embrittlement is suppressed.

In outer race 811, inner race 812 and balls 813 according to this embodiment, the sum of the content of molybdenum and the content of vanadium is preferably not more than half the content of chromium in the steel constituting these. Thus, the manufacturing cost for these can be suppressed.

In outer race 811, inner race 812 and balls 813 according to this embodiment, the content of silicon is preferably not more than the sum of the content of molybdenum and the content of vanadium in the steel constituting these. Thus, flaking resulting from hydrogen embrittlement can be further suppressed by molybdenum and vanadium while suppressing promotion of flaking resulting from hydrogen embrittlement by silicon.

In outer race 811, inner race 812 and balls 813 according to this embodiment, the hardness of the surface layer portions of hardened layers 811B, 812B and 813B is preferably at least 550 HV in a case where a treatment of holding the same at a temperature of 500° for 60 minutes is performed. Thus, rolling contact fatigue lives in a high-temperature environment are sufficiently ensured.

The structures of the thrust needle roller bearings as the transmission rolling bearings, bearing washers as transmission raceway members and needle rollers (acicular rollers) according to the eighth embodiment of the present invention are now described with reference to FIG. 21.

Figure 21:
FIG. 21 is a schematic sectional view showing the structure of a thrust needle roller bearing according to the eighth embodiment.

Referring to FIG. 21, each thrust needle roller bearing 802 according to the eighth embodiment has a structure basically similar to that of aforementioned deep-groove ball bearing 801, and attains a similar effect. In the structures of raceway members and rolling elements, however, thrust needle roller bearing 802 is different from deep-groove ball bearing 801. In other words, thrust needle roller bearing 802 includes a pair of bearing washers 821 having a discoidal shape as needle roller bearing rolling members (raceway members) so arranged that first major surfaces are opposed to each other, a plurality of needle rollers 823 as needle roller bearing rolling members (acicular rollers) and an annular cage 824. Plurality of needle rollers 823 are in contact with bearing washer rolling surfaces 821A formed on the opposed first major surfaces of pair of bearing washers 821 on roller rolling surfaces 823A which are the outer peripheral surfaces of needle rollers 823 and arranged at a prescribed pitch in the peripheral direction by cage 824 to be held on an annular raceway in a rollable manner. According to the aforementioned structure, pair of bearing washers 821 of thrust needle roller bearing 802 are relatively rotatable with respect to each other.

Bearing washers 821 of thrust needle roller bearing 802 correspond to outer race 811 and inner race 812 of the deep-groove ball bearing and needle rollers 823 of thrust needle roller bearing 802 correspond to balls 813 of the deep-groove ball bearing respectively, are made of similar materials, and have hardened layers and inner portions of similar structures. Consequently, bearing washers 821 and needle rollers 823 according to this embodiment are transmission rolling members having long lives also in such a severe environment that foreign matter is mixed into the bearing and the bearing is exposed to a high temperature, while the contents of alloying elements causing reduction of the workability and increase of the manufacturing cost are suppressed in the steel constituting bearing washers 821 and needle rollers 823. Further, thrust needle roller bearing 802 as the transmission rolling bearing according to this embodiment is a transmission rolling bearing having a long life also in such a severe environment that foreign matter is mixed into the bearing and the bearing is exposed to a high temperature, while the contents of alloying elements are suppressed in the steel constituting the rolling members.

A modification of the thrust needle roller bearing as the transmission rolling bearing according to the eighth embodiment of the present invention is now described with reference to FIG. 22.

Figure 22:
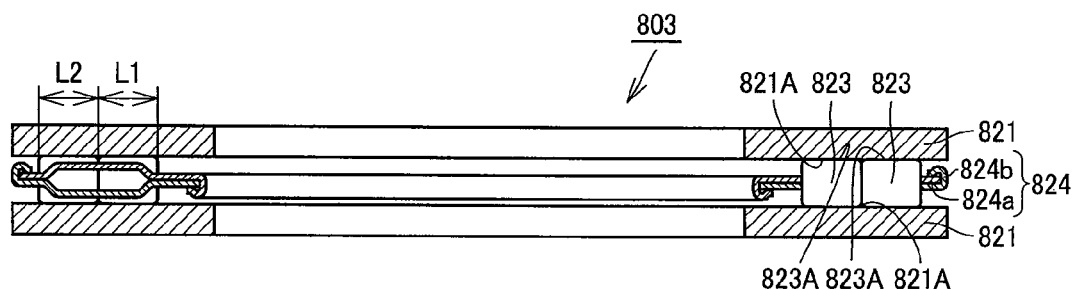
FIG. 22 is a schematic sectional view showing the structure of a modification of the thrust needle roller bearing according to the eighth embodiment.

Referring to FIG. 22, a thrust needle roller bearing 803 basically has a structure similar to that of thrust needle roller bearing 802 described with reference to FIG. 21. In the structures of rolling elements, however, thrust needle roller bearing 803 is different from thrust needle roller bearing 802.

In other words, thrust needle roller bearing 803 includes a plurality of rows (two rows) of needle rollers 823 including needle rollers 823 on an inner peripheral side and needle rollers 823 on an outer peripheral side. In this case, a cage 824 is preferably formed by overlapping two annular members 824a and 824b to be in contact with each other. Preferably, an inner peripheral end portion of annular member 824a is folded toward the side of annular member 824b and caulked, while an outer peripheral end portion of annular member 824b is folded toward the side of annular member 824a and caulked. Thus, two annular members 824a and 824b can be caulked/fixed and strongly integrated with each other.

While lengths L1 and L2 of needle rollers 823 on the inner peripheral side and the outer peripheral side in plurality of rows of needle rollers 823 are rendered identical to each other, L1≦L2 or L2≦L1 can be selected depending on use conditions. A load capacity on an outer diametral side is preferably increased by setting the length L2 of needle rollers 823 on the outer peripheral side longer than the length L1 of needle rollers 823 on the inner peripheral side to be 1.2 times the length L1, for example.

The structure of thrust needle roller bearing 803 other than the above is substantially identical to the structure of aforementioned thrust needle roller bearing 802, and hence the same components are denoted by the same reference signs, and description thereof is omitted. Deep-groove ball bearing 801, thrust needle roller bearing 802 and thrust needle roller bearing 803 according to this embodiment can be manufactured by a manufacturing process similar to that for deep-groove ball bearing 1 described in the first embodiment.

Ninth Embodiment

A transmission including a transmission rolling bearing according to a ninth embodiment which is one embodiment of the present invention is now described.

Figure 23:
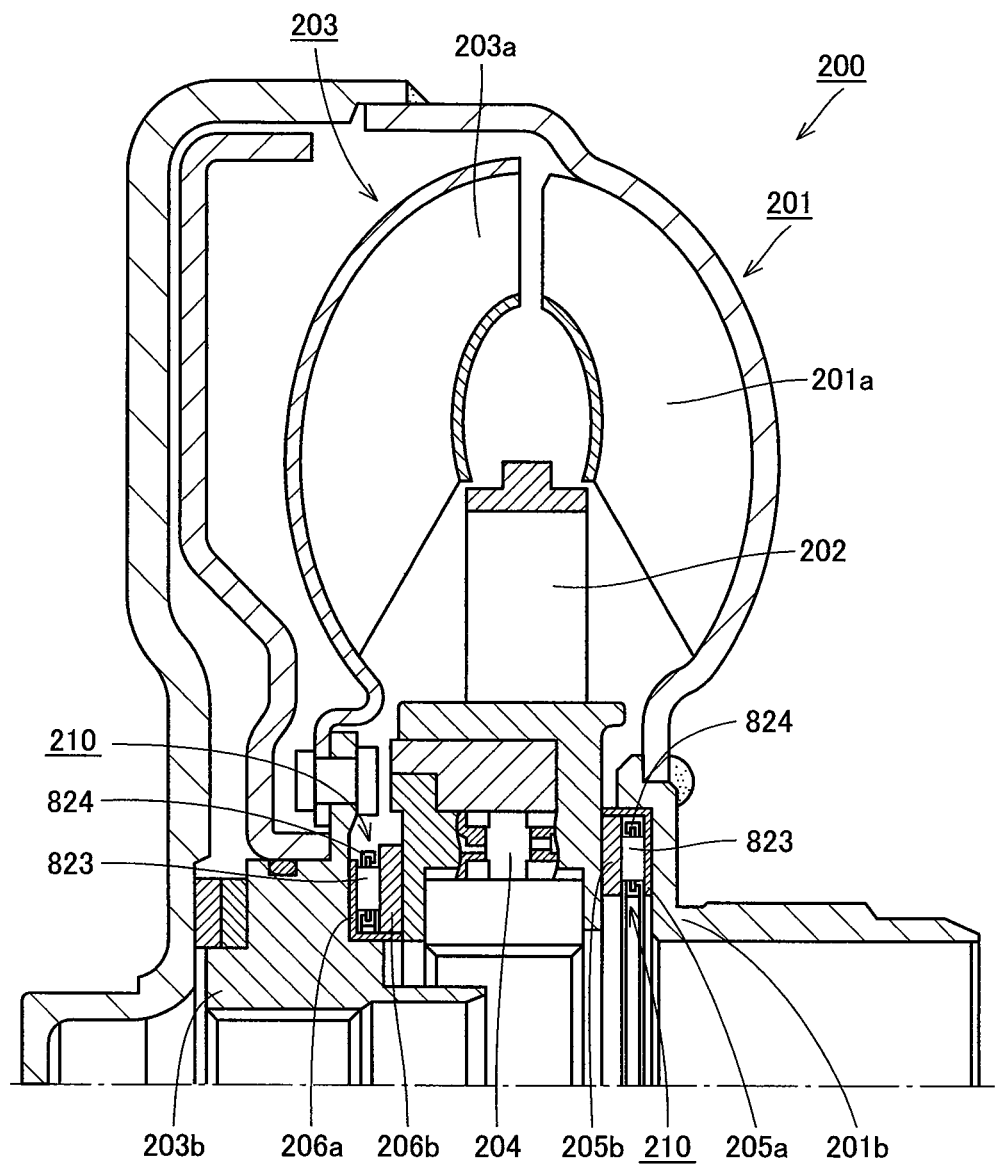
FIG. 23 is a sectional model diagram showing the structure of a torque converter portion of an automatic transmission according to a ninth embodiment.

Referring to FIG. 23, an automatic transmission according to the ninth embodiment includes a torque converter 200 and a planetary gear mechanism (not shown). Torque converter 200 includes an impeller 201, a stator 202 and a turbine 203.

Thrust needle roller bearings 210 are arranged between impeller 201 and stator 202 and between stator 202 and turbine 203. In other words, thrust needle roller bearings 210 are automatic transmission rolling bearings as transmission rolling bearings arranged between stator 202 and impeller 201 and between stator 202 and turbine 203 for receiving a thrust load in the automatic transmission including torque converter 200 having impeller 201 and turbine 203 facing each other through stator 202.

In torque converter 200, impeller 201 coupled to an output shaft of an engine and turbine 203 coupled to an input shaft of the automatic transmission are arranged to be opposed to each other. Stator 202 is mounted on a stator shaft fixed to a casing through a one-way clutch 204. When returning fluid refluxed between an impeller blade 201a and a turbine blade 203a in the form of bowls respectively from the side of turbine 203 to the side of impeller 201 on inner diametral sides thereof, stator 202 supplies forward torque to impeller 201 by changing the flow direction of the fluid and amplifies transmission torque.

Thrust needle roller bearing 210 between impeller 201 and stator 202 includes needle rollers 823, a cage 824 and washers 205a and 205b. Washer 205a is assembled into an impeller hub 201b, while washer 205b is assembled into the side of stator 202.

On the other hand, thrust needle roller bearing 210 between stator 202 and turbine 203 includes needle rollers 823, a cage 824 and washers 206a and 206b. Washer 206a is assembled into a turbine hub 203b, while washer 206b is assembled into the side of stator 202.

Thrust needle roller bearings 210 according to the ninth embodiment and washers 205a, 205b, 206a and 206b and needle rollers 24 constituting the same have structures similar to those of thrust needle roller bearings 802 and 803 described with reference to FIGS. 21 and 22. The respective ones of washers 205a and 205b and washers 206a and 206b of thrust needle roller bearings 210 correspond to bearing washers 821 of thrust needle roller bearings 802 and 803. Therefore, washers 205a, 205b, 206a and 206b and needle rollers 823 according to this embodiment are transmission rolling members having long lives also in such a severe environment that foreign matter is mixed into the bearing and the bearing is exposed to a high temperature, while the contents of alloying elements causing reduction of the workability and increase of the manufacturing cost are suppressed in the steel constituting washers 205a, 205b, 206a and 206b and needle rollers 823. Further, each thrust needle roller bearing 210 as the transmission rolling bearing according to this embodiment is a transmission rolling bearing having a long life also in such a severe environment that foreign matter is mixed into the bearing and the bearing is exposed to a high temperature, while the contents of alloying elements are suppressed in the steel constituting the rolling elements. Thrust needle roller bearing 210 according to the ninth embodiment can be manufactured by a manufacturing process similar to that for deep-groove ball bearing 1 described in the first embodiment.

Tenth Embodiment

Figure 24:
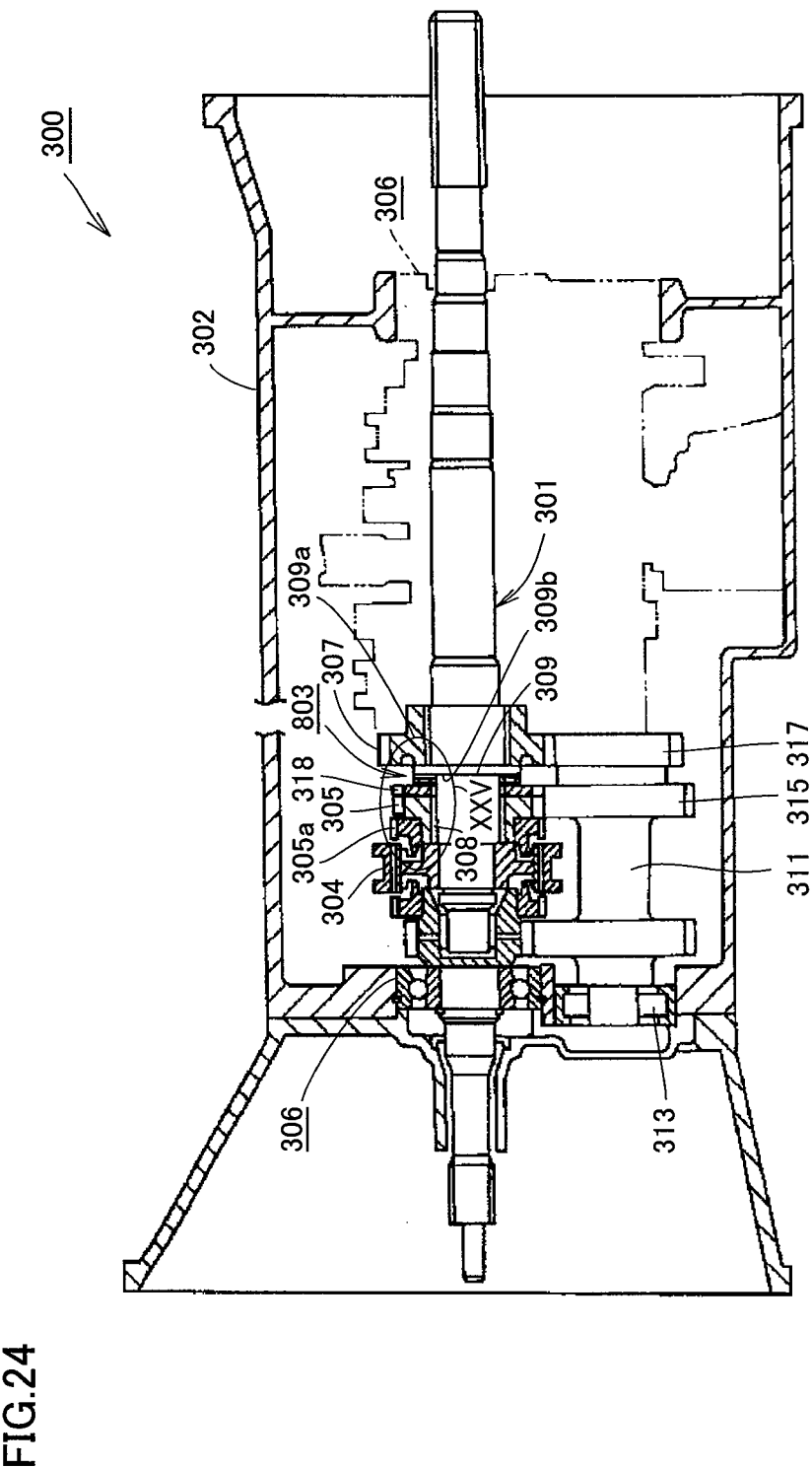
FIG. 24 is a schematic sectional view showing the structure of a gear mechanism portion of an automatic transmission according to a tenth embodiment.
Figure 25:
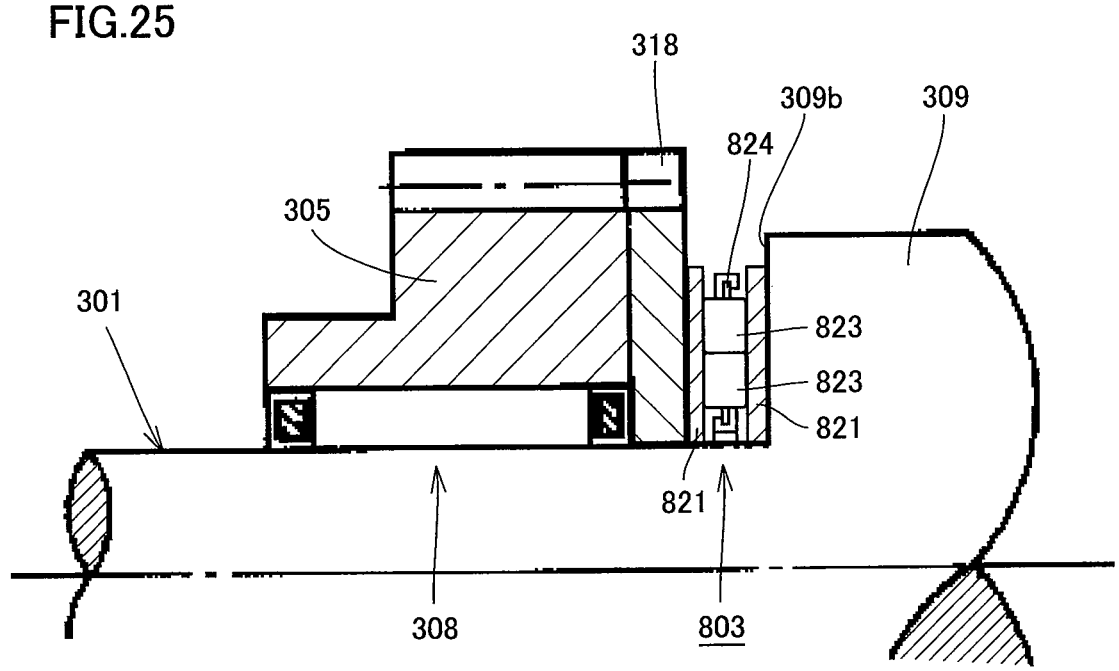
FIG. 25 is a sectional model diagram showing a region XXV in FIG. 24 in an enlarged manner.

Referring to FIGS. 24 and 25, a shaft 301 is a main shaft in a gear mechanism portion 300, and rotatably supported in a case 302 by front and rear radial ball bearings 306. A synchro hub 304 is provided on the outer periphery of shaft 301, while an idle gear 305 is provided adjacently to one side thereof to be rotatable through a radial roller bearing 308. Idle gear 305 is a three-speed main gear, and has a clutch gear 305a on the side of synchro hub 304. A large-diametral shaft portion 309 is formed on the outer periphery of shaft 301 on a side (right side of idle gear 305 in FIGS. 24 and 25) opposite to synchro hub 304 as viewed from idle gear 305 which is the three-speed main gear. On the right side of large-diametral shaft portion 309, another idle gear 307 is rotatably provided on shaft 301 through a rolling bearing, in contact with a step surface 309a thereof. Other idle gear 307 is a two-speed main gear engaging with and disengaging from another synchro hub.

A shaft 311 is a counter shaft, and rotatably supported in case 302 by a bearing such as a radial roller bearing 313 parallelly to aforementioned shaft 301. Gears 315 and 317 meshing with aforementioned idle gears 305 and 307 on the side of shaft 301 are provided on shaft 311 in fixed states respectively.

A scissors gear (i.e., a gear for interposition) 318 identical in diameter to and different in number of teeth from idle gear 305 is provided between an end panel of idle gear 305 which is the three-speed main gear and step surface 309b of large-diametral shaft portion 309 of shaft 301 which is the main shaft, to be rotatable with respect to shaft 301 in contact with the end panel of idle gear 305. Idle gear 305 and scissors gear 318 mesh with the same gear 315 of shaft 311 which is the counter shaft. While scissors gear 318 may simply be meshable with same gear 315 as idle gear 305, the diameters of all of a pitch circle, a tip circle and a root circle are rendered identical to those of idle gear 305 in this embodiment. A thrust needle roller bearing 803 interposed as a support structure is provided between aforementioned scissors gear 318 and step surface 309b of aforementioned large-diametral shaft portion 309.

Referring to FIG. 25, thrust needle roller bearing 803 includes needle rollers 823, a cage 824 and bearing washers 821, similarly to the eighth embodiment. Bearing washer 821 of thrust needle roller bearing 803 on a side in contact with aforementioned scissors gear 318 is rotatable with respect to shaft 301, while bearing washer 821 on a side in contact with step surface 309b of large-diametral shaft portion 309 is fixed to shaft 301.

According to the aforementioned structure, shaft 301 and idle gear 305 synchronously rotate in a shift state where synchro hub 304 meshes with clutch gear 305a of idle gear 305, while the number of teeth of scissors gear 318 is rendered different from that of idle gear 305, and hence it follows that shaft 301 and scissors gear 318 relatively rotate. Consequently, relative rotation is caused between bearing washer 821 of thrust needle roller bearing 803 on the side in contact with scissors gear 318 and bearing washer 821 on the side in contact with step surface 309b, and it follows that needle rollers 823 also rotate and revolve.

Each radial ball bearing 306 according to the tenth embodiment has a structure similar to that of deep-groove ball bearing 801 described with reference to FIGS. 19 and 20. Further, thrust needle roller bearing 803 has a structure similar to that of thrust needle roller bearing 803 described with reference to FIG. 22. In addition, radial roller bearings 308 and 313 have structures similar to those of deep-groove ball bearing 801 and thrust needle roller bearing 803 in raceway members and rolling elements thereof.

Therefore, the raceway members and the rolling elements constituting radial ball bearing 306, thrust needle roller bearing 803 and radial roller bearings 308 and 313 which are the transmission rolling members according to this embodiment are transmission rolling members having long lives also in such a severe environment that foreign matter is mixed into the bearing and the bearing is exposed to a high temperature, while the contents of alloying elements causing reduction of the workability and increase of the manufacturing cost are suppressed in the steel constituting the raceway members and the rolling elements. Further, radial ball bearing 306, thrust needle roller bearing 803 and radial roller bearings 308 and 313 as the transmission rolling bearings according to this embodiment are transmission rolling bearings having long lives also in such a severe environment that foreign matter is mixed into the bearings and the bearings are exposed to a high temperature, while the contents of alloying elements are suppressed in the steel constituting the rolling members. Radial ball bearing 306, thrust needle roller bearing 803 and radial roller bearings 308 and 313 according to the tenth embodiment can be manufactured by a manufacturing process similar to that for deep-groove ball bearing 1 described in the first embodiment.

Eleventh Embodiment

The structure of a transmission mechanism including a continuously variable transmission according to an eleventh embodiment is described with reference to FIGS. 26 and 27.

Figure 26:
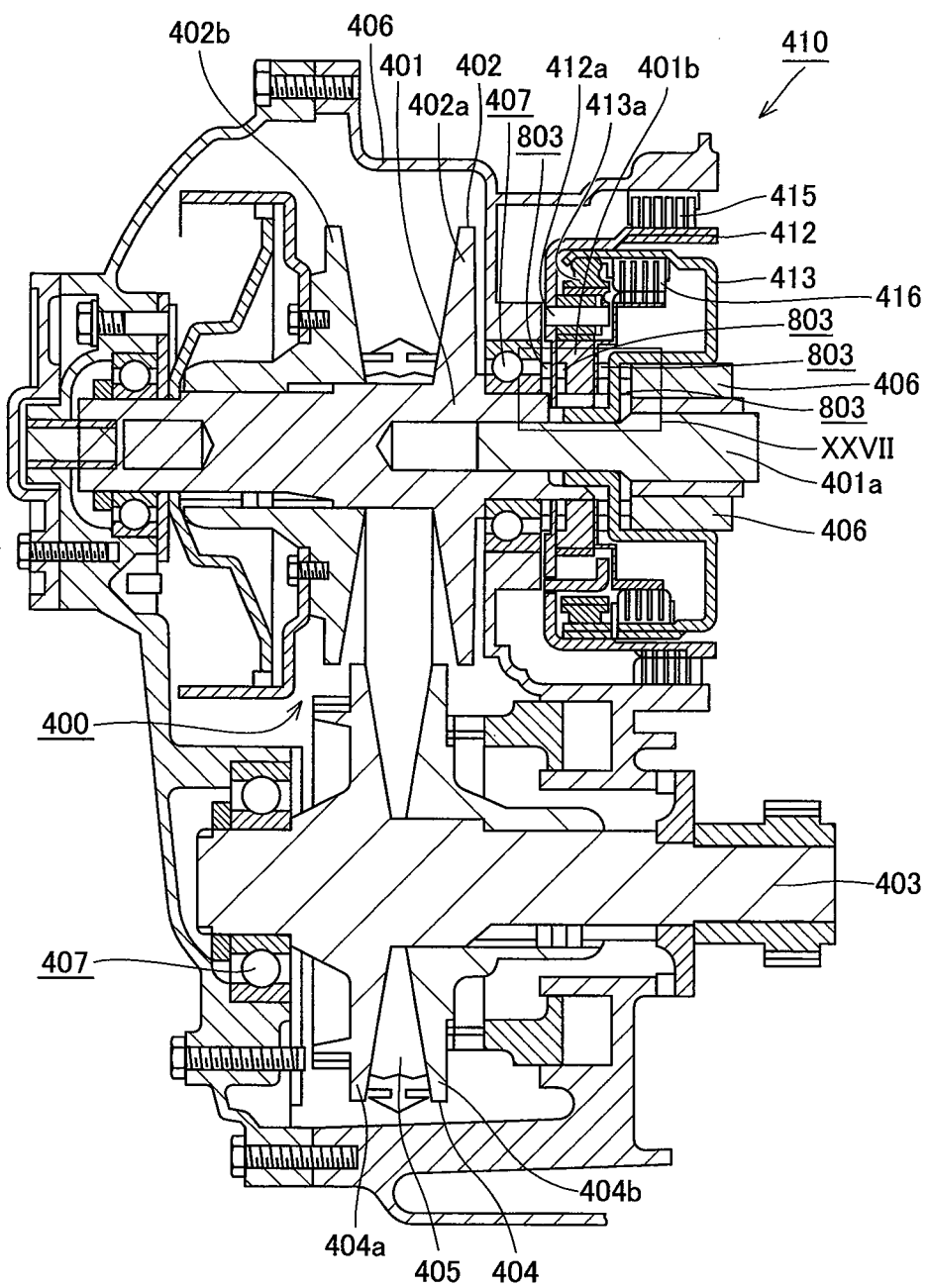
FIG. 26 is a schematic sectional view showing the structure of a transmission mechanism including a continuously variable transmission according to an eleventh embodiment.

Referring to FIG. 26, driving force generated in an engine (not shown) is transmitted to a continuously variable transmission 400 from a crank shaft (not shown) through a torque converter (not shown) and a forward/backward movement switching mechanism 410.

Forward/backward movement switching mechanism 410 includes a planetary gear mechanism and multiple disc clutches 415 and 416. The planetary gear mechanism has a ring gear 413 fixed to a shaft 401a through a support member 413, a sun gear 410b fixed to a primary shaft 401 and a planetary pinion 412a rotatably supported by a support member 412. Planetary pinion 412a meshes with the respective ones of ring gear 413a and sun gear 401b.

Multiple disc clutch 415 is assembled between the outer periphery of support member 412 and the inner periphery of a housing 406 as a backward brake. Multiple disc clutch 416 is assembled between the outer periphery of primary shaft 401 and the inner periphery of support member 413 as a forward clutch. A mechanism (not shown) capable of supplying oil pressure to the respective ones of multiple disc clutches 415 and 416 is provided.

When bringing multiple disc clutch (forward clutch) 416 into a connected state by supplying oil pressure, rotation of shaft 401a is forwardly transmitted to primary shaft 401. When bringing multiple disc clutch (backward brake) 415 into a connected state by supplying oil pressure, the rotation of shaft 401a is reversely transmitted to primary shaft 401. Thus, forward and backward movements can be controlled.

Continuously variable transmission 400 includes input-side primary shaft 401 coupled to forward/backward movement switching mechanism 410, a primary pulley 402 provided on primary shaft 401, an output-side secondary shaft 403 so arranged that the rotation axis is parallel to primary shaft 401, a secondary pulley 404 provided on secondary shaft 403, and a belt 405 extended along both of primary pulley 402 and secondary pulley 404.

Primary pulley 402 has a fixed pulley 402a fixed to primary shaft 401 and a movable pulley 402b opposed thereto and axially slidably mounted on primary shaft 401 by a ball spline or the like. Movable pulley 402b so axially slides that a cone surface space of the pulley, i.e., the pulley groove width is variable.

Secondary pulley 404 has a fixed pulley 404a fixed to secondary shaft 403 and a movable pulley 404b opposed thereto and axially slidably mounted on secondary shaft 403 by a ball spline or the like. Movable pulley 404b so axially slides that a cone surface space of the pulley, i.e., the pulley groove width is variable.

The groove widths of both pulleys are so changed that contact diameters of belt 405 with primary pulley 402 and secondary pulley 404 change. Thus, the ratios of inside diameters of belt 405 with respect to the respective ones of primary pulley 402 and secondary pulley 404 change. Therefore, rotation of primary shaft 401 is transmitted to secondary shaft 403 while the speed thereof is changed in a non-stage manner. In other words, continuously variable transmission 400 is such a continuously variable transmission that the rotation of primary shaft 401 which is an input shaft is transmitted to secondary shaft 403 which is an output shaft while the speed thereof is changed in a non-stage manner.

According to the eleventh embodiment, a radial ball bearing 407 is provided in order to rotatably support primary shaft 401 and secondary shaft 403. Further, thrust needle roller bearings 803 are provided in order to receive thrust loads of shaft 401a and primary shaft 401 on the input side and secondary shaft 403 on the output side.

Figure 27:
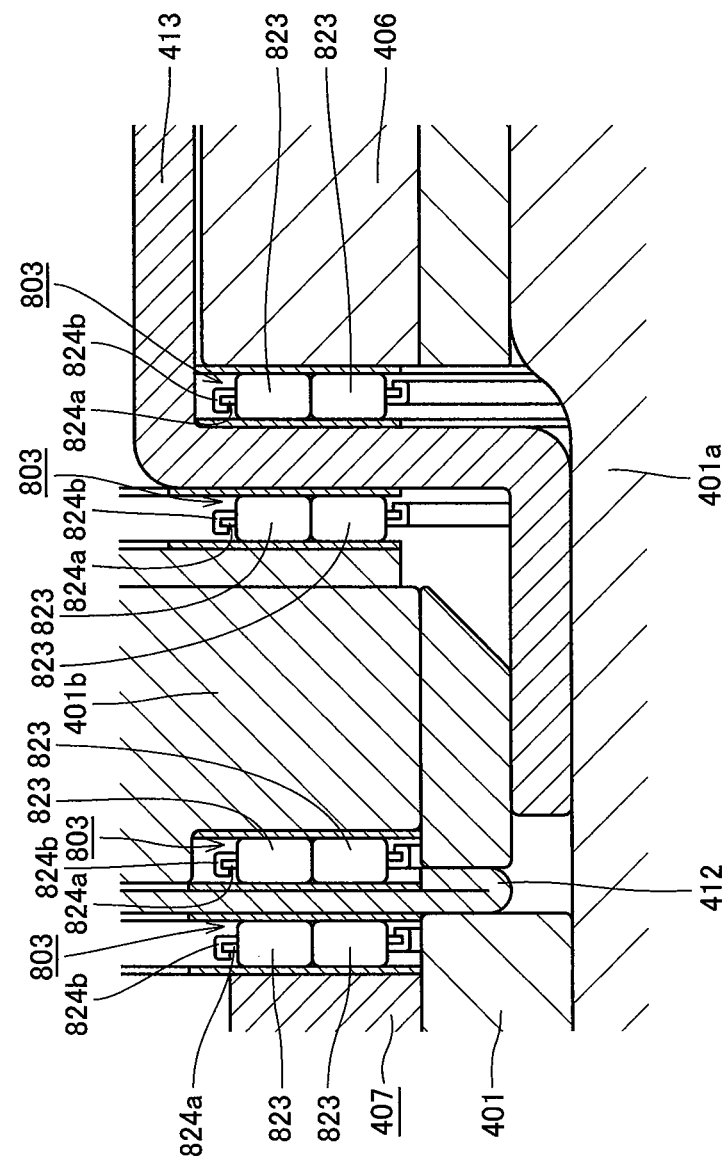
FIG. 27 is a sectional model diagram showing a region XXVII in FIG. 26 in an enlarged manner.

Referring to FIG. 27, thrust needle roller bearings 803 are arranged between an inner race of radial ball bearing 407 rotatably supporting primary shaft 401 and support member 412, between support member 412 and sun gear 401b, between sun gear 401b and support member 413 and between support member 413 and housing 406, for example. Each thrust needle roller bearing 803 has needle rollers 823 and two cages 824a and 824b for holding needle rollers 823. Needle rollers 823 are arranged in a plurality of rows.

Radial ball bearing 407 according to the eleventh embodiment has a structure similar to that of deep-groove ball bearing 801 described with reference to FIGS. 19 and 20. Each thrust needle roller bearing 803 has a structure similar to that of thrust needle roller bearing 803 described with reference to FIG. 22.

Therefore, raceway members and rolling elements constituting radial ball bearing 407 and thrust needle roller bearing 803, which are transmission rolling members according to this embodiment, are transmission rolling members having long lives also in such a severe environment that foreign matter is mixed into the bearings and the bearings are exposed to a high temperature, while the contents of alloying elements causing reduction of the workability and increase of the manufacturing cost are suppressed in the steel constituting the raceway members and the rolling elements. Further, radial ball bearing 407 and thrust needle roller bearing 803 as transmission rolling bearings according to this embodiment are transmission rolling bearings having long lives also in such a severe environment that foreign matter is mixed into the bearings and the bearings are exposed to a high temperature, while the contents of alloying elements are suppressed in the steel constituting the rolling members. Radial ball bearing 407 and thrust needle roller bearing 803 according to the eleventh embodiment can be manufactured by a manufacturing process similar to that for deep-groove ball bearing 1 described in the first embodiment.

Twelfth Embodiment

The structures of a thrust needle roller bearing as a needle roller bearing, bearing washers as needle roller bearing raceway members and needle rollers (acicular rollers) according to a twelfth embodiment of the present invention are now described with reference to FIGS. 28 to 30.

Figure 28:
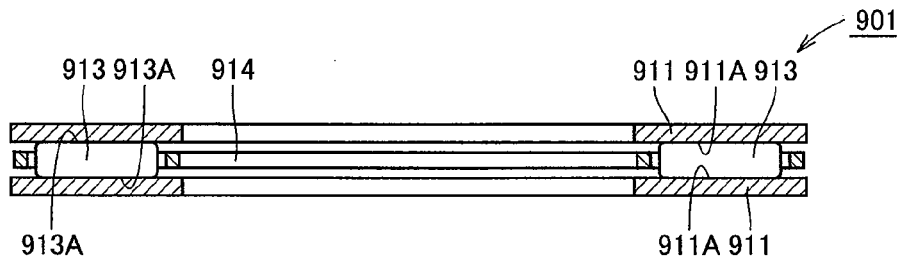
FIG. 28 is a schematic sectional view showing the structure of a thrust needle roller bearing including a needle roller bearing rolling member according to a twelfth embodiment.

Referring to FIG. 28, a thrust needle roller bearing 901 according to the twelfth embodiment includes a pair of bearing washers 911 having a discoidal shape as needle roller bearing rolling members (raceway members) so arranged that first major surfaces are opposed to each other, a plurality of needle rollers 913 as needle roller bearing rolling members (acicular rollers) and an annular cage 914. Plurality of needle rollers 913 come into contact with bearing washer rolling surfaces 911A formed on the opposed first major surfaces of pair of bearing washers 911 and are arranged at a prescribed pitch in the peripheral direction by cage 914 to be held on an annular raceway in a rollable manner. According to the aforementioned structure, pair of bearing washers 911 of thrust needle roller bearing 901 are relatively rotatable with respect to each other.

Each bearing washer 911 and each needle roller 913 as needle roller bearing rolling members constituting thrust needle roller bearing 901 which is a needle roller bearing are now described. Referring to FIGS. 28 to 30, bearing washer 911 and needle roller 913 are needle roller bearing rolling members constituting thrust needle roller bearing 901 including needle roller 913 in which the diameter of the roller as the rolling element is not more than 5 nm and the length of this roller is at least three times and not more than 10 times the diameter of the roller. Bearing washer 911 and needle roller 913 are constituted of steel containing at least 0.3 mass % and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium with the rest consisting of iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass %.

Further, hardened layers 911B and 913B having larger carbon contents than respective inner portions 911C and 913C are formed on regions including the surfaces of bearing washer 911 and needle roller 913. The hardness of surface layer portions of hardened layers 911B and 913B is at least 725 HV and not more than 800 HV. The maximum grain sizes of carbides distributed in the surface layer portions of hardened layers 911B and 913B are not more than 10 µm, and the area ratios of the carbides on the surface layer portions are at least 7% and not more than 25%. Further, the hardness of inner portions 911C and 913C of the respective ones of bearing washer 911 and needle roller 913 is at least 450 HV and not more than 650 HV.

In bearing washer 911 and needle roller 913 as the needle roller bearing rolling members according to the twelfth embodiment, the content of silicon having a possibility of promoting flaking resulting from hydrogen embrittlement is reduced and the contents of alloying elements such as chromium, vanadium and molybdenum are suppressed while the balance between the contents is properly adjusted in the steel constituting bearing washer 911 and needle roller 913. In bearing washer 911 and needle roller 913 according to the twelfth embodiment, the sizes and the area ratios of the carbides on the surface layer portions of hardened layers 911B and 913B and hardness distributions in bearing washer 911 and needle roller 913 are adjusted to proper ranges. Consequently, bearing washer 911 and needle roller 913 according to the twelfth embodiment are needle roller bearing rolling members having long lives also in such a severe environment that sliding on rolling surfaces 11A and 13A is remarkable and the bearing is exposed to a high temperature, while the contents of alloying elements causing reduction of the workability and increase of the manufacturing cost are suppressed in the steel constituting bearing washer 911 and needle roller 913. Further, thrust needle roller bearing 901 as the needle roller bearing according to the twelfth embodiment is a needle roller bearing having a long life also in such a severe environment that sliding on rolling surfaces 11A and 13A is remarkable and the bearing is exposed to a high temperature, while the contents of alloying elements are suppressed in the steel constituting the rolling members.

In bearing washer 911 and needle roller 913 according to the twelfth embodiment, the sum of the content of molybdenum and the content of vanadium is preferably at least 0.6 mass % in the steel constituting these. Thus, fine carbides and carbonitrides of molybdenum and vanadium functioning as trap sites of hydrogen are formed, and occurrence of flaking resulting from hydrogen embrittlement is suppressed.

In bearing washer 911 and needle roller 913 according to the twelfth embodiment, the sum of the content of molybdenum and the content of vanadium is preferably not more than half the content of chromium in the steel constituting these. Thus, the manufacturing cost for these can be suppressed.

In bearing washer 911 and needle roller 913 according to the twelfth embodiment, the content of silicon is preferably not more than the sum of the content of molybdenum and the content of vanadium in the steel constituting these. Thus, flaking resulting from hydrogen embrittlement can be further suppressed by molybdenum and vanadium while suppressing promotion of flaking resulting from hydrogen embrittlement by silicon.

In bearing washer 911 and needle roller 913 according to the twelfth embodiment, the hardness of the surface layer portions of hardened layers 911B and 913B is preferably at least 550 HV in a case where a treatment of holding the same at a temperature of 500° C. for 60 minutes is performed. Thus, rolling contact fatigue lives in a high-temperature environment are sufficiently ensured.

Thrust needle roller bearing 901 according to this embodiment can be manufactured by a manufacturing process similar to that for deep-groove ball bearing 1 described in the first embodiment.

Thirteenth Embodiment

The structures of a radial needle roller bearing as a needle roller bearing and bearing races and needle rollers as needle roller bearing rolling members according to a thirteenth embodiment of the present invention are now described with reference to FIG. 31.

Figure 31:
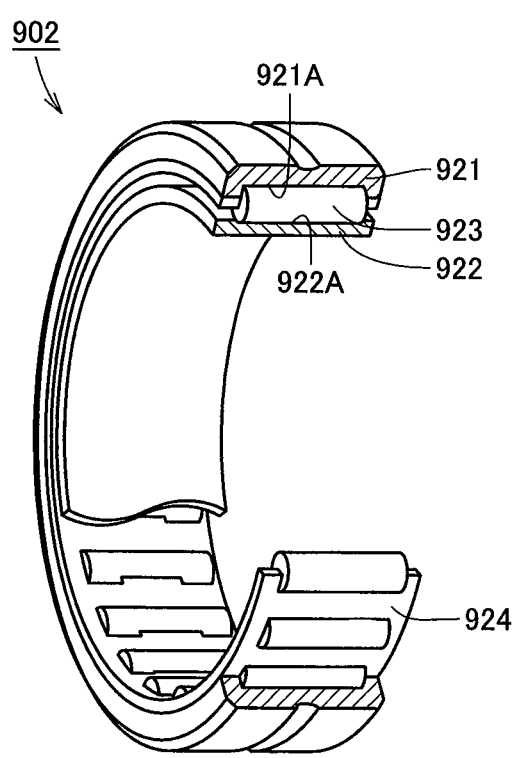
FIG. 31 is a schematic diagram showing the structure of a radial needle roller bearing including a needle roller bearing rolling member according to a thirteenth embodiment.

Referring to FIG. 31, a radial needle roller bearing 902 according to the thirteenth embodiment and thrust needle roller bearing 901 according to the twelfth embodiment basically have similar structures and have similar effects, while the same are different from each other in structures of bearing rings. In other words, radial needle roller bearing 902 includes an annular outer race 921 as a needle roller bearing rolling member (bearing race), an annular inner race 922 as a needle roller bearing rolling member (bearing race) arranged inside outer race 921 and a plurality of needle rollers 923 as needle roller bearing rolling members (rolling elements) arranged between outer race 921 and inner race 922 and held by an annular cage 924. An outer race rolling surface 921A is formed on the inner peripheral surface of outer race 921, while an inner race rolling surface 922A is formed on the outer peripheral surface of inner race 922. Outer race 921 and inner race 922 are so arranged that inner race rolling surface 922A and outer race rolling surface 921A are opposed to each other. Further, roller rolling surfaces which are the outer peripheral surfaces of plurality of needle rollers 923 are in contact with inner race rolling surface 922A and outer race rolling surface 921A, and needle rollers 923 are arranged at a prescribed pitch in the peripheral direction by cage 924 to be held on an annular raceway in a rollable manner. According to the aforementioned structure, outer race 921 and inner race 922 of radial needle roller bearing 902 are relatively rotatable with respect to each other.

Figure 29:
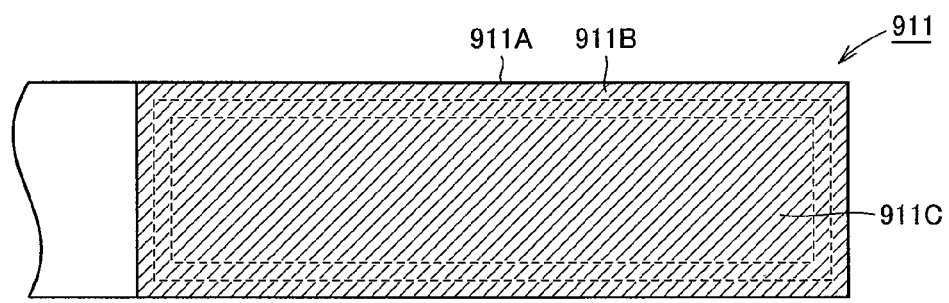
FIG. 29 is a schematic partial sectional view of a bearing washer of the thrust needle roller bearing shown in FIG. 28.
Figure 30:
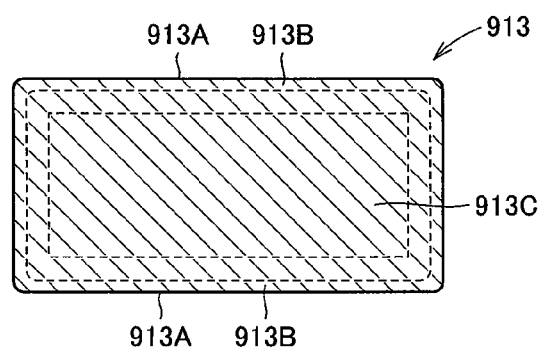
FIG. 30 is a schematic sectional view of a needle roller included in the thrust needle roller bearing shown in FIG. 28.

Referring to FIGS. 28 to 30 and 31, outer race 921 and inner race 922 according to the thirteenth embodiment correspond to bearing washers 911 according to the twelfth embodiment, needle rollers 923 according to the thirteenth embodiment correspond to needle rollers 913 according to the twelfth embodiment, and have similar structures and effects. In other words, hardened layers similar to those of bearing washers 911 and needle rollers 913 described with reference to FIGS. 29 and 30 are formed on regions including the surfaces of outer race 921, inner race 922 and needle rollers 923, while the hardness of inner portions is also at least 450 HV and not more than 650 HV.

Consequently, outer race 921, inner race 922 and needle rollers 923 according to the thirteenth embodiment are needle roller bearing rolling members having long lives also in such a severe environment that sliding on rolling surfaces is remarkable and the bearing is exposed to a high temperature, while the contents of alloying elements causing reduction of the workability and increase of the manufacturing cost are suppressed in the steel constituting outer race 921, inner race 922 and needle rollers 923. Further, radial needle roller bearing 902 as the needle roller bearing according to the thirteenth embodiment is a needle roller bearing having a long life also in such a severe environment that sliding on the rolling surfaces is remarkable and the bearing is exposed to a high temperature, while the contents of alloying elements are suppressed in the steel constituting the rolling members.

Radial needle roller bearing 902 according to this embodiment can be manufactured by a manufacturing process similar to that for deep-groove ball bearing 1 described in the first embodiment.

The rolling member and the rolling bearing according to the present invention are not restricted to the rolling bearings having the modes described with reference to the aforementioned first to thirteenth embodiments and the bearing rings and the rolling elements provided on the rolling bearings, but the present invention is applicable to a rolling bearing of an arbitrary mode and a bearing ring and a rolling element provided on the rolling bearing.

Example 1

Example 1 is now described. Test pieces (test pieces Nos. 1 to 4) were prepared by carrying out the heat treatment step in the process for manufacturing a rolling member according to the present invention on steel stocks made of steel constituting the rolling member according to the present invention, and a test of surveying material characteristics thereof was conducted. As comparative examples, test pieces (test pieces Nos. 5 to 8) were prepared by carrying out the heat treatment step in the process for manufacturing a rolling member according to the present invention on steel stocks made of steel out of the component range of the steel constituting the rolling member according to the present invention and test pieces (test pieces Nos. 9 and 10) were prepared by carrying out a general heat treatment step on conventional steel (JIS SCM 420 and SUJ 2) generally employed as steel for bearings, and a test of surveying material characteristics thereof was similarly conducted. The specific procedures of the tests are as follows:

First, a method of preparing each test piece employed as the object of the test is described. First, a steel stock having chemical components shown in Table 1 was prepared. Referring to Table 1, the respective contents of carbon (C), silicon (Si), manganese (Mn), nickel (Ni), chromium (Cr), molybdenum (Mo) and vanadium (V) are shown in mass % as to principal chemical components, and the rest of the described components consists of iron and unavoidable impurities. The aforementioned steel stock was formed into a rough shape of the test piece, to obtain a formed component. The shape of the test piece is 12 mm in diameter $\phi$ by 22 mm in length L. Referring to Table 1, points of steel constituting the test piece of each comparative example different from the steel constituting the rolling member according to the present invention in the chemical components are shown in the column of remarks.

Then, the heat treatment step in the first embodiment described with reference to FIG. 4 was carried out on each formed component other than the formed components consisting of conventional steel. $T_1$ was set to 940° C. and $t_1$ was set to 570 minutes, $T_2$ was set to 940° C. and $t_2$ was set to 210 minutes, $T_3$ was set to 850° C. and $t_3$ was set to 30 minutes, a $C_P$ value in a period when carbonitriding was performed at the temperature $T_1$ was set to 1.2, an ammonia concentration in an atmosphere in carbonitriding was set to 10 volume %, and $T_4$ was set to 280° C. and $t_4$ was set to 120 minutes.

On the formed component made of SCM 420, on the other hand, carburization and diffusion were performed by holding the same in an atmosphere of 920° C. having a $C_P$ value of 1.0 for 480 minutes, and primary quenching was thereafter performed by cooling the same to 850° C. and thereafter rapidly cooling the same. Further, secondary quenching was performed by reheating the same to 850° C. and thereafter rapidly cooling the same. Then, tempering was performed by heating the same to 180° C. and holding the same for 120 minutes. On the formed component made of SUJ 2, quenching was performed by heating the same to 850° C., holding the same for 40 minutes and thereafter rapidly cooling the same. Thereafter tempering was performed by heating the formed component to 180° C. and holding the same for 120 minutes.

Further, the test pieces in this Example were completed by performing finishing on the formed components subjected to quenching and tempering.

Evaluated items and evaluation methods of the material characteristics in this Example are now described. On each test piece completed through the aforementioned procedure, evaluation of the material characteristics was performed by measuring the hardness (surface layer hardness) of surface layer portions of hardened layers, the maximum grain size (maximum carbide size) of carbides distributed in the surface layer portions, the area ratio (carbide area ratio) of the carbides on the surface layer portions and the hardness (internal hardness) of inner portions and measuring the hardness (500° C. temper hardness) after performing a treatment of holding the same at a temperature of 500° C. for 60 minutes.

The maximum carbide size and the carbide area ratio were measured as follows: First, the test piece was cut, and a cut surface was polished and thereafter etched with picral. Then, 20 fields of regions corresponding to the surface portions were observed at random (400 magnifications, field area: 0.6 mm$^2$), and the maximum grain size and the area ratio of the

TABLE 1

| | Chemical Component(mass %) | | | | | | | | |
|---|---|---|---|---|---|---|---|---|---|
| No. | C | Si | Mn | Ni | Cr | Mo | V | | Remarks |
| 1 | 0.33 | 0.48 | 0.35 | 0.73 | 1.80 | 0.38 | 0.36 | | Example |
| 2 | 0.38 | 0.35 | 0.53 | 0.91 | 1.70 | 0.40 | 0.25 | | |
| 3 | 0.35 | 0.45 | 0.50 | 1.11 | 2.01 | 0.27 | 0.35 | | |
| 4 | 0.36 | 0.39 | 0.55 | 0.82 | 1.99 | 0.36 | 0.39 | | |
| 5 | 0.31 | 0.81 | 0.38 | 0.99 | 1.89 | 0.61 | 0.40 | Comparative | Si content large, Si + Mn content large |
| 6 | 0.35 | 0.50 | 0.40 | 0.79 | 2.08 | 0.79 | 0.71 | Example | Mo content large, V content large, Cr + Mo + V content large |
| 7 | 0.33 | 0.45 | 0.48 | 0.55 | 1.61 | 1.05 | 0.72 | | Mo content large, V content large, Ni + Cr content small, Cr + Mo + V content large |
| 8 | 0.35 | 0.20 | 0.35 | 0.75 | 2.18 | 0.68 | 0.38 | | Si content small, Cr + Mo + V content large |
| 9 | 0.21 | 0.25 | 0.70 | — | 1.08 | 0.25 | — | conventional steel (comparative example) | conventional carburizing steel SCM420 |
| 10 | 0.99 | 0.26 | 0.41 | — | 1.49 | — | — | | conventional bearing steel SUJ2 | carbides were surveyed with an image processor. The surface layer hardness and the internal hardness were surveyed by cutting the test piece and measuring the hardness of the surface layer portions of the hardened layers and the inner portions with a Vickers hardness tester. As to the 500° C. temper hardness, the hardness was measured similarly to the surface layer hardness after performing a treatment of holding the test piece at a temperature of 500° C. for 60 minutes. Table 2 shows the test results. Referring to Table 2, measured values whose evaluation results were out of preferable ranges are underlined. Referring to Table 2, points of the test pieces according to comparative examples different from the rolling member according to the present invention in the material characteristics are shown in the column of remarks.

TABLE 2

| | Material | | | | | | |
|---|---|---|---|---|---|---|---|
| No. | Surface Layer Hardness (HV) | Maximum Carbide Size (μm) | Carbide Area Ratio (%) | Internal Hardness (HV) | 500° C. Temper Hardness (HV) | | Remarks |
| 1 | 760 | 7 | 16 | 530 | 570 | | Example |
| 2 | 770 | 8 | 15 | 570 | 575 | | |
| 3 | 770 | 7 | 19 | 550 | 580 | | |
| 4 | 780 | 7 | 20 | 540 | 590 | | |
| 5 | 780 | 11 | 23 | 550 | 590 | comparative example | maximum carbide diameter large |
| 6 | 790 | 15 | 27 | 600 | 600 | | maximum carbide diameter large, carbide area ratio large |
| 7 | 780 | 13 | 26 | 610 | 600 | | maximum carbide diameter large, carbide area ratio large |
| 8 | 730 | 11 | 18 | 540 | 570 | | maximum carbide diameter large |
| 9 | 730(*) | 3 | 5 | 430 | 460 | conventional steel (comparative example) | SCM420; carbide area ratio small, internal hardness low, 500° C. temper hardness low |
| 10 | 740(*) | 5 | 7 | 720 | 470 | | SUJ2; internal hardness high, 500° C. temper hardness low |

(*) Tempering Temperature: 180° C.

Referring to Table 2, all test pieces have hardness in the preferable range of at least 725 HV and not more than 800 HV. In the test pieces Nos. 9 and 10 which are made of conventional steel (comparative examples), however, the temperatures for tempering are set to 180° C. for ensuring the hardness, while the temperatures for tempering the remaining test pieces are 280° C. Consequently, reduction of the hardness is increased in 500° C. temper hardness, and the preferable hardness range of at least 500 HV cannot be ensured. Therefore, there is a possibility that a rolling member made of steel having a component composition similar to those of the test pieces Nos. 9 and 10 and similarly heat-treated cannot ensure a sufficient rolling contact fatigue life when the same is used in a high-temperature environment.

As to the maximum carbide size, sizes in the preferable range of not more than 10 μm cannot be ensured in the test pieces Nos. 5 to 8 according to comparative examples. In a rolling member made of steel having a component composition similar to those of the test pieces Nos. 5 to 8 and similarly heat-treated, therefore, large-sized carbides are present in the surface layer portions of the hardened layers, and hence it is apprehended that flaking is caused from the carbides serving as starting points and the rolling contact fatigue life is reduced.

As to the carbide area ratio, area ratios in the preferable range of at least 7% and not more than 25% cannot be ensured in the test pieces Nos. 6, 7 and 9 according to comparative examples. In a rolling member made of steel having a component composition similar to those of the test pieces Nos. 6 and 7 and similarly heat-treated having high carbide area ratios, therefore, it is apprehended that the workability of the surface layer portions is reduced to cause problems such as increase of the working cost, reduction of the working accuracy etc. On the other hand, a rolling member made of steel having a component composition similar to that of the test piece No. 9 and similarly heat-treated having a low carbide area ratio has a possibility that the abrasion resistance is insufficient and the rolling contact fatigue life is reduced.

As to the internal hardness, levels in the preferable range of at least 450 HV and not more than 650 HV cannot be ensured in the test pieces Nos. 9 and 10 according to comparative examples. In a rolling member made of steel having a component composition similar to that of the test piece No. 9 and similarly heat-treated having low internal hardness, therefore, internal cracking may be caused when a relatively large load acts on the rolling member. In a rolling member made of steel having a component composition similar to that of the test piece No. 10 and similarly heat-treated having high internal hardness, on the other hand, it is apprehended that the toughness is reduced and the rolling member is easily broken when impactive force acts on the rolling member.

On the other hand, the test pieces Nos. 1 to 4 according to Example of the present invention ensure the preferable ranges in the items of all material characteristics of the surface layer hardness, the maximum carbide size, the carbide area ratio, the internal hardness and the 500° C. temper hardness. Therefore, it is conceivable that a rolling member made of steel having a component composition similar to those of the test pieces Nos. 1 to 4 and similarly heat-treated has a long life also in a severe service condition such as a high-temperature environment of an environment infiltrated with water.

Example 2

Example 2 is now described. In order to evaluate the characteristics of the rolling member according to the present invention, test pieces (test pieces Nos. 1 to 4) having structures similar to that of the rolling member according to the present invention, test pieces (test pieces Nos. 5 to 8) having structures out of the inventive ranges and test pieces (test pieces Nos. 9 and 10) obtained by carrying out a general heat treatment step on conventional steel (HS SCM 420 and SUJ 2) generally employed as steel for bearings were prepared, and a test of surveying the characteristics thereof was conducted. 13 test items of (1) a rolling contact fatigue life test, (2) a humidity cabinet test, (3) an abrasion test, (4) an ultrasonic fatigue test, (5) a peeling test, (6) a smearing test, (7) a ring crush test, (8) a ring rotation cracking fatigue test, (9) a dimensional stability test, (10) a high-speed bearing life test, (11) an excited bearing life test, (12) a foreign matter-contaminated bearing life test and (13) a thrust needle bearing life test were employed. The test procedures and the test conditions of the respective tests are now described.

(1) Rolling Contact Fatigue Life Test

Cylindrical test pieces of 12 mm in diameter φ and 22 mm in length L having chemical components similar to those of the aforementioned test pieces Nos. 1 to 10 according to Example 1 and subjected to similar heat treatments were prepared. The rolling contact fatigue life test was conducted under test conditions shown in Table 3.

TABLE 3

| Tester | NTN point contact life tester |
|---|---|
| Test Piece | φ12 mm × L22 mm |
| Counter Steel Ball | φ19.05 mm |
| Contact Stress | Pmax = 5.88 GPa |
| Load Speed | 46240 times/min. |
| Lubrication | turbine oil VG68 |

The rolling contact fatigue life test was conducted with a φ12 point contact tester. FIG. 33 shows part of the φ12 point contact tester in section. The tester for the rolling contact fatigue life test is described with reference to FIGS. 32 and 33.

Figure 32:
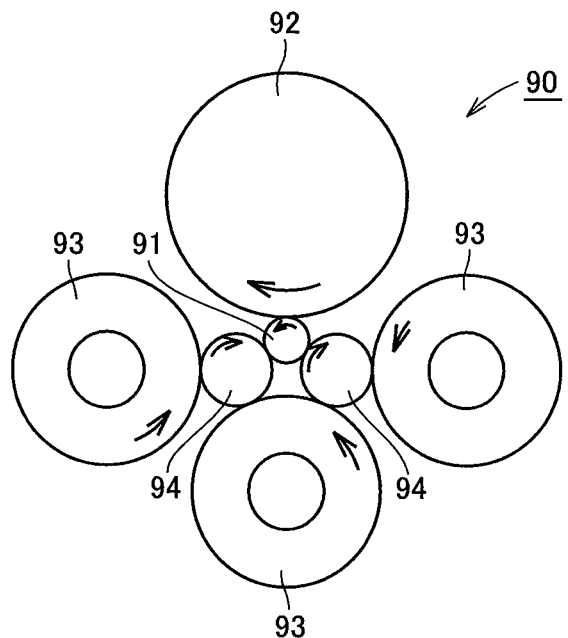
FIG. 32 is a schematic front elevational view showing the structure of a main portion of a φ12 point contact tester.
Figure 33:
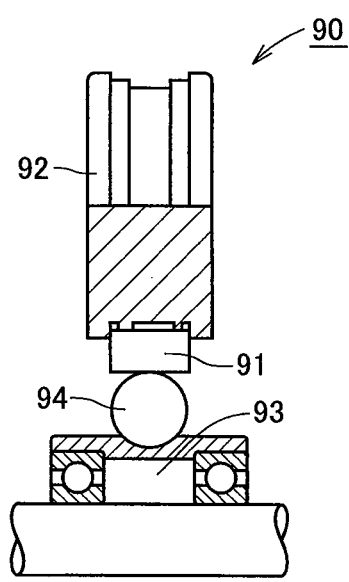
FIG. 33 is a schematic side elevational view showing the structure of the main portion of the φ12 point contact tester.

Referring to FIGS. 32 and 33, a φ12 point contact tester 90 includes a driving roller 92, guide rollers 93 and steel balls 94. A rolling contact fatigue life test piece 91 is driven by driving roller 92, and rotates in contact with steel balls 94. Steel balls 94 are guided by guide rollers 93, to roll while exerting high contact pressure between the same and rolling contact fatigue life test piece 91. Lubricating oil is fed by forced circulation. Two tests can be conducted on each test piece on different places by driving φ12 point contact tester 90 in the aforementioned manner and employing five test pieces, and hence the test number was set to 10 times, and the frequency of loading (life) up to flaking of each test piece was surveyed. The obtained life was statistically analyzed, to calculate the rolling contact fatigue life exhibiting a cumulative breakage probability of 10%.

(2) Humidity Cabinet Test

Cylindrical test pieces of 12 mm in diameter φ and 22 mm in length L having chemical components similar to those of the aforementioned test pieces Nos. 1 to 10 according to Example 1 and subjected to similar heat treatments were prepared. Thereafter lapping was performed on one end surface of each test piece, and the end surface was mirror-finished. The mirror-finished end surface was employed as a test surface, and the humidity cabinet test was conducted under test conditions (test conditions according to JIS K2246) shown in Table 4.

TABLE 4

| Atmosphere Temperature (° C.) | 49 ± 1 |
|---|---|
| Humidity (%) | 95 |

The test piece was held in a tester held in the conditions of the temperature and the humidity shown in Table 4 for 20 hours, and thereafter held for four hours while opening the tester to the atmosphere. Thereafter resistance (corrosion resistance) of each test piece against rusting was evaluated by measuring an area ratio indicating the ratio of the area of a rusted region to the area of the test surface and calculating the inverse of the area ratio. The area ratio was measured by photographing the test piece after the test and image-processing the photograph with an image processor. Two test pieces were employed respectively.

(3) Abrasion Test

This is a test capable of estimating an abraded state of a rolling member in a case where lubrication conditions are inferior due to a high temperature. Flat test pieces having chemical components similar to those of the aforementioned test pieces Nos. 1 to 10 according to Example 1 and subjected to similar heat treatments were prepared. Thereafter one major surface of each test piece was mirror-finished, and the mirror-finished surface was employed as a test surface. The abrasion test was conducted under test conditions shown in Table 5.

TABLE 5

| Tester | Savant abrasion tester |
|---|---|
| Test Piece | mirror-finished flat surface |
| Counter | SUJ ring of φ40 mm × R50 mm, roughness Ra = 0.01 μm |
| Load | 50N |
| Sliding Velocity | 0.05 m/s |
| Testing Time | 60 min. |
| Lubricating Oil | Mobile Velocity No. 3 |

The abrasion test was conducted with a Savant abrasion tester. The Savant abrasion tester is described with reference to FIGS. 34 and 35.

Figure 34:
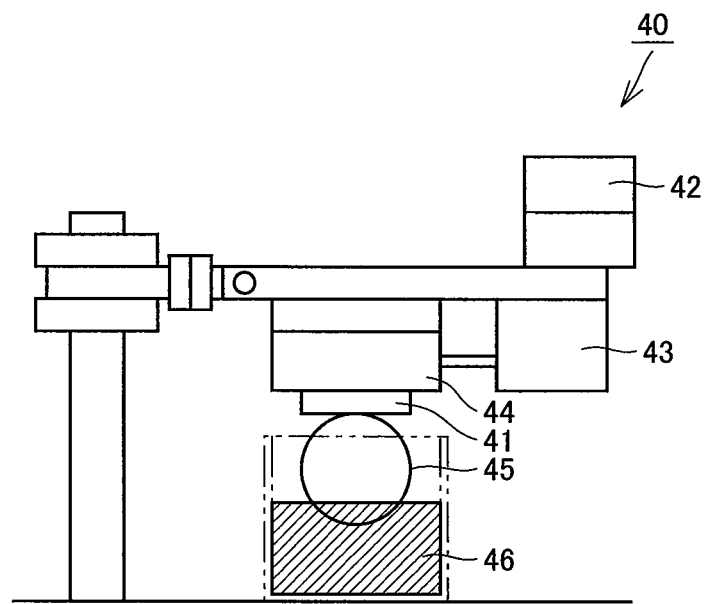
FIG. 34 is a schematic front elevational view showing the structure of a main portion of a Savant abrasion tester.
Figure 35:
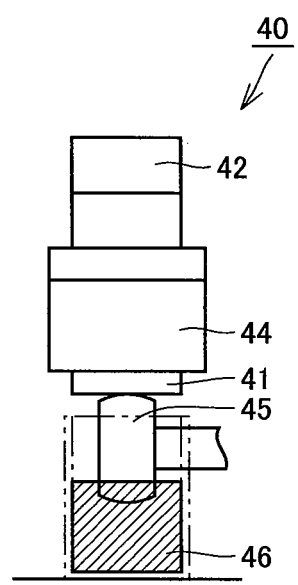
FIG. 35 is a schematic side sectional view showing the structure of the main portion of the Savant abrasion tester.

Referring to FIGS. 34 and 35, a Savant abrasion tester 40 includes a load cell 43 and an air slider 44. A flat abrasion test piece 41 is held by air slider 44, and a load with a weight 42 applied in the abrasion test is detected by load cell 43. A mirror-polished surface of abrasion test piece 41 and the outer peripheral surface of a counter material 45 are brought into contact with each other, to rotate counter material 45. No lubricating oil is directly fed to the contact surfaces of abrasion test piece 41 and counter material 45, but counter material 45 is partially dipped in lubricating oil 46.

An abraded volume of each test piece was measured after driving Savant abrasion tester 40 in the aforementioned manner and rotating the counter material for 60 minutes. The abrasion resistance of each test piece was evaluated with the inverse of the abraded volume.

(4) Ultrasonic Fatigue Test

This is a high-speed fatigue test in a tension-compression mode, capable of evaluating fatigue strength against surface tensile stress resulting from a surface slip or the like. The evaluation can be made in a short time, and hence the test can be conducted in a state introducing hydrogen into steel by electrolytic charge or the like. Thus, resistance against flaking resulting from hydrogen embrittlement can be estimated. Test pieces having chemical components similar to those of the aforementioned test pieces Nos. 1 to 10 according to Example 1 and subjected to similar heat treatments were prepared. Each test piece was shaped into a round bar provided with a notch which is a portion having a reduced outer diameter on a central portion. First, hydrogen charge was performed on each prepared test piece under conditions shown in Table 6. Thereafter the ultrasonic fatigue test was performed under conditions shown in Table 7. The ultrasonic fatigue test was performed also on test pieces prepared by similar procedures without hydrogen charge (ultrasonic fatigue test (with no hydrogen charge).

TABLE 6

| Electrolyte | 0.05 mol/L of dilute sulfuric acid + 1.4 g/L of thiouric acid |
|---|---|
| Current Density | condition of introducing 3 ppm of hydrogen |
| Time | 20 h |

TABLE 7

| Tester | ultrasonic fatigue tester |
|---|---|
| Test Piece | notch type |
| Load Frequency | 20 kHz |
| Load System | intermittent loading (loading 0.11 s, pause 1.10 s) |
| Stress Ratio | R = −1 (complete alternating) |
| Test Atmosphere | In atmosphere of ordinary temperature |

The ultrasonic fatigue test was conducted with an ultrasonic fatigue tester. The ultrasonic fatigue tester is described with reference to FIG. 36.

Figure 36:
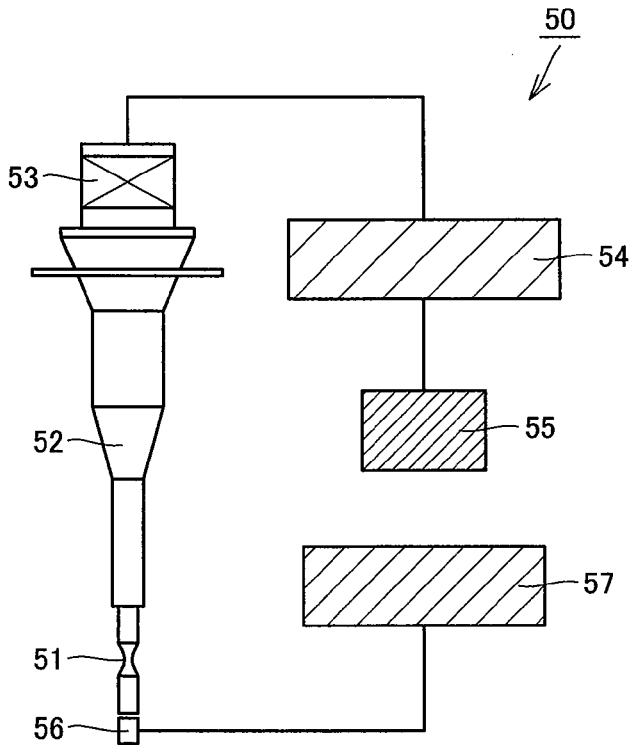
FIG. 36 is a model diagram showing the structure of a main portion of an ultrasonic fatigue tester.

Referring to FIG. 36, an ultrasonic fatigue tester 50 includes a horn portion 52 coupled to a site to which an ultrasonic fatigue test piece 51 is fixed, a PZT (lead zirconate titanate) vibrator 53 connected to horn portion 52, an amplifier 54 connected to PZT vibrator 53 and a control unit 55 such as a personal computer connected to amplifier 54. In ultrasonic fatigue tester 50, further, a clearance gauge 56 is arranged to be opposed to an end portion opposite to a side of ultrasonic fatigue test piece 51 coupled to horn portion 52, and clearance gauge 56 is connected to an oscilloscope 57.

Ultrasonic fatigue test piece 51 is set on ultrasonic fatigue tester 50, and ultrasonic vibration is generated by inputting electric power into PZT vibrator 53 through amplifier 54 while controlling an output with control unit 55. This ultrasonic vibration is transmitted to ultrasonic fatigue test piece 51 through horn portion 52 thereby resonating ultrasonic fatigue test piece 51. At this time, stress amplitude of axial tension/compression is maximized in a portion of ultrasonic fatigue test piece 51 having the narrowest diameter. On the other hand, the state of vibration of ultrasonic fatigue test piece 51 is monitored by clearance gauge 56 connected to oscilloscope 57.

The number of cycles of stress up to flaking or breakage of ultrasonic fatigue test piece 51 was surveyed by driving ultrasonic fatigue tester 50 in the aforementioned manner. Further, this survey was performed as to various types of stress and the results thereof were statistically analyzed on the assumption that the results followed normal distribution, to calculate stress ($10^7$ fatigue strength) predictively breaking 10% of test pieces through $10^7$ cycles, thereby evaluating fatigue strength in a state infiltrated with hydrogen.

(5) Peeling Test

This test, rolling each test piece under such a condition that a lubricating oil film is cut and causing fatigue damage (peeling) resulting from metallic contact on the surface, can survey resistance against surface damage in a case where lubrication is insufficient. Discoidal test pieces having chemical components similar to those of the aforementioned test pieces Nos. 1 to 10 according to Example 1 and subjected to similar heat treatments were prepared. The peeling test was performed on the prepared test pieces under conditions shown in Table 8.

TABLE 8

| Tester | NTN2 cylindrical tester |
|---|---|
| Test Piece | φ40 mm, Rmax0.2 μm |
| Counter Test Piece | φ40 mm × R60 mm, Rmax3 μm |
| Contact Load | 2156N |
| Contact Stress | Pmax = 2.3 GPa |
| Rotational Speed | 2000 rpm |
| Lubrication | turbine oil VG46 |
| Testing Time | 4 hours (load frequency $4.8 \times 10^5$) |

The peeling test was conducted with a two-cylinder rolling tester. The two-cylinder rolling tester is described with reference to FIG. 37.

Figure 37:
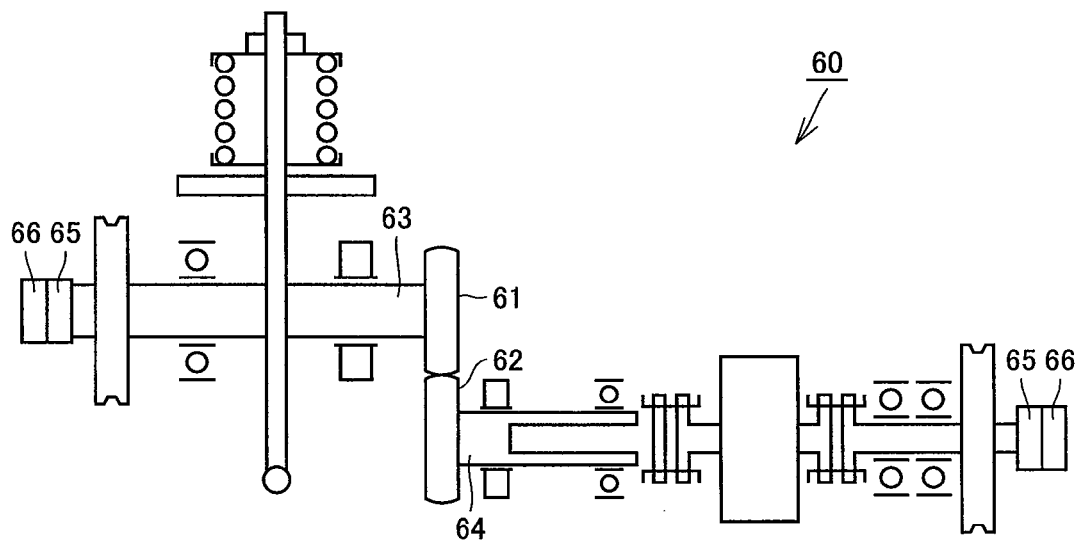
FIG. 37 is a model diagram showing the structure of a main portion of a two-cylinder rolling tester.

Referring to FIG. 37, a discoidal counter test piece 61 is set to be rotatable around a first shaft 63 while a discoidal test piece 62 is set to be rotatable around a second shaft 64 in a two-cylinder rolling tester 60. First shaft 63 and second shaft 64 are parallelly arranged, and counter test piece 61 and test piece 62 are set on first end portions of the respective ones of first shaft 63 and second shaft 64 so that the outer peripheral surfaces thereof are in contact with each other. Tachometers 65 and slip rings 66 are arranged on both of second end portions of first shaft 63 and second shaft 64.

First shaft 63 as a driving shaft rotates while lubricating oil is dropped on counter test piece 61. Thus, counter test piece 61 rotates, while test piece 62 rotates following counter test piece 61 while coming into contact with counter test piece 61. Two-cylinder rolling tester 60 was driven in the aforementioned manner, and the rotation of first shaft 63 was stopped when rotation of a prescribed rotational frequency of $4.8 \times 10^5$ times was ended. Then, test piece 62 was detached from two-cylinder rolling tester 60, the area of peeling caused on the outer peripheral surface of test piece 62 was surveyed, and the ratio (peeling area ratio) of the area of the peeling to the area of the outer peripheral surface of test piece 62 was calculated. Peeling resistance was evaluated with the inverse of the peeling area ratio.

(6) Smearing Test

Discoidal Test pieces having chemical components similar to those of the aforementioned test pieces Nos. 1 to 10 according to Example 1 and subjected to similar heat treatments were prepared. The smearing test was performed on the prepared test pieces under conditions shown in Table 8.

TABLE 9

| Tester | NTN 2 cylindrical tester |
|---|---|
| Test Piece | φ40 mm × R60 mm, roughness 3 S |
| Counter Test Piece | φ40 mm × R60 mm, roughness 3 S |
| Contact Stress | Pmax = 2.1 GPa |
| Rotational Speed | constant at 2000 rpm on one side, increased on the other side |
| Lubrication | additive-free turbine oil VG46 |

Smearing was performed with the two-cylinder rolling tester used in the aforementioned peeling test. First, test pieces were set on the tester, similarly to the peeling test. Then, first test piece 61 was rotated at a rotational speed of 200 rpm while lubricating oil was dropped thereon, the rotational speed of second test piece 62 was gradually increased from 200 rpm, the test was stopped when smearing was caused on the surface of either test piece, and the current relative rotational speed was recorded. The resistance of each test piece against smearing was evaluated through this relative rotational speed. It is indicated that the resistance against smearing is increased as the relative rotational speed causing the smearing is increased.

(7) Ring Crush Test

Ring-shaped test pieces having chemical components similar to those of the aforementioned test pieces Nos. 1 to 10 according to Example 1 and subjected to similar heat treatments were prepared. The ring crush test was performed on the prepared test pieces.

Figure 38:
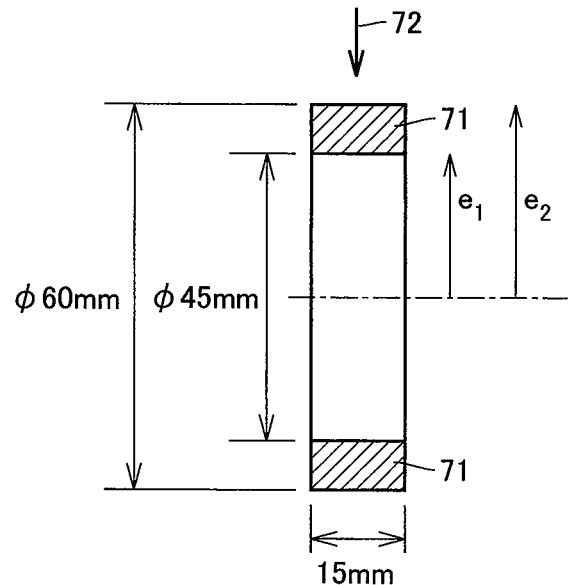
FIG. 38 is a schematic sectional view showing the shape of a test piece of a ring crush test.

The ring crush test is described with reference to FIG. 38. Referring to FIG. 38, a crush test piece 71 has an annular shape of 60 mm in outer diameter, 45 mm in inner diameter and 15 mm in width. A load is gradually applied in a load direction 72, and the load at the time when crush test piece 71 is broken is measured. Thereafter the obtained breaking load is converted to a stress value through the following stress equations of a curved beam.

Assuming that $\sigma_1$ represents fiber stress on a convex surface (surface at a distance of $+e_1$ from a central line of crush test piece 71) of crush test piece 71 in FIG. 38 and $\sigma_2$ represents fiber stress on a concave surface (surface at a distance of $-e_1$ from the central line of crush test piece 71), $\sigma_1$ and $\sigma_2$ are obtained through the following equations (refer to Material Dynamics A4-40, Mechanical Engineers' Handbook A4). N represents axial force of a section of crush test piece 71 including an axis, A represents a cross sectional area, $e_1$ represents an external radius, and $e_2$ represents an internal radius (see FIG. 38). κ represents a section modulus of the curved beam.

$$\sigma_1 = (N/A) + \{M/(A\rho_0)\}[1 + e_1/\{\kappa(\rho_o + e_1)\}] \quad (A)$$

$$\sigma_2 = (N/A) + \{M/(A\rho_0)\}[1 - e_2/\{\kappa(\rho_0 - e_2)\}] \quad (B)$$

$$\kappa = -(1/A)\int_A \{\eta/(\rho_0 + \eta)\} dA \quad (C)$$

This stress value was evaluated as the crush value of the test piece.

(8) Ring Rotation Cracking Fatigue Test

Annular test pieces having chemical components similar to those of the aforementioned test pieces Nos. 1 to 9 according to Example 1 and subjected to similar heat treatments were prepared. The ring rotation cracking fatigue test was performed under conditions shown in Table 10.

TABLE 10

| Tester | ring rotation cracking fatigue tester |
|---|---|
| Test Piece | φ45 mm × φ60 mm × t15 mm |
| Load | 9.8 kN |
| Load Speed | 8000 cpm |
| Lubrication | turbine oil VG68 |

The ring rotation cracking fatigue test was conducted with a ring rotation cracking fatigue tester. The ring rotation cracking fatigue tester is described with reference to FIG. 39.

Figure 39:
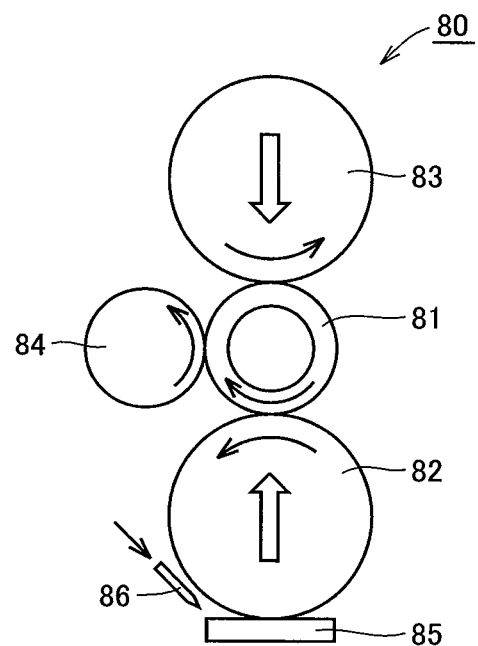
FIG. 39 is a model diagram showing the structure of a main portion of a ring rotation cracking fatigue tester.

Referring to FIG. 39, a ring rotation cracking fatigue tester 80 includes a driving roller 82 having a cylindrical shape, a load roller 83 and a guide roller 84. Driving roller 82, load roller 83 and guide roller 84 are so arranged that rotation axes thereof are parallel to each other and the outer peripheral surfaces thereof are contactable with a ring rotation cracking fatigue test piece 81. Ring rotation cracking fatigue tester 80 further includes an oil feeding nozzle 86, to be capable of feeding lubricating oil to ring rotation cracking fatigue test piece 81 by feeding oil to a pad 85 by oil feeding nozzle 86.

The procedure of the test is now described. First, ring rotation cracking fatigue test piece 81 is arranged to be in contact with driving roller 82, load roller 83 and guide roller 84 on the outer peripheral surface. Then, ring rotation cracking fatigue test piece 81 is driven by rotation of driving roller 82 while receiving stress to be radially compressed by driving roller 82 and load roller 83, and guided by guide roller 84 to rotate. Ring rotation cracking fatigue tester 80 was driven in the aforementioned manner, a test number was set to 10 times with 10 test pieces, a time up to cracking on the outer peripheral surface of ring rotation cracking fatigue test piece 81 was surveyed, and this time was regarded as a cracking life. The obtained life was statistically analyzed to calculate a life exhibiting a cumulative breakage probability of 10%, thereby evaluating the ring rotation cracking fatigue strength.

(9) Dimensional Stability Test

A test piece similar to crush test piece 71 employed for the ring crush test shown in FIG. 38 was prepared. Thereafter a treatment of holding the same at a temperature of 150° C. for 1000 hours was performed, and a rate of change of the outer diameter of the test piece before and after the treatment was measured. The inverse of the measured rate of change was regarded as dimensional stability, to evaluate dimensional stability of the test piece.

(10) High-Speed Bearing Life Test

Inner races and outer races of angular ball bearings having chemical components similar to those of the aforementioned test pieces Nos. 1 to 3, 6, 7, 9 and 10 according to Example 1 and subjected to similar heat treatments were prepared. Then, angular ball bearings were prepared by combining the inner races and the outer races with balls of silicon nitride. The angular ball bearings were operated under conditions shown in Table 11, and times up to flaking of the inner races or the outer races were evaluated as the lives of the bearings. The test number was set to two for each test piece, and the life was evaluated through the average.

TABLE 11

| Tester | high-speed bearing life tester |
|---|---|
| Tested Bearing | φ100 mm × φ150 mm × t24 mm (NTN product name BNS020) |
| Load | 3.92 kN |
| Contact Stress | Pmax = 2000 MPa |
| Rotational Speed | 12000 rpm (inner race rotation) |
| Counter Rolling Element | silicon nitride |
| Lubrication | grease (NTN product name MP-1) |

(11) Excitation Bearing Life Test

Inner races and outer races of JIS 6303 bearings having chemical components similar to those of the aforementioned test pieces Nos. 1, 2, 6, 9 and 10 according to Example 1 and subjected to similar heat treatments were prepared. Then, deep-groove ball bearings were prepared by combining the inner races and the outer races with steel balls of JIS SUJ 2 subjected to carbonitriding. The deep-groove ball bearings were operated with an alternator bearing tester provided with an exciting mechanism capable of operating (accelerating) the bearings while supplying vibration to the bearings similarly to a bearing employed in an alternator, and times up to flaking of the inner races or the outer races were evaluated as the lives of the bearings. The test number was set to two for each test piece.

TABLE 12

| Tester | alternator bearing tester with exciting mechanism |
|---|---|
| Tested Bearing | φ17 mm × φ47 mm × t14 mm (type number 6303) |
| Load | 2 kN |
| Rotational Speed | 12000 rpm (inner race rotation) |
| Counter Rolling Element | carbonitrided steel ball of SUJ2 |
| Grease | mineral oil-based, Li soap thickener |
| Testing Temperature | ordinary temperature |

(12) Foreign Matter-Contaminated Bearing Life Test

Inner races and outer races of bearings of JIS type No. 6206 having chemical components similar to those of the aforementioned test pieces Nos. 1, 2, 6, 7, 9 and 10 according to Example 1 and subjected to similar heat treatments were prepared. Then, deep-groove ball bearings were prepared by combining the inner races and the outer races with steel balls of JIS SUJ 2 subjected to carbonitriding. The deep-groove ball bearings were operated under conditions shown in Table 13 contaminating lubricating oil with hard foreign matter, and average times up to flaking of the inner races or the outer races were evaluated as the lives of the bearings. The test number was set to six for each test piece.

TABLE 13

| Tester | bearing life tester of NTN type II |
|---|---|
| Tested Bearing | φ30 mm × φ62 mm × t16 mm (6206C3) |
| Load | 6.86 kN |
| Contact Stress | Pmax = 3.2 GPa |
| Rotational Speed | 3000 rpm (inner race rotation) |
| Counter Rolling Element | carbonitrided steel ball of SUJ2 |

TABLE 13-continued

| | |
|---|---|
| Foreign Matter | grain size 100-180 μm, 0.4 g/L |
| Foreign Matter Hardness | about 800 HV |
| Lubrication | turbine oil VG56, 0.03 L |

(13) Thrust Needle Bearing Life Test

Bearing washers of thrust needle roller bearings of 60 mm in inner diameter ϕ, 85 mm in outer diameter ϕ and 2 mm in thickness t having chemical components similar to those of the aforementioned test pieces Nos. 1, 2, 5, 6, 9 and 10 according to Example 1 and subjected to similar heat treatments were prepared. Then, thrust needle roller bearings were prepared by combining the bearing washers with needle rollers of JIS SUJ 2 subjected to carbonitriding. The thrust needle roller bearings were operated under conditions shown in Table 14, and times up to flaking of the bearing washers were evaluated as the lives of the bearings. The test number was set to two for each test piece, and the life was evaluated by the average.

TABLE 14

| | |
|---|---|
| Tester | thrust needle life tester |
| Tested Bearing | ϕ60 mm × ϕ85 mm × t2 mm |
| Number of Rollers | 24 |

TABLE 14-continued

| | |
|---|---|
| Load | 7.8 kN |
| Contact Stress | Pmax = 1079 MPa |
| Rotational Speed | 5000 rpm (inner race rotation) |
| Counter Rolling Element | carbonitrided SUJ2 roller |
| Lubrication | spindle oil VG2 |
| Calculated Life | 9.7 h (in consideration of oil film parameter) |
| Test Number | 2 |

The test results are now described. Table 15 shows the test results in this Example. Referring to Table 15, each test result is shown in a ratio to the test result of the test piece No. 10 prepared with the conventional steel SUJ 2. In other words, it can be said that the characteristics are superior to the conventional test piece employing the conventional steel if the numerical value in Table 15 is greater than one. In relation to the ultrasonic fatigue test and the dimensional stability test, the test results are shown in ratios to the test results of the test piece No. 9 prepared from the conventional steel SCM 420. In relation to the bearing life tests, the lives obtained by the tests are shown. The results of the aforementioned tests (1) to (13) are now described with reference to Table 15.

TABLE 15

| | Test Results (Strength Ratio, Life Ratio) | | | | | | | | |
|---|---|---|---|---|---|---|---|---|---|
| No. | Rolling Contact Fatigue Life Test | Humidity Cabinet Test | Abrasion Test | Ultrasonic Fatigue Test (with no hydrogen charge) | Ultrasonic Fatigue Test (with hydrogen charge) | Peeling Test | Smearing Test | Ring Crush Test | Ring Rotation Cracking Fatigue Test |
| 1 | 2.7 | 2.4 | 2.2 | 1.5 | 1.7 | 2.2 | 1.9 | 0.85 | 5.4 |
| 2 | 2.6 | 2.2 | 2.1 | 1.5 | 1.6 | 2.3 | 2.0 | 0.85 | 5.0 |
| 3 | 2.8 | 2.3 | 2.2 | 1.6 | 1.7 | 2.4 | 1.9 | 0.85 | 5.6 |
| 4 | 3.1 | 2.5 | 2.2 | 1.5 | 1.6 | 2.3 | 2.0 | 0.90 | 5.2 |
| 5 | _2.3_ | _1.5_ | _1.5_ | 1.4 | _1.2_ | 2.3 | _1.5_ | _0.75_ | 5.0 |
| 6 | _1.9_ | 1.9 | _1.4_ | 1.5 | 1.6 | _1.8_ | 1.9 | _0.70_ | _4.6_ |
| 7 | _1.7_ | _1.3_ | _1.8_ | 1.5 | _1.3_ | _1.8_ | _1.3_ | _0.70_ | _4.0_ |
| 8 | _1.8_ | 2.0 | 2.0 | 1.3 | 1.6 | _1.7_ | 2.0 | _0.75_ | _4.6_ |
| 9 | _1.1_ | _1.0_ | _1.0_ | _1.0_ | _1.0_ | _0.9_ | _1.0_ | _0.70_ | 4.0 |
| 10 | _1.0_ | _1.0_ | _1.0_ | untested | untested | _1.0_ | _1.0_ | _1.0_ | _1.0_ |

| | Test Results (Strength Ratio, Life Ratio) | | | | | |
|---|---|---|---|---|---|---|
| No. | Dimensional Stability Test | High-Speed Bearing Life Test (unit: hour) | Excited Bearing Life Test (unit: hour) | Foreign Matter-Contaminated Bearing Life Test (unit: hour) | Thrust Needle Bearing Life Test (unit: hour) | Remarks |
| 1 | 15.2 | >3000 | 830,890 | 76 | 128 | Example |
| 2 | 14.2 | >3000 | 905,925 | 81 | 117 | |
| 3 | 14.8 | >3000 | untested | untested | untested | |
| 4 | 14.9 | untested | untested | untested | untested | |
| 5 | 12.4 | untested | untested | untested | _91_ | comparative |
| 6 | 14.9 | _2450_ | 708,620 | _64_ | _83_ | example |
| 7 | 14.5 | _2380_ | untested | _59_ | untested | |
| 8 | 13.8 | untested | untested | untested | untested | |
| 9 | 1.0 | _1090_ | 430,515 | _21_ | _22_ | SCM420 (comparative example)(*) |
| 10 | _0.7_ | _830_ | 285,380 | _18_ | _19_ | SUJ2 (comparative example)(*) |

(*)Tempering Temperature: 180° C.

(1) Rolling Contact Fatigue Life Test

All of the test pieces Nos. 1 to 8 have longer lives than the test pieces Nos. 9 and 10 having the conventional structures. However, the lives of the test pieces Nos. 5 to 8 according comparative examples are 2.3 times that of the test piece No. 10 at a maximum, and that of less than twice is also included. On the other hand, all of the test pieces Nos. 1 to 4 according to Example of the present invention have lives of at least 2.6 times that of the test piece No. 10, and have longer lives as compared with comparative examples.

(2) Humidity Cabinet Test

All of the test pieces Nos. 1 to 8 have high corrosion resistance with respect to the test pieces Nos. 9 and 10 having the conventional structures. However, the corrosion resistance values of the test pieces Nos. 5 to 8 according to comparative examples are 1.3 to 2.0 times those of the test pieces Nos. 9 and 10. On the other hand, all of the test pieces Nos. 1 to 4 according to Example of the present invention have corrosion resistance values of at least 2.2 times those of the test pieces Nos. 9 and 10, and have higher corrosion resistance as compared with comparative examples.

(3) Abrasion Test

All of the test pieces Nos. 1 to 8 have high abrasion resistance with respect to the test pieces Nos. 9 and 10 having the conventional structures. However, the abrasion resistance values of the test pieces Nos. 5 to 8 according to comparative examples are 1.4 to 2.0 times those of the test pieces Nos. 9 and 10. On the other hand, all of the test pieces No. 1 to 4 according to Example have abrasion resistance values of at least 2.1 times those of the test pieces Nos. 9 and 10 and have higher abrasion resistance as compared with comparative examples, although the hardness levels thereof are equivalent to those of the test pieces Nos. 5 to 8 according to comparative examples. This is conceivably influenced by that the test pieces Nos. 1 to 4 according to Example have small maximum carbide sizes as compared with the test pieces Nos. 5 to 8 according to comparative examples.

(4) Ultrasonic Fatigue Test

In the test of the case where no hydrogen charge was performed, all of the test pieces Nos. 1 to 8 exhibited longer lives with respect to the test piece No. 9 having the conventional structure. Also in the test of the case where hydrogen charge was performed, on the other hand, the test pieces Nos. 1 to 8 exhibited longer lives with respect to the test piece No. 9 having the conventional structure. However, the lives of the test pieces Nos. 5 to 8 according to comparative examples are 1.2 to 1.6 times that of No. 9. On the other hand, all of the test pieces Nos. 1 to 4 according to Example of the present invention have lives of at least 1.6 times that of No. 9, and have longer lives as compared with comparative examples. This is conceivably influenced by that the silicon contents of steel constituting the test pieces Nos. 5 to 8 according to comparative examples are larger than the preferable range and that the maximum carbide sizes thereof are larger than the preferable range.

(5) Peeling Test

All of the test pieces Nos. 1 to 8 have high peeling resistance with respect to the test piece No. 10 having the conventional structure. However, comparative examples also include those having peeling resistance values of less than 2.0 times that of No. 10 (Nos. 6 to 8). On the other hand, all of the test pieces Nos. 1 to 4 according to Example of the present invention have lives of at least 2.2 times that of the test piece No. 9, and have higher strength as compared with comparative examples.

(6) Smearing Test

All of the test pieces Nos. 1 to 8 have high smearing resistance with respect to the test piece No. 10 having the conventional structure. However, comparative examples also include those having smearing resistance values of not more than 1.5 times that of No. 10 (Nos. 5 and 7). On the other hand, all of the test pieces Nos. 1 to 4 according to Example of the present invention have smearing resistance values of 1.9 to 2.0 times that of No. 9, and stably have high strength. This is conceivably because the steel constituting the test pieces Nos. 1 to 4 according to Example of the present invention has high heat resistance.

(7) Ring Crush Test

All of the test pieces Nos. 1 to 8 are lower in ring crush strength than the test piece No. 10 having the conventional structure, and have ring crush strength values exceeding that of the test piece No. 9 having the conventional structure. This is because the test piece No. 9 is a test piece prepared by carburizing conventional carburizing steel and quenching the same and hence has low internal hardness, while the test piece No. 10 is a test piece prepared by quenching conventional bearing steel and hence has high internal hardness. The ring crush strength values of the test pieces Nos. 5 to 8 according to comparative examples are 70 to 75% of that of No. 10. On the other hand, all of the test pieces Nos. 1 to 4 according to Example of the present invention have ring crush strength values of at least 85% of that of No. 10, and have higher strength as compared with comparative examples.

(8) Ring Rotation Cracking Fatigue Test

All of the test pieces Nos. 1 to 8 have long lives with respect to the test piece No. 10 having the conventional structure. However, the test pieces Nos. 5 to 8 according to comparative examples have lives of 4.0 to 5.0 times that of No. 10. On the other hand, the test pieces Nos. 1 to 4 according to Example of the present invention have lives of 5.0 to 5.6 times that of No. 10, and have longer lives as compared with comparative examples.

(9) Dimensional Stability Test

It is understood that all of the test pieces Nos. 1 to 8 have extremely high dimensional stability as compared with the test piece No. 9 having the conventional structure. This is conceivably because the test pieces Nos. 1 to 8 were tempered at 280° C. while the test pieces Nos. 9 and 10 having the conventional structures were tempered at 180° C. The dimensional stability of the test piece No. 10 made of SUJ 2 is smaller than the dimensional stability of the test piece No. 9 made of SCM 420.

(10) High-Speed Bearing Life Test

In the column of "high-speed bearing life test" of Table 15, the description >3000 indicates that the bearing races were not flaked after a lapse of 3000 hours and hence the test was stopped. Referring to Table 15, all of the bearings of Nos. 1 to 3, 6 and 7 have long lives with respect to the bearings of Nos. 9 and 10 having the conventional structures. However, while the bearing races were flaked in 2380 hours to 2450 hours in the bearings of Nos. 6 and 7 according to comparative examples, the bearing races were not flaked even after a lapse of 3000 hours in the bearings of Nos. 1 to 3 according to Example of the present invention.

(11) Excitation Bearing Life Test

Referring to Table 15, all of the bearings of Nos. 1, 2 and 6 have long lives with respect to the bearings of Nos. 9 and 10 having the conventional structures. In the bearing of No. 6 according to comparative example, however, the bearing race was flaked in 620 hours to 708 hours, and dispersion of the life was also relatively large. On the other hand, both of the bearings of Nos. 1 and 2 according to Example of the present invention had lives of at least 830 hours, and stably had long lives.

(12) Foreign Matter-Contaminated Bearing Life Test

Referring to Table 15, all of the bearings of Nos. 1, 2, 6 and 7 have long lives with respect to the bearings of Nos. 9 and 10 having the conventional structures. In the bearings of Nos. 6 and 7 according to comparative examples, however, the bearing washers were flaked in 59 hours to 64 hours. On the other hand, the bearings of Nos. 1 and 2 according to Example of the present invention had lives of 76 to 81 hours exceeding four times that of the bearing of No. 10 made of the conventional steel, although the bearing washers were tempered at the high temperature of 280° C. and the quantities of retained austenite were reduced.

As a technique of increasing the life of a rolling bearing in an environment (foreign matter-contaminated environment) in which lubricating oil is contaminated with hard foreign matter, a countermeasure of performing carbonitriding on bearing rings and rolling elements is known in general. Therefore, a bearing life test was conducted on a sample prepared by carbonitriding bearing rings made of JIS SUJ 2 which is conventional steel and a sample prepared by further performing high-temperature tempering (230° C.) on the bearing rings under conditions similar to those shown in Table 13. Consequently, the life of the sample prepared by performing carbonitriding was 47 hours, and the life of the sample prepared by further performing high-temperature tempering was 25 hours. From this, it can be said that the bearings of Nos. 1 and 2 according to Example of the present invention have longer lives than a bearing subjected to the conventional countermeasure for increasing the life in the foreign matter-contaminated environment.

(13) Thrust Needle Bearing Life Test

Referring to Table 15, all of the bearings of Nos. 1, 2, 5 and 6 have long lives with respect to the bearings of Nos. 9 and 10 having the conventional structures. In the bearings of Nos. 5 and 6 according to comparative examples, however, the bearing washers were flaked in 83 hours to 91 hours. On the other hand, the bearings of Nos. 1 and 2 according to Example of the present invention had lives of at least 100 hours, and needle rollers made of SUJ 2 and subjected to carbonitriding were flaked before the bearing washers were flaked in both cases.

From the aforementioned results of the tests (1) to (13), it has been confirmed that the rolling member according to the present invention is superior in durability as compared with the conventional rolling member.

While the test results obtained by employing the test pieces subjected to tempering after carbonitriding have heretofore been described as Example, tests were similarly performed by employing other test pieces subjected to tempering after carburization. Consequently, it has been confirmed that, although slightly reduced in temper softening resistance as compared with the test pieces subjected to tempering after carbonitriding, these test pieces show results by no means inferior in other characteristics.

A heat treatment in each case of performing tempering after carburization was performed through a step similar to the heat treatment step in the modification of the aforementioned embodiment described with reference to FIG. 5. Referring to FIG. 5, $T_5$ was set to 960° C. and $t_5$ was set to 570 minutes, $T_6$ was set to 940° C. and $t_6$ was set to 210 minutes, $T_7$ was set to 850° C. and $t_7$ was set to 30 minutes, a $C_P$ value in a period when carbonitriding was performed at the temperature $T_5$ was set to 1.2, and $T_8$ was set to 260° C. and $t_8$ was set to 120 minutes.

The embodiments and Examples disclosed this time are to be considered as illustrative in all points and not restrictive. The range of the present invention is shown not by the above description but by the scope of claims for patent, and it is intended that all modifications within the meaning and range equivalent to the scope of claims for patent are included.

INDUSTRIAL APPLICABILITY

The rolling member, the rolling bearing and the process for manufacturing a rolling member according to the present invention are particularly advantageously applicable to a rolling member and a rolling bearing used also in a severe environment such as a high-temperature environment or an environment infiltrated with water and a process for manufacturing the rolling member.

The invention claimed is:

1. A rolling member constituted of steel containing at least 0.3 mass % and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium, and a balance of the steel is iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass %, wherein
    a hardened layer having a larger carbon content than an inner portion is formed on a region including the surface,
    the hardness of a surface layer portion of said hardened layer is at least 725 HV and not more than 800 HV,
    the maximum grain size of a carbide distributed in said surface layer portion is not more than 10 μm,
    the area ratio of said carbide on said surface layer portion is at least 7% and not more than 25%, and
    the hardness of said inner portion is at least 450 HV and not more than 650 HV.

2. The rolling member according to claim 1, wherein the sum of the content of molybdenum and the content of vanadium ranges from 0.6 mass % to 3.0 mass % in said steel.

3. The rolling member according to claim 1, wherein the sum of the content of molybdenum and the content of vanadium is not more than half the content of chromium in said steel.

4. The rolling member according to claim 1, wherein the content of silicon is not more than the sum of the content of molybdenum and the content of vanadium in said steel.

5. The rolling member according to claim 1, which is an automobile electrical equipment/auxiliary device rolling member constituting an automobile electrical equipment/auxiliary device rolling bearing supporting a rotationally driven rotating member to be rotatable with respect to a member arranged adjacently to said rotating member in an automobile electrical equipment/auxiliary device.

6. The rolling member according to claim 1, which is a transmission rolling member constituting a transmission rolling bearing supporting a rotor to be rotatable with respect to a member around said rotor in a transmission including a gear mechanism consisting of a plurality of gears and changing a transmission gear ratio stepwise by meshing said gears.

7. The rolling member according to claim 1, which is a transmission rolling member constituting a transmission rolling bearing employed in a continuously variable transmission in which rotation of an input shaft is transmitted to an output shaft while changing in a non-stage manner for rotatably supporting either one of said input shaft and said output shaft.

8. A rolling bearing comprising:
a raceway member; and
a plurality of rolling elements arranged on an annular raceway in contact with said raceway member, wherein
at least either one of said raceway member and said rolling elements is the rolling member according to claim 1.

9. A rolling member, which is a machine tool rolling member constituting a machine tool rolling bearing supporting, in a machine tool working a workpiece by rotation of a main spindle, rotationally driven said main spindle to be rotatable with respect to a member arranged adjacently to said main spindle,
constituted of steel containing at least 0.3 mass % and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium, and a balance of the steel is iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass %, wherein
a hardened layer having a larger carbon content than an inner portion is formed on a region including the surface,
the hardness of a surface layer portion of said hardened layer is at least 725 HV and not more than 800 HV,
the maximum grain size of a carbide distributed in said surface layer portion is not more than 10 μm,
the area ratio of said carbide on said surface layer portion is at least 7% and not more than 25%, and
the hardness of said inner portion is at least 450 HV and not more than 650 HV.

10. A needle roller bearing rolling member constituting a needle roller bearing including a needle roller in which the diameter of a roller as a rolling element is not more than 5 mm and the length of said roller is at least three times and not more than 10 times the diameter of said roller, wherein
the needle roller bearing rolling member is constituted of steel containing at least 0.3 mass and not more than 0.4 mass % of carbon, at least 0.3 mass % and not more than 0.7 mass % of silicon, at least 0.3 mass % and not more than 0.8 mass % of manganese, at least 0.5 mass % and not more than 1.2 mass % of nickel, at least 1.6 mass % and not more than 2.5 mass % of chromium, at least 0.1 mass % and not more than 0.7 mass % of molybdenum and at least 0.2 mass % and not more than 0.4 mass % of vanadium, and a balance of the steel is iron and impurities, in which the sum of the content of silicon and the content of manganese is not more than 1.0 mass %, the sum of the content of nickel and the content of chromium is at least 2.3 mass %, and the sum of the content of chromium, the content of molybdenum and the content of vanadium is not more than 3.0 mass %,
a hardened layer having a larger carbon content than an inner portion is formed on a region including the surface,
the hardness of a surface layer portion of said hardened layer is at least 725 HV and not more than 800 HV,
the maximum grain size of a carbide distributed in said surface layer portion is not more than 10 μm,
the area ratio of said carbide on said surface layer portion is at least 7% and not more than 25%, and
the hardness of said inner portion is at least 450 HV and not more than 650 HV.

* * * * *